(12) United States Patent
Ewell, Jr. et al.

(10) Patent No.: US 8,437,729 B2
(45) Date of Patent: *May 7, 2013

(54) APPARATUS FOR AND SYSTEM FOR ENABLING A MOBILE COMMUNICATOR

(75) Inventors: Robert C. Ewell, Jr., Ballston Spa, NY (US); Douglas L. Garmany, Pineland, TX (US); Charles T. Kelly, Houston, TX (US)

(73) Assignee: Mobile Communication Technologies, LLC, Houston, TX (US)

( * ) Notice: Subject to any disclaimer, the term of this patent is extended or adjusted under 35 U.S.C. 154(b) by 455 days.

This patent is subject to a terminal disclaimer.

(21) Appl. No.: 12/729,315

(22) Filed: Mar. 23, 2010

(65) Prior Publication Data

US 2010/0197351 A1 Aug. 5, 2010

Related U.S. Application Data

(63) Continuation-in-part of application No. 12/638,290, filed on Dec. 15, 2009, and a continuation-in-part of application No. 11/832,432, filed on Aug. 1, 2007, now abandoned, and a continuation-in-part of application No. 10/908,377, filed on May 10, 2005, now Pat. No. 7,590,405.

(51) Int. Cl.
*H04M 11/04* (2006.01)

(52) U.S. Cl.
USPC .............. 455/404.1; 455/404.2; 455/456.1

(58) Field of Classification Search ............ 455/404.2, 455/415, 456.4, 456.1, 567, 401, 434, 552.1, 455/564, 423, 67.11, 553.1, 521, 161.1–161.3, 455/550.1, 575.1, 90.1; 342/357.2, 357.22
See application file for complete search history.

(56) References Cited

U.S. PATENT DOCUMENTS

| 5,844,544 | A  | 12/1998 | Kahn et al. |
|---|---|---|---|
| 5,886,683 | A  | 3/1999 | Tognazzini et al. |
| 5,892,447 | A  | 4/1999 | Wilkinson |
| 6,108,532 | A  | 8/2000 | Matsuda et al. |
| 6,115,607 | A  | 9/2000 | Holcman |
| 6,282,553 | B1 | 8/2001 | Flickner et al. |

(Continued)

OTHER PUBLICATIONS

Application No. PCT/US2010/060014, International Search Report and the Written Opinion of the International Searching Authority, or the Declaration dated Mar. 10, 2011. 11 pages.

(Continued)

*Primary Examiner* — Dominic E Rego
(74) *Attorney, Agent, or Firm* — Schmeiser, Olsen & Watts, LLP

(57) ABSTRACT

Disclosed herein is a mobile communicator that includes a contact operable between an open configuration and a closed configuration and positioned to complete an electric circuit when the contact is in the closed position thereby activating the mobile communicator and providing the mobile communicator with functionality. The mobile communicator includes a display, a notification mechanism, a user interface, a transmitter and a receiver. Further, the mobile communicator includes an initial default disabled state, wherein at least one of a plurality of functions are disabled. The mobile communicator remains in the initial default disabled state even when the contact is in the closed position and the activating electrical circuit is complete. A logic of the enabling system is configured to change the initial default disabled state of the mobile communicator to an enabled state, wherein the at least one of the plurality of functions become enabled, when a condition is satisfied.

51 Claims, 19 Drawing Sheets

U.S. PATENT DOCUMENTS

| | | | |
|---|---|---|---|
| 6,377,813 B1 | 4/2002 | Kansakoski et al. | |
| 6,496,703 B1 | 12/2002 | Da Silva | |
| 6,556,810 B2 | 4/2003 | Suzuki | |
| 6,633,950 B1 | 10/2003 | Brown et al. | |
| 6,636,732 B1 | 10/2003 | Boling et al. | |
| 6,662,023 B1 | 12/2003 | Helle | |
| 6,687,497 B1 | 2/2004 | Parvulescu et al. | |
| 6,690,940 B1 | 2/2004 | Brown et al. | |
| 6,694,143 B1 | 2/2004 | Beamish et al. | |
| 6,771,946 B1 | 8/2004 | Oyaski | |
| 6,823,199 B2 | 11/2004 | Gough | |
| 6,871,063 B1 | 3/2005 | Schiffer | |
| 6,934,547 B2 | 8/2005 | Suzuki | |
| 6,967,580 B1 | 11/2005 | Schulze | |
| 6,973,333 B1 | 12/2005 | O'Neil | |
| 7,065,349 B2 | 6/2006 | Nath et al. | |
| 7,088,225 B2 | 8/2006 | Yoshioka | |
| 7,113,170 B2 | 9/2006 | Lauper et al. | |
| 7,123,874 B1 | 10/2006 | Brennan | |
| 7,187,953 B2 | 3/2007 | Bauchot et al. | |
| 7,260,390 B1 * | 8/2007 | Skinner et al. | 455/420 |
| 7,308,247 B2 | 12/2007 | Thompson et al. | |
| 7,343,148 B1 | 3/2008 | O'Neil | |
| 7,505,784 B2 | 3/2009 | Barbera | |
| 7,590,405 B2 | 9/2009 | Ewell, Jr. | |
| 7,719,520 B2 | 5/2010 | Singh et al. | |
| 7,762,665 B2 | 7/2010 | Vertegaal et al. | |
| 8,380,161 B2 | 2/2013 | Ewell, Jr. et al. | |
| 8,385,880 B2 | 2/2013 | Ewell, Jr. et al. | |
| 2001/0051514 A1 | 12/2001 | Lindholm | |
| 2002/0128000 A1 | 9/2002 | do Nascimento, Jr. | |
| 2002/0198005 A1 | 12/2002 | Hilton et al. | |
| 2003/0050039 A1 | 3/2003 | Baba et al. | |
| 2003/0171133 A1 * | 9/2003 | Mizuta et al. | 455/550 |
| 2004/0077339 A1 | 4/2004 | Martens | |
| 2004/0171407 A1 | 9/2004 | Ninomiya | |
| 2004/0176083 A1 | 9/2004 | Shiao et al. | |
| 2004/0198306 A1 | 10/2004 | Singh et al. | |
| 2004/0203554 A1 | 10/2004 | Simon | |
| 2004/0204003 A1 | 10/2004 | Soerensen et al. | |
| 2004/0204021 A1 | 10/2004 | Cocita | |
| 2004/0229645 A1 | 11/2004 | Montgomery | |
| 2005/0026644 A1 | 2/2005 | Lien | |
| 2005/0255874 A1 | 11/2005 | Stewart-Baxter et al. | |
| 2006/0003809 A1 | 1/2006 | Boling et al. | |
| 2006/0066567 A1 | 3/2006 | Scharenbroch et al. | |
| 2006/0099940 A1 | 5/2006 | Pfleging et al. | |
| 2006/0148490 A1 | 7/2006 | Bates et al. | |
| 2006/0240860 A1 | 10/2006 | Benco et al. | |
| 2006/0258376 A1 | 11/2006 | Ewell, Jr. | |
| 2007/0024579 A1 | 2/2007 | Rosenberg | |
| 2007/0078552 A1 | 4/2007 | Rosenberg | |
| 2007/0164990 A1 | 7/2007 | Bjorklund et al. | |
| 2007/0270122 A1 | 11/2007 | Ewell, Jr. | |
| 2008/0169914 A1 | 7/2008 | Albertson et al. | |
| 2008/0299900 A1 | 12/2008 | Lesyna | |
| 2008/0299954 A1 | 12/2008 | Wright et al. | |
| 2008/0305735 A1 | 12/2008 | Farnsworth et al. | |
| 2009/0029675 A1 | 1/2009 | Steinmetz et al. | |
| 2009/0117919 A1 | 5/2009 | Hershenson | |
| 2009/0163243 A1 | 6/2009 | Barbera | |
| 2009/0215466 A1 | 8/2009 | Ahl et al. | |
| 2009/0253423 A1 | 10/2009 | Kullberg | |
| 2009/0270143 A1 | 10/2009 | Bury | |
| 2010/0156781 A1 | 6/2010 | Fahn | |
| 2010/0182243 A1 | 7/2010 | Singh et al. | |
| 2011/0244824 A1 | 10/2011 | Ewell, Jr. | |

OTHER PUBLICATIONS

Office Action (Mail Date Nov. 22, 2010) for U.S. Appl. No. 11/832,432, filed Aug. 1, 2007.

Notice of Publication (Mail Date Apr. 15, 2010) for U.S. Appl. No. 12/638,290, filed Dec. 15, 2009.

Office Action (Mail Date Jun. 7, 2012) for U.S. Appl. No. 13/163,122, filed Jun. 17, 2011.

Office Action (Mail Date Aug. 17, 2012 for U.S. Appl. No. 12/638,290, filed Dec. 15, 2009.

* cited by examiner

APPARATUS FOR AND SYSTEM FOR ENABLING A MOBILE COMMUNICATOR

RELATED APPLICATIONS

This application is a continuation-in-part of and claims priority from co-pending U.S. patent application Ser. No. 12/638,290 filed Dec. 15, 2009 and entitled "Apparatus For and System for Enabling a Mobile Communicator" which is a continuation-in-part of U.S. patent application Ser. No. 11/832,432 filed Aug. 1, 2007 and entitled "Apparatus, System, and Method for Disabling a Mobile Communicator," which is a continuation-in-part of U.S. patent application Ser. No. 10/908,377 filed May 10, 2005, now U.S. Pat. No. 7,590,405, issued on Sep. 15, 2009, and entitled "Apparatus for Enabling a Mobile Communicator and Methods of Using the Same"; all of which are incorporated herein by reference in their entirety.

FIELD OF THE INVENTION

The present invention relates generally to an apparatus and method for using a mobile communication device, and more specifically to an apparatus and method for controlling the mobile communication device.

BACKGROUND OF THE INVENTION

Mobile or wireless cell phones or other wireless mobile communication devices such as two way radios have become popular devices for communicating when away from home or the office. Some people rely exclusively on wireless mobile communication devices because they may be carried on their persons, so their mobile communicator may always be accessible. This ubiquitous nature of wireless cell phones may be a disadvantage because cell phones may not be bound by use restrictions that may be placed on wired phones, when conditions arise in which cell phone use may need to be limited.

Therefore, there is a need for controlling cell phone use when conditions arise in which cell phone use may need to be limited.

SUMMARY OF THE INVENTION

A first aspect of the present invention provides a mobile communicator comprising: a contact operable between an open configuration and a closed configuration and positioned to complete an electric circuit when the contact is in the closed position thereby activating the mobile communicator and providing the mobile communicator with functionality; a display; a notification mechanism for alerting a user; a user interface configured for allowing a user to enter a plurality of destination inputs, the plurality of destination inputs associated with an alphanumeric combination of numbers and letters; a transmitter in operable communication with the user interface and configured to send a transmission from the mobile communicator to a destination corresponding with the destination input; a receiver capable of receiving a transmission from a transmitting device; and an enabling system; wherein the mobile communicator includes an initial default disabled state, wherein at least one of the display, the notification mechanism, the user interface, the transmitter, the receiver, a text messaging interface, an image messaging interface, a video messaging interface, an internet browser, an image capturer, a voice capturer, a video capturer, a GPS graphical map viewer, an inertial navigation system, a game player, a video player, a digital music player, an alarm clock, a digital memo pad, a digital calendar, a two-way radio, an e-book reader, an electronic contact rolodex, and a calculator is disabled; wherein the mobile communicator remains in the initial default disabled state even when the contact is in the closed position and the activating electrical circuit is complete; wherein a logic of the enabling system is configured to change the initial default disabled state of the mobile communicator to an enabled state, wherein the at least one of the display, the notification mechanism, the user interface, the transmitter, the receiver, the text messaging interface, the image messaging interface, the video messaging interface, the internet browser, the image capturer, the voice capturer, the video capturer, the GPS graphical map viewer, the inertial navigation system, the game player, the video player, the digital music player, the alarm clock, the digital memo pad, the digital calendar, the two-way radio, the e-book reader, the electronic contact rolodex, and the calculator become enabled, when the mobile communicator is moving at a speed that is less than a setpoint speed.

A second aspect of the invention provides a mobile communicator, comprising: a contact operable between an open configuration and a closed configuration and positioned to complete an electric circuit when the contact is in the closed position thereby activating the Mobile Communicator and providing the Mobile Communicator with functionality; a display; a notification mechanism for alerting a user; a user interface configured for allowing a user to enter a plurality of identity inputs, the plurality of identity inputs associated with an alphanumeric combination of numbers and letters; a transmitter in operable communication with the user interface and configured to send a transmission from the mobile communicator to a destination corresponding with the destination input; a receiver capable of receiving a transmission from a transmitting device; and an enabling system; wherein the mobile communicator includes an initial default disabled state, wherein at least one of the display, the notification mechanism, the user interface, the transmitter, the receiver, a text messaging interface, an image messaging interface, a video messaging interface, an internet browser, an image capturer, a voice capturer, a video capturer, a GPS graphical map viewer, an inertial navigation system, a game player, a video player, a digital music player, an alarm clock, a digital memo pad, a digital calendar, a two-way radio, an e-book reader, an electronic contact rolodex, and a calculator is disabled; wherein the mobile communicator remains in the initial default disabled state even when the contact is in the closed position and the activating electrical circuit is complete; and wherein a logic of the enabling system is configured to change the initial default disabled state of the mobile communicator to an enabled state, wherein at least one of the display, the notification mechanism, the user interface, the transmitter, the receiver, the text messaging interface, the image messaging interface, the video messaging interface, the internet browser, the image capturer, the voice capturer, the video capturer, the GPS graphical map viewer, the inertial navigation system, the game player, the video player, the digital music player, the alarm clock, the digital memo pad, the digital calendar, the two-way radio, the e-book reader, the electronic contact rolodex, and the calculator become enabled, when a hands-free mode of the mobile communicator is activated.

DESCRIPTION OF THE INVENTION

Mobile cell phones or other mobile communication devices such as two way radios have become popular devices for communicating when away from home or the office. Some people rely exclusively on mobile communication devices because they may be carried on their persons, so they can always be near their mobile communicator.

Firstly, this ubiquitous nature of cell phones may be a disadvantage when a user receives or transmits a call from a cell phone within a proximity of other people because it may interfere with their enjoyment of their quiet and solitude. Hereinafter, "proximity of other people" is defined as within a listening distance of the other people.

Secondly, the ubiquitous nature of cell phones may also be disadvantageous for companies that wish to prevent their trade secrets or other proprietary information from being communicated to the outside world via a cell phone, or by a camera accessory of a cell phone, by an employee or other visitor having access to the trade secrets or other proprietary information.

Thirdly, the ubiquitous nature of cell phones may also be disadvantageous because of safety concerns. Many states such as New York State have enacted laws prohibiting an operator of a moving vehicle from holding a mobile communication device while operating the vehicle in order to reduce the number of moving vehicle accidents that may occur as a result of operators of moving vehicles using mobile communication devices during operation of the vehicle.

Therefore, there is a need for providing safeguards to avoid safety hazards or interference with the quiet and solitude of others resulting from use of cell phones or other mobile communication devices.

Many states such as New York State have enacted laws prohibiting an operator of a moving vehicle from holding a mobile communication device while operating the vehicle in order to reduce the number of moving vehicle accidents that may occur as a result of operators of moving vehicles using mobile communication devices during operation of the vehicle.

Therefore, there is a need for equipping a Mobile Communicator such as a cell phone so that some or all of its transmitting and audible receiving functions 680 may remain in a Disabled State unless certain conditions for Enabling the transmitting and audible receiving functions 680 are satisfied. Non-limiting examples of the transmitting and audible receiving functions 680 include ringer notification of messages or incoming calls, calling in/out, e.g., making incoming and outgoing calls from the Mobile Communicator 370, use of photocopying accessories such as a camera, use of microcomputer accessories, such as palm pilots, as user interfaces for text messaging or email, electronic communicators and combinations thereof.

Figure 1:
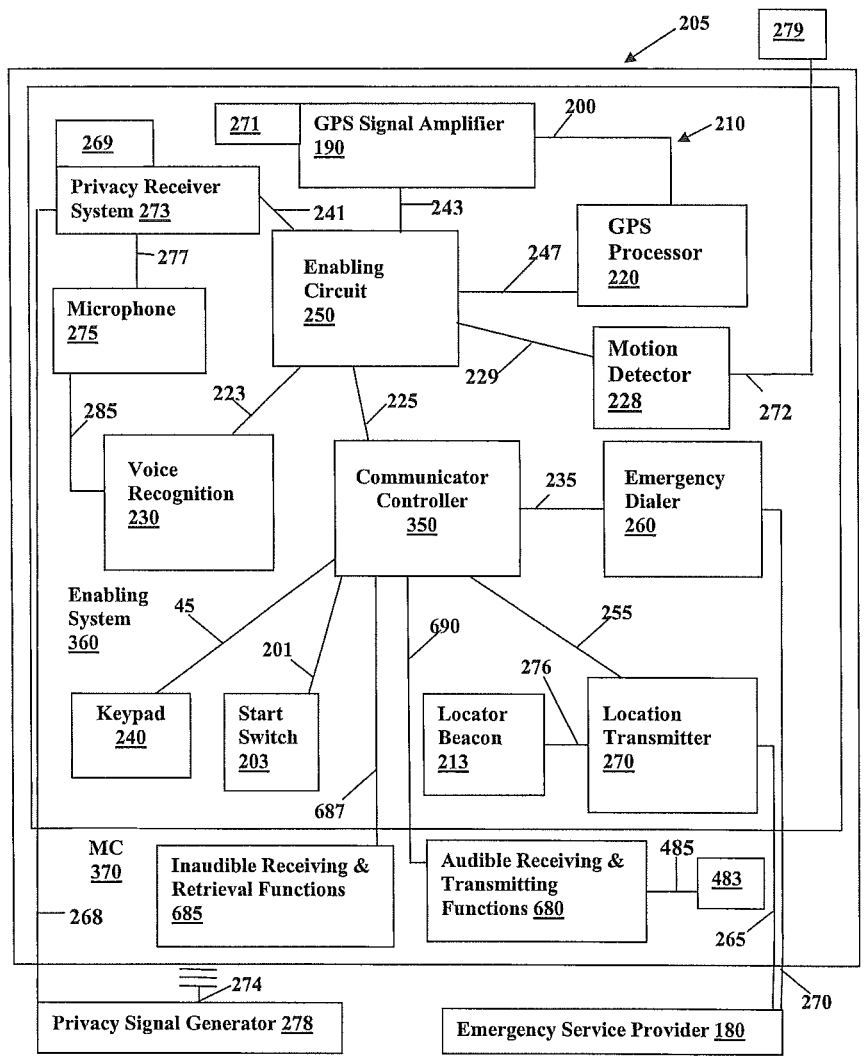
FIG. 1 depicts a kit and a Mobile Communicator, in accordance with embodiments of the present invention.

FIG. 1 depicts a kit 205 or a Mobile Communicator 370, comprising: an Enabling System 360, wherein the Enabling System 360 includes a "Start Switch" 203 for activating the kit 205 or the Mobile Communicator 370 if an at least one condition is satisfied, and wherein an outgoing call to an Emergency Service Provider 180 may always be enabled by the Enabling System 360. Alternatively, the kit 205 or the Mobile Communicator 370 may remain in a Default Disabled State 410 if the at least one condition is not satisfied, even if the Start Switch 203 may be activated. The Enabling System 360 may include a keypad 240 for inputting information into the Communicator Controller 350, such as passwords for user identification by the Communicator Controller 350, a Location Transmitter 270 for transmitting a location of the kit 205 or the Mobile Communicator 370, a Locator Beacon 213, for giving notice, such as an alarm, such as a flashing light or an audible sound, as to a geographical location of the kit 205 or the Mobile Communicator 370, an Emergency Dialer 260, for calling an emergency service provider such as the Emergency Service Provider 180, a Global Positioning System (GPS) Receiver 210, a Privacy Receiver System 273, having a privacy signal antenna 269, a Voice Recognition System 230, a Motion Detector 228, a Microphone 275 and an Enabling Circuit 250. Although the Microphone 275 may by any device able to convert sound(s) wave(s) into an electrical signal, the Microphone 275 may have the following specifications: 100-10 KHz frequency response; low impedance; normal and zoom settings; an effective output level from about −66 dB+/−3 dB unbalanced (normal); −79 dB+/−3 dB unbalanced (zoom); and a Microphone 275 range to 80 dB.

The Microphone 275 may provide received sound(s) to the Voice Recognition System 230 via the wire 285, or wirelessly, or to the Privacy Receiver System 273 via the wire 277, or wirelessly. A Privacy Signal Generator 278 may provide a privacy signal to the Microphone 275 wirelessly by transmitting from the antenna 274. The Microphone 275 may provide the privacy signal received wirelessly from the antenna 274 to the Privacy Receiver System 273 via a wire 277, or wirelessly. The Privacy Signal Generator 278 may provide the privacy signal to the Privacy Receiver System 273 wirelessly, wherein the antenna 274 of the Privacy Signal Generator 278 may transmit and the antenna 269 of the Privacy Signal Receiver 273 may receive the privacy signal. Alternatively, the Privacy Signal Generator 278 may provide the privacy signal to the Privacy Receiver 273 via a wire 268, or wirelessly. The Enabling Circuit 250 may include a logic that enables the Mobile Communicator 370 if at least one of a number of conditions may be satisfied, and wherein outgoing calls to an Emergency Service Provider 180 may always be enabled by the Enabling System 360. Hereinafter "enabling the Mobile Communicator 370" is defined as making the Mobile Communicator's 370 transmitting and audible receiving functions 680 operational; to activate the Mobile Communicator's 370 transmitting and audible receiving functions 680. Hereinafter, "logic" is defined as non-arithmetic operations performed by a logic circuit (not shown) in the Enabling Circuit 250 or in a computer (not shown), such as sorting, comparing, and matching, that involve yes-no decisions, wherein the logic may be provided by computer software or the computer circuit that may be located in the Enabling Circuit 250 or in the computer (not shown).

The "Start Switch" 203 may be any appropriate means of opening or closing an electrical circuit in the Communicator Controller 350 via a wire 201, or wirelessly, such as a contact closure. Hereinafter, a contact closure may be a variety of electrical switches in an electrical circuit that may be open, i.e., having infinite electrical resistance, or closed, i.e., being electrically conducting. The contact closure may be the Start Switch 203 providing a contact closure to the Communicator Controller 350, via the wire 201, or wirelessly, and the electrical circuit may include the Communicator Controller 350 and at least one other component of the Enabling System 360, such as the Enabling Circuit 250, via the wire 225, or wirelessly, the Emergency Dialer 260, via the wire 235, or wirelessly, or the Location Transmitter 270, via the wire 255, or wirelessly. Alternatively, the contact closure may be in the Enabling Circuit 250 providing a contact closure for the Communicator Controller 350, via the wire 225, or wirelessly, and the electrical circuit may include the Communicator Controller 350, the Enabling Circuit 250, via the wire 225, or wirelessly, and the Enabling Circuit 250 and at least one other component of the Enabling System 360, such as the GPS Receiver 210, via the wires 200, 243, 247, or wirelessly, and the Voice Recognition System 230, via the wire 223, or wirelessly, and the Motion Detector 228, via the wire 229, or wirelessly, and the Privacy Receiver System 273, via the wire 241, or wirelessly. When the contact closure is closed, the electrical circuit that may include the Communicator Controller 350 and the Enabling Circuit 250 may be complete and functional. Alternatively, when the contact closure is open, the electrical circuit that may include the Communicator Controller 350 and the Enabling Circuit 250 is open and non-functional. When the electrical circuit is open and non-functional the transmitting and audible receiving functions 680 of the kit 205 or the Mobile Communicator 370 may remain in the Default Disabled State 410.

In embodiments of the kit 205 or the Mobile Communicator 370 and of the methods 400, 450 and 465 described herein, Data Retrieval & Inaudible Receiving Functions 685 may remain enabled if the at least one condition (420-480) may not be satisfied. Non-limiting examples of Data Retrieval & Inaudible Receiving Functions 685 include ability to receive incoming calls as messages, vibrator or optical notification of incoming messages, visual page, accessing phone numbers or other stored information, personal schedules, and combinations thereof.

Alternatively, when the electrical circuit is closed and functional the transmitting and audible receiving functions 680 of the kit 205 or the Mobile Communicator 370 may be changed from the Default Disabled State 410 to the Enabled State 510 if at least one condition (420-480) may be satisfied, as in the methods 400, 450, and 465 described herein, because the Communicator Controller 350 may drive the Enabled State 510 transmitting and audible receiving functions 680 of the kit 205 or the Mobile Communicator 370 if the Communicator Controller 350 has received a contact closure from either the Start Switch 203 or the Enabling Circuit 250. The Communicator Controller 350 may drive the transmitting and audible receiving functions 680 via the wire 690, or wirelessly.

The at least one condition for what conditions must be met so that the kit 205 or the Mobile Communicator 370 may be enabled may be that there is an emergency, wherein calling an Emergency Service Provider 180 and/or triggering a Location Transmitter 270 may be enabled if there has been an emergency. Alternatively, the at least one condition may be that the GPS Receiver 210 receives a GPS Signal, wherein transmitting and audible receiving functions 680 of the Mobile Communicator 370 may be enabled if a GPS signal is received.

Hereinafter, the GPS signal received by the GPS Receiver 210 is defined as any signal that provides geographic location information in the signal as to a longitude and latitude location of the kit 205 or the Mobile Communicator 370 on the Earth. Such signals and information may be obtained from a source such as a GPS satellite, a cell phone provider, or any other provider of the signal having longitude and latitude information about the location of the kit 205 or the Mobile Communicator 370 on the Earth.

Alternatively, the at least one condition may be that the Mobile Communicator 370 has a speed$\leq$a setpoint, wherein audible receiving and transmitting functions 680 of the Mobile Communicator 370 may be enabled if the speed of the Mobile Communicator is $\leq$the setpoint. Alternatively, the at least one condition may be that a user's voice or password is authenticated, wherein transmitting and audible receiving functions 680 of the Mobile Communicator 370 may be enabled if the user's voice or identifying sound(s) or password are authenticated. The Voice Recognition System 230 may authenticate a user by determining that each sound(s) provided by the user essentially matches a preprogrammed or recorded user identifying sound(s). Alternatively, the at least one condition may be that the Mobile Communicator 370 receives a privacy signal, wherein transmitting and audible receiving functions 680 of the Mobile Communicator 370 may be enabled if the Mobile Communicator 370 receives the privacy signal. The privacy signal may include signals from broadcast and pager systems, signals from optical/infrared system, signals from acoustic/ultrasonic systems, 2.4 GHz, audible sounds, inaudible sounds and combinations thereof.

The Enabling System 360 of the kit 205 may include a Global Positioning System (GPS) Receiver 210, a Privacy Signal Receiver 273, and a Communicator Controller 350. The GPS Receiver 210 may include a GPS Signal Amplifier 190 for amplifying a GPS signal and a GPS Processor 220. The GPS Signal Amplifier 190 may include a GPS Antenna 271. The GPS Signal Amplifier 190 may communicate the amplified GPS signal to the GPS Processor 220 via a wire 200, or wirelessly. Alternatively, the amplified GPS signal may be transmitted to the GPS Processor 220 by the GPS Signal Amplifier 190 wirelessly using, for example, Wi-Fi protocol. The Privacy Signal Receiver 273 may receive a privacy signal from Microphone 275, via a communicating wire 277, or wirelessly. The Privacy Signal Generator 278 may generate the privacy signal wirelessly using, for example, Wi-Fi protocol. The GPS Processor 220 may process the information from the GPS Signal Amplifier 190 to determine a speed and/or a geographic location of the Mobile Communicator 370. Hereinafter "geographic location" includes a longitude and latitude from which a position on the earth's surface may be determined. The GPS Processor 220 may provide said speed and geographic location information to the Enabling Circuit 250 via wire 247, or wirelessly. The Privacy Receiver System 273 may provide a privacy signal to the Enabling Circuit 250 via the wire 243, or wirelessly. Different types of privacy signals employed may be signals from broadcast and pager systems, optical/infrared system, and acoustic/ultrasonic systems. Alternatively, the privacy signal may operate at 2.4 GHz.

In one embodiment of the Mobile Communicator 370 and the kit 205, not receiving the privacy signal enables transmitting and audible receiving functions 680 of the Mobile Communicator 370 in a restricted use area. The restricted use area may include a theater, a sports tournament, a hospital, a church, a waiting room, a locker room, a library, a spa, a vehicle, a business area housing trade secrets or confidential information, a conference room in which trade secrets or confidential proprietary information are discussed and combinations thereof. A vehicle may be any transportation vehicle that carries passengers, such as an airplane, an automobile, a coach in a train. However, the restricted use area may be any area in which privacy, quiet or enjoyment of solitude may be desired and in which transmitting and audible receiving functions 680 of the kit 205 of the Mobile Communicator 370 may interfere. The Microphone 275 of the kit 205 or the Mobile Communicator 370 that is used for receiving the Privacy Signal and for voice recognition may be the same Microphone 275 a user may speak into to make outgoing calls and for receiving and transmitting function of the kit 205 and the Mobile Communicator 370.

The GPS Receiver 210 may use National Marine Electronics Association (NEMA) standards for data communication between marine instruments GPS protocol (as used between a GPS and Autopilot, for example). The GPS Receiver 210 may be designed to provide a low cost alternative to other geographic location devices that require high precision and/or accuracy. The GPS Receiver 210 may have a GPS Signal Amplifier 190 having an active GPS Antenna 271. The GPS Receiver 210 may have a RS-232 output for connection to a PC or navigation system and may be enclosed in an essentially 100% waterproof, pole mount case. The NMEA RS-232 output may provide an easy connection to a PC to translate and process the GPS Receiver 210 data strings. The GPS 213 may be accurate: position horizontal, +/−15 m 2D RMS (SA off), velocity, 0.1 m/sec 95% (SA off), 1 micro-second synchronized to GPS time, WASS, +/−10 m 2D RMS.

The Enabling System 360 may include a Voice Recognition System 230, and a Microphone 275, for inputting an identifiable or distinguishable sound(s). The user identifying sound(s) may be the voice of a user or a user identifying tone or frequency, such as a tone from a tuning fork, a musical note or clip, an animal sound, or any sound by which a user may wish to be identified. The user identifying sound(s) may be inaudible to the human ear such as high frequency or low frequency sounds that are outside of a range of the human ear, such as a dog whistle, having a tone that has been recorded by the Voice Recognition System 230 and may be compared to the identifying sound provided by a user to be authenticated by the Voice Recognition System 230. Hereinafter, comparing the identifying sound(s) provided by a user to be authenticated by the Voice Recognition System 230 to the recorded user identifying sound(s) is a first step in a process by which the Voice Recognition System 230 may "recognize" or "authenticate" a user of the kit 205 or the Mobile Communicator 370. A second step in the process may be determining if the identifying sound(s) may match or be essentially identical to the preprogrammed or pre-recorded identifying sound(s). The comparing and matching steps may compare and match features of the identifying sound(s) that include frequency, pitch, volume, and interval between musical notes, syllables of words and the like. The at least one condition to be satisfied for enablement of the transmitting and audible receiving functions 680 of the kit 205 or the Mobile Communicator 370 may be that the comparison of the identifying sound(s) provided by the user to be authenticated is determined by the Voice Recognition System 230 to be essentially identical or essentially matches the preprogrammed or recorded identifying sound(s) in the Voice Recognition System 230. Hereinafter, user identifying sound(s) include the voice of a user or an identifying tone or frequency, such as a tone from a tuning fork or inaudible sounds such as a dog whistle, having a tone recognizable by the Voice Recognition System 230. The Microphone 275 may provide the user identifying sound(s) or password to the Voice Recognition System 230 via a wire 285, or wirelessly, and the Voice Recognition System 230 may provide or signal that the user's voice has been recognized or authenticated to the Enabling Circuit 250 via a wire 223, or wirelessly.

The Voice Recognition System 230 may determine that the user authorization condition has been satisfied by authenticating the user identifying sound(s) that the user provides into the Microphone 275. "Authenticating" or "authentication" is defined as determining the authenticity or identity of the user identifying sound(s) that the user provides into the Microphone 275 by comparing the user identifying sound(s) to authentic or actual user identifying sound(s) that have been recorded or preprogrammed into the Voice Recognition System 230 so that the Voice Recognition System 230 may recognize the user's voice or sound(s) to identify them, i.e., authenticate them to the Enabling System 360 of the kit 205 or the Mobile Communicator 370. The at least one condition to be satisfied for enablement of the transmitting and audible receiving functions 680 of the kit 205 or the Mobile Communicator 370 may be that a user's voice is authenticated. The at least one condition to be satisfied for providing identification of the user to the Emergency Service Provider and triggering a Locator Beacon may be entry of an authenticated password or authenticated voice.

The Enabling Circuit 250 may receive a signal indicating authentication from the Voice Recognition System 230 via wire 223, or wirelessly. The Voice Recognition System 230 may receive the user-identifying voice or the frequency of the user-identifying sound(s) from the Microphone 275 through the wire 285, or wirelessly.

A user placing or originating an outgoing call from the Mobile Communicator 370 may be authenticated by the Voice Recognition System 230. The Voice Recognition System 230 may authenticate the user by determining that a pattern of frequencies of the sound(s) provided by the user include sounds audible to a human ear or sounds inaudible to a human ear matches or may be essentially identical to a preprogrammed or recorded pattern of the frequencies of the user identifying sound(s) that may be preprogrammed or recorded in the Voice Recognition System 230.

Once having been authenticated by the Voice Recognition System 273, a user may enable the transmitting and audible receiving functions 680 of the kit 205 or the Mobile Communicator 370 by speaking or verbalizing a name of a person to be called that has been preprogrammed or recorded in the Enabling System 360, such as in an address book 483. Thus, the user may place a call to a telephone number of a person in the address book 483 by speaking or verbalizing the person's name or any other preprogrammed or recorded tag attached to the person's name, such as nicknames. The address book 483 may provide preprogrammed or recorded names for recall from the address book 483 by the authenticated user via a wire 485, or wirelessly.

Embodiments of the present invention may be used to communicate an identity of a user who places a call for emergency services to the Emergency Services Provider 180. For example, an authorized user may identify himself to the Emergency Services Provider 180 by providing an authenticated password or authenticated voice to the Enabling System 360 of the kit 205 or the Mobile Communicator 370. Providing an authenticated password or authenticated voice or authenticated sound(s) to the Enabling System 360 of the kit 205 or the Mobile Communicator 370 may trigger an Emergency Dialer 260 and Locator Beacon 213. The Microphone 275 of the Mobile Communicator 370 that is used to input the user identifying sound(s) or verbal password for authentication by the Voice Recognition System 230 and to input a privacy signal may be the same Microphone used for making outgoing calls. The inventor has found use of the same Microphone 275 for making outgoing calls and for inputting the user identifying sound(s) or verbal password for authentication by the Voice Recognition System 230, or for inputting the privacy signal for satisfying the Privacy Receiver System 273, may render methods of bypassing the Voice Recognition System 230 or the Privacy Receiver System 273 impossible. For example, shielding the Voice Recognition System 273 or the Privacy Receiver System 273 so that it may not receive the user identifying sound(s) or verbal password for authentication by the Voice Recognition System 230, or the privacy signal for satisfying the Privacy Receiver System 273 would also shield the Microphone 275 from receiving the user's voice message that would interfere or prohibit the Microphone 275 from being used to make outgoing calls.

The Enabling Circuit 250 may provide go/no go logic such that an authenticated voice may activate the Communicator Controller 350, resulting in enablement of the Mobile Communicator's 370 incoming/outgoing calls and other transmitting and audible receiving functions 680, including calling the Emergency Service Provider 180, other emergency numbers such as 911 and/or triggering the Locator Beacon 213. Alternatively, the Communicator Controller 370 may be activated by providing a password or Personal Identification Number (PIN) or alphanumeric combination of numbers and letters using the keypad 240.

Alternatively, the Voice Recognition System 230 may be equipped with a Wi-Fi receiver that may enable the Voice Recognition System 230 to receive the user-identifying voice or the frequency of the user-identifying sound from the microphone 275 via wireless transmission using Wi-Fi protocol and a Wi-Fi transmitter. Hereinafter "Wi-Fi" refers to wireless fidelity and is meant to be used generically when referring of any type of 802.11 network, that 802.11b, 802.11a, dual-band, etc. The term is promulgated by the Wi-Fi Alliance.

Any products tested and approved as "Wi-Fi Certified" (a registered trademark) by the Wi-Fi Alliance are certified as interoperable with each other, even if they are from different manufacturers. A user with a "Wi-Fi Certified" product can use any brand of access point with any other brand of client hardware that also is certified. Typically, however, any Wi-Fi product using the same radio frequency (for example, 2.4 GHz for 802.11b or 11g, 5 GHz for 802.11a) will work with any other, even if not "Wi-Fi Certified."

Formerly, the term "Wi-Fi" was used only in place of the 2.4 GHz 802.11b standard, in the same way that "Ethernet" is used in place of IEEE 802.3. The Alliance expanded the generic use of the term in an attempt to stop confusion about wireless LAN interoperability.

The Enabling Circuit 250 may contain logic that queries that certain conditions have been satisfied so that the Enabling System 360 may enable the Mobile Communicator 370. The Enabling Circuit 250 may provide a contact closure via a wire 225, or wirelessly, that completes an electrical circuit between the Enabling Circuit 250 and the Communicator Controller 350, enabling the Communicator Controller 350 to drive Enabled State 510 transmitting and audible receiving functions 680 of the kit 205 or the Mobile Communicator 370 when an answer to the query as to that the certain condition has been satisfied is "yes." However, the contact closure may not be provided to the Communicator Controller 350 when the answer to the query as to that the certain condition has been satisfied is "no." The Communicator Controller 350 may drive certain Enabled State 510 transmitting and audible receiving functions 680 via a wire 690, or wirelessly, or inaudible or suppressed receiving and transmitting functions 685 of the Mobile Communicator 370 via a wire 687, or wirelessly, when the Communicator Controller 350 may receive the contact closure from the Enabling Circuit 250, i.e., when the certain condition has been satisfied. The Enabled State 510 transmitting and audible receiving functions 680 include ringer notification of messages or incoming calls, calling in/out, e.g., making incoming and outgoing calls from the Mobile Communicator 370, and combinations thereof. The Enabled State 510 inaudible or suppressed receiving and transmitting functions 685 include a vibrator notification, a camera, a palm pilot, text messaging, message receipt and storage, internet connectivity, silent mode, selective suppression or damping of portions of frequencies of transmissions such as high frequency portion, substitution of video or audio output for suppressed output, and combinations thereof.

The Enabling System 360 may include a Keypad 240, for inputting information to the Communicator Controller 350 via a wire 245. Alternatively, the keypad 240 may input information to the Communicator Controller 350 wirelessly.

The kit 205 or the Mobile Communicator 370 may be enabled for hands-free calling when the at least one condition for enablement of the kit 205 or the Mobile Communicator 370 has been satisfied. A purpose of hands-free calling is to enable use of the kit 205 or the Mobile Communicator 370 when a user's hands are not available to operate the kit 205 or the Mobile Communicator 370, such as for activating the Start Switch 203. Hereinafter, "hands-free calling" or "hands-free operation" is defined as allowing a user to retrieve a preprogrammed name and phone number of the person to be called from an address book 483. A user may enable the transmitting and audible receiving functions 680 of the kit 205 or the Mobile Communicator 370 by speaking or verbalizing the name that has been preprogrammed or recorded in the Enabling System 360, such as in the address book 483. Thus, the user may place a call to a telephone number of a person whose name and number may have been stored in the address book 483 by speaking or verbalizing the person's name or any other preprogrammed or recorded tag attached to the person's name, such as nicknames. The address book 483 may provide preprogrammed or recorded names for recall from the address book 483 by the authenticated user via a wire 485, or wirelessly.

The Communicator Controller 350 may also drive a voice activated Emergency Dialer 260 and/or a Location Transmitter 270. A user may simply speak or verbalize a predetermined call for assistance, such as a word or phrase, e.g., "help" into the Microphone 275, or input the word "help" into the Communicator Controller 350 via the keypad 240 to make the Emergency Dialer 260 and/or a Location Transmitter 270 operational. Simply speaking or verbalizing the predetermined call for assistance, such as a word or phrase, e.g., "help" into the Microphone 275, such that the Communicator Controller 350 may drive the kit 205 or the Mobile Communicator 370 to call the Emergency Service Provider 180 and/or notify the Location Transmitter 270 when the user speaks the predetermined word or phrase into the Microphone 275 or inputs the word or phrase into the Communicator Controller 350 via the keypad 240.

Causes for such a call to the Emergency Service Provider 180 for help may include calls for any assistance, such as when hiking if the user may be lost and may need directions to find a safe resting place, or to be rescued because of unexpected weather or that there isn't time to return to safety before nightfall. Alternatively the user may be experiencing an emergency, such as a medical emergency or because of a threat against the user's safety.

The Communicator Controller 350 may drive an Emergency Dialer 260 and a Location Transmitter 270 for automatically dialing for example, 911, in the United States, and transmitting a location of the kit 205 or the Mobile Communicator 370 to an Emergency Service Provider 180. The Emergency Dialer 260 may communicate with the Emergency Service Provider 180 via a wire 270 or wirelessly. The Location Transmitter 270 may communicate with the Emergency Service Provider 180 via a wire 265 or wirelessly. The outgoing call to the Emergency Service Provider 180 may trigger the Location Transmitter 270. The Location Transmitter 270 may be activated by a cell phone signal provider, such as the Emergency Service Provider 180, resulting in a Locator Beacon 213 emitting a locator signal. Alternatively, the Enabling System 360 may contain preprogrammed commands and appropriately designated telephone numbers, e.g., "help, 911," or "call home, XXX-XXXX," or "call Emergency Service Provider, 911," or "police, XXX-XXXX," or "emergency, 911," so that the Enabling System 360 may enable all functions of the Mobile Communicator 370 including audible receiving and transmitting functions 680 and data retrieval and inaudible receiving functions 685 for communicating with the designated telephone number holders and trigger the Location Transmitter 270, so that a user may override the need to determine whether the conditions 420-480 have been satisfied by applying the yes/no logic of the Enabling Circuit 250 if they utter the command into the Microphone 275. The command may be a user identifying sound(s) or a verbal password that may be recognized by the Voice Recognition System 273, or a written command or password inputted into the Communicator Controller 350 via the keypad 240, and if the command has been determined to be essentially identical to or matches the preprogrammed or recorded command, the Enabling Circuit 250 may activate the Communication Controller 350 to enable the transmitting and audible receiving functions 680 of the Mobile Communicator 370, including triggering the Emergency Dialer 260 and/or the Location Transmitter 270. The Location Transmitter 270 may communicate with the Locator Beacon 213 via a wire 276 or wirelessly.

The Communicator Controller 350 may also drive the Emergency Dialer 260 and a Location Transmitter 270 when the user's voice or identifying sound(s) making the outgoing call to the Emergency Service Provider 180 has been authenticated by the Voice Recognition System 230. The voice recognition system 230 may recognize user identifying sound(s) described herein. Satisfaction of the at least one condition for enabling the Mobile Communicator's 370 audible receiving and transmitting functions 680 may require authentication of a user's voice by voice recognition or sound(s) recognition or password recognition. Entry of a password via a keypad 240 or authentication by the Voice Recognition System 230 may provide identification of the user to the Emergency Service Provider 180 and enabling of the Locator Beacon 213.

Referring to the Communicator Controller 350 driving the Location Transmitter 270, it may become necessary for a user to activate the Locator Beacon 213 in order to find the Mobile Communicator 370 if it may be lost or misplaced or obscured from view. Alternatively, when the kit 205 or the Mobile Communicator 370 may be lost or stolen a user may report this to any service provider or to the Emergency Service Provider 180 and a specific signal can be sent to the kit 205 or the Mobile Communicator 370 by the service provider or the Emergency Service Provider 180 which may activate the Location Transmitter 270 to transmit a location provided by the GPS Receiver 210 so the phone may be recovered.

In one embodiment, the user may call in to the Mobile Communicator 370 and instruct the Enabling Circuit 250 of the Enabling System 360 to drive the Communicator Controller 250 to trigger the Location Transmitter 270 and/or the Locator Beacon 213. The Enabling System may require the user to be voice or sound or password authenticated. If there is an interference from background noise that may interfere with reception from the microphone 275 when voice or sound or password authentication is used to trigger the Location Transmitter 270 and/or the Locator Beacon 213, the Location Transmitter 270 and/or the Locator Beacon 213 may be triggered by an input from the keypad 240, such as a password.

Adding the Enabling System 360 to a kit 205 or a Mobile Communicator 370, such as commercially available cell phones, may be an inexpensive improvement having improved functionality that may be easily implemented. The issue today is not does something need to be done to address the safety and privacy issues inappropriate cell phone use represents, but how to do it. One solution to these the safety and privacy issues is legislation requiring cell phones to be disabled whenever they pose safety or privacy risks. Communication devices disclosed in the prior art may be complicated and expensive so that using them to implement these legislative objectives would be politically impractical due to the hardship it would place on the general population. The low cost and simplicity of this device in conjunction with its improvements in emergency use and owner protection from unauthorized use or misuses if the Mobile Communicator 370 may be lost or stolen, makes such needed legislation feasible.

The Enabling System 360 of the kit 205 or the Mobile Communicator 370 may be designed so that the Enabling System 360 may enable a default state so that certain functions of the Mobile Communicator 370 may be disabled when use of the Mobile Communicator 370 may be unsafe or an intrusion upon the personal privacy of bystanders. Enabling the default state and its operation requires no generation of radio or other signal transmission that could create health risks or impinge on other types of communication.

The kit 205 or the Mobile Communicator 370 having the Enabling System 360 may be an improvement over cell phones that depend on a disabling signal of some type to be received in order for the phone to be disabled. Such cell phones may be subject to blocking systems or other workarounds being developed which would result in the cell phones remaining functional because they require a disabling signal, and preventing that signal from getting through may leave such cell phones enabled. In contrast, the Enabling System 360 of the kit 205 or the Mobile Communicator 370 may enable the Default Disabled State when certain required conditions, such as receiving a global positioning system (GPS) signal or receiving a privacy signal, may not be satisfied. Therefore, the Enabling System 360 that enables the enabled state of the Mobile Communicator 370 may not be subject to blocking systems or other workarounds being developed, because blocking the GPS signal or privacy signal in the Mobile Communicator 370 enables the Default Disabled State.

At no time does the function of the Enabling System 360 interfere, or create a condition which could interfere with receiving signals. On the contrary, the Enabling System 360 may require that the GPS Receiver 210 receive a GPS signal. In addition, the Enabling System 360 may also require voice, password or sound(s) authentication for enablement of the Mobile Communicator's 370 calling in/out and/or other functions. The Enabling System 360 may disable certain functions deemed inappropriate or unsafe if no GPS signal is received by the GPS processor 220 and the Enabling Circuit 250. Therefore, the Enabling System 360 that enables the enabled state of the Mobile Communicator 370 may not be subject to blocking systems or other workarounds being developed, such as disablement of the microphone 275, because blocking the microphone 275 in the Mobile Communicator 370 may enable the Default Disabled State.

At present the loss of communicators that rely on satisfying a security requirement to be disabled may result in the owner being exposed to the risks of unauthorized use delineated above. The Mobile Communicator 370 of the present invention may eliminate that risk without adversely impacting convenience or the ability to make emergency calls immediately.

In emergency situations the Mobile Communicator 370 of the present invention not only provides for less likelihood of operator error due to emergency, but also provides for a way to locate where the emergency call is coming from, since the GPS Receiver 210 may provide a geographic location of the Mobile Communicator 370. The kit 205 or the Mobile Communicator 370 having the Enabling System 360 may be a major improvement over cell phones that do not have the Enabling System 360 because the kit 205 or the Mobile Communicator 370 having the Enabling System 360 may lower risk of deploying emergency personnel to a wrong location, but it also allows emergency personnel to be immediately deployed to where help is required even if the person in need of help is only able to initiate the call due to becoming physically incapacitated or endangered. This approach offers significant improvements over cell phones not equipped with the Enabling System 360 of the present invention. Since at no time does the kit 205 or the Mobile Communicator 370 remain in the Default Disabled State 410 due to lack of GPS signal or inaudible sound(s). In emergency situations the kit 205 or the Mobile Communicator 370 can have audible receiving and transmitting functions 680 without concern of a stray signal or occurrence unintentionally disabling it as is possible with cell phones without the Enabling System 360 of the present invention. In an emergency situation, where time is of the essence, not having to try and push buttons will result not only in time savings but eliminate mistakes due to panic.

Figure 2:
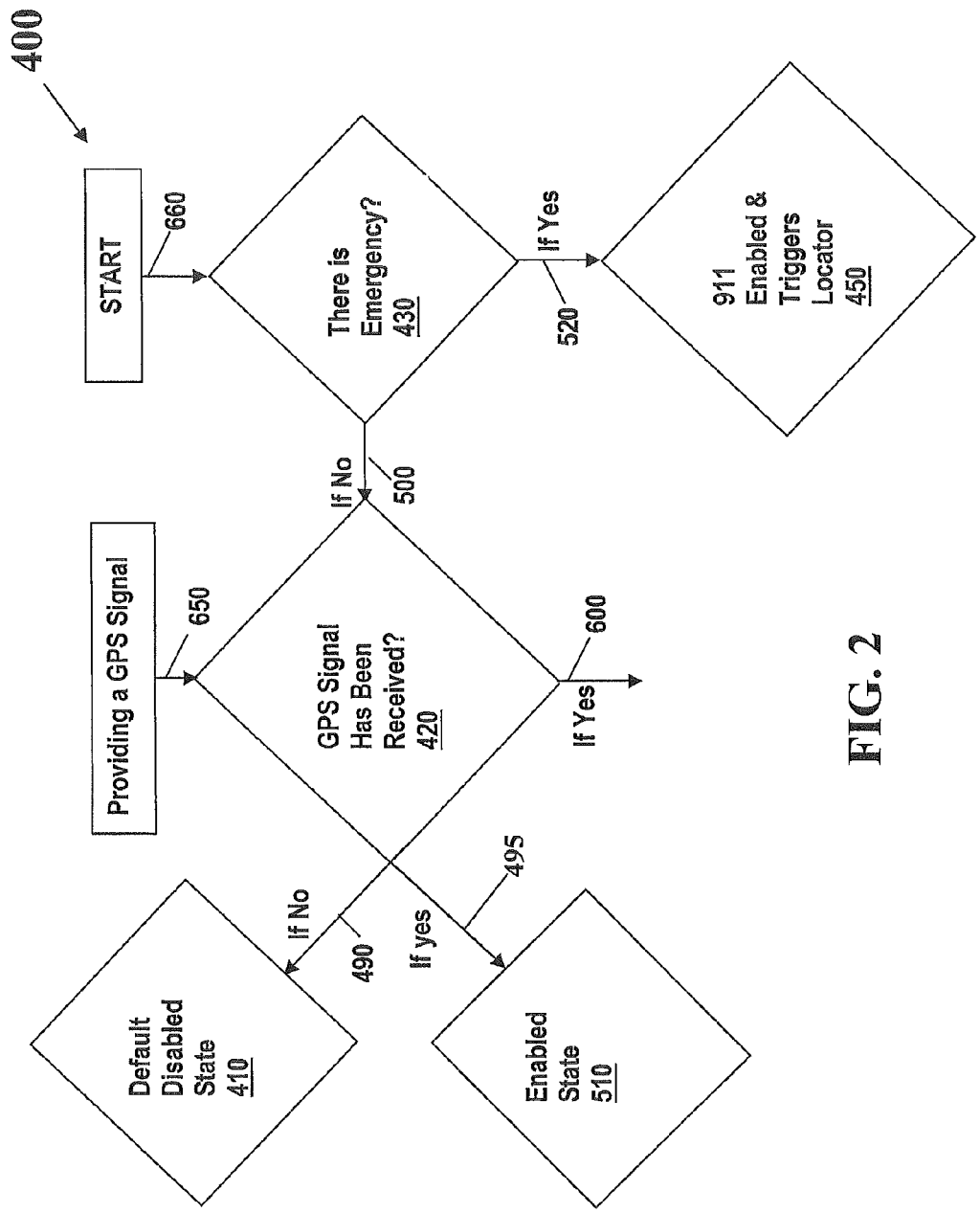
FIGS. 2-7 depict embodiments of method(s) for using the kit and the Mobile Communicator, in accordance with embodiments of the present invention.

FIG. 2 depicts embodiments of a method 400 for enabling the Mobile Communicator 370 using the Enabling System 360 to enable the kit 205, the Mobile Communicator 370 or similar communication device. In a step 650 of the method 400, notice that a GPS signal has been received by GPS Receiver 210 may be transmitted to the Enabling Circuit 250 via connection wire 247, or wirelessly, wherein the GPS Processor 220 may have received the GPS signal from the GPS Signal Amplifier 190 via connection wire 200, or wirelessly. Alternatively, notice that the GPS signal has been received by GPS Signal Amplifier 190, may be transmitted to the Enabling Circuit 250 by the GPS Signal Amplifier 190 via the wire 243, or wirelessly. The GPS signal from the GPS Processor 220 may be digital or analog. In the step 650 of the method 400, said receiving of the GPS signal may be an at least one condition 420 for enabling the kit 205 or the Mobile Communicator 370, and wherein outgoing calls to an Emergency Service Provider 180 are always enabled by the Enabling System 360. The Enabling Circuit 250 may enable calls from the kit 205 or the Mobile Communicator 370 to the Emergency Service Provider 180 by providing a contact closure that completes an electrical circuit in the Enabling Circuit 250 that may notify the Communicator Controller 350 that the GPS signal has been received, via a wire 225, or wirelessly, wherein the Communicator Controller 350 may enable the Emergency Dialer 260 to make the outgoing calls to the Emergency Service Provider 180.

In a step 660 of the method 400, a user may activate the Start Switch 203 on the kit 205 or the Mobile Communicator 370 that may enable the call to the Emergency Service Provider 180 and/or the Location Transmitter 270 of the kit 205 or the Mobile Communicator 370, if an at least one condition, e.g., that there is an emergency, has been satisfied. In the step 660, a logic of the Enabling Circuit 250 of the Enabling System 360 of the kit 205 or the Mobile Communicator 370 asks "There is an Emergency?" 430. If the emergency condition 430 has been satisfied, e.g., the user has spoken a word or command such as "help" into the Microphone 275, or input a message "emergency" via the Keypad 240, the user may be able to change the state of the kit 205 or the Mobile Communicator 370, from an initial Default Disabled State 410, as in step 660 "Start", to a 911 Enabled & Locator Triggered state 450 because such a word or command or input satisfies the at least one condition that there be an emergency, i.e. as in step 590 of the method 400. Hereinafter, a user calling or speaking a preprogrammed word, e.g., "help", or phrase, e.g., "this is an emergency", or "get help", into the Microphone 275 or inputting the preprogrammed word or phrase into the Communicator Controller 370 via the keypad 240 may signify there is an emergency and satisfies the condition that there be an emergency. In the step 590, the Enabling Circuit 250 may provide a contact closure that completes an electrical circuit in which the Enabling Circuit 250 notifies the Communicator Controller 350 via a wire 225, or wirelessly, that there has been an emergency. The Communicator Controller 350 may then trigger the Emergency Dialer 260 to call 911 and the Location Transmitter 270 to trigger the Locator Beacon 213.

In the methods 400, 450, and 465 described infra, the Start Switch 203 may be the contact closure, providing a contact closure to the Communicator Controller 350, via the wire 201, or wirelessly and completing an electrical circuit that may include the Communicator Controller 350 and at least one other component of the Enabling System 360, such as the Enabling Circuit 250, via the wire 225, or wirelessly, the Emergency Dialer 260, via the wire 235, or wirelessly, or the Location Transmitter 270, via the wire 255, or wirelessly. Completing the electrical circuit may enable the Communicator Controller 350 to change the state of the kit 205 or the Mobile Communicator 370 from a Default Disabled State 410 to an Enabled State 510, and to drive the receiving or transmitting functions of the kit 205 or the Mobile Communicator 370 depending that certain conditions 420, 430, 440, 450, 460, and 480 (420-480) may be satisfied. That the conditions 420-480 have been satisfied for the Mobile Communicator 370 may be periodically ascertained by a logic contained in the Enabling Circuit 250 of the Enabling System 360 as "yes, the condition has been satisfied, as in 495, 515, 525, 570, 575, 580, 590, 600, 707, 775, 790, 795, 797, 807, 875, 895, and 897. Alternatively, not satisfying the conditions 420-480 for the Mobile Communicator 370 may be periodically ascertained by a logic contained in the Enabling Circuit 250 of the Enabling System 360 as "no, the condition has not been satisfied, as in 490, 500, 510, 520, 530, 700, 730, 790, 800, 830, and 890. The answers to questions 495, 515, 525, 570, 575, 580, 590, 600, 707, 775, 790, 795, 797, 807, 875, 895, and 897, and 490, 500, 510, 520, 530, 700, 730, 790, 800, 830, and 890 may be provided periodically by the Enabling Circuit 250 via a connection wire 225, or wirelessly, to the Communicator Controller 350. Hereinafter, the process by which the Enabling Circuit 250 arrives at the answers to questions 495, 515, 525, 570, 575, 580, 590, 600, 707, 775, 790, 795, 797, 807, 875, 895, and 897, and 490, 500, 510, 520, 530, 700, 730, 790, 800, 830, and 890 is the Enabling Circuit Logic. An example of the Enabling Circuit Logic is periodically ascertaining that the conditions 420-480 exist for the Mobile Communicator 370, as in embodiments of the methods 400, 450 and 465, infra. Hereinafter periodically means at a prescribed frequency. In embodiments of the methods 400, 450 and 465, infra, if the answer to questions querying the conditions 420-480 are "Yes," then the state of the Mobile Communicator 370 may become the Enabled State 510, as in steps 495, 515, 525, 570, 575, 580, 590, 600, 707, 775, 790, 795, 797, 807, 875, 895, and 897. Alternatively, if the answers to questions querying the conditions 420-480 are "No," then the Mobile Communicator 370 may become a Default Disabled State 410, as in steps 490, 500, 510, 520, 530, 700, 730, 790, 800, 830, and 890. Periodic querying that the conditions 420-480 have been satisfied enables the Mobile Communicator 370 to alternate between states 510 and 410, depending on the length of time of the period. In embodiments of the methods 400, 450, and 465 the Enabling Circuit 250 may perform periodic querying that the conditions 420-480 have been satisfied for periods from about a second to about a minute. In the methods 400, 450, and 465, the Enabling Circuit 250 may perform periodic querying that the conditions 420-480 have been satisfied for periods from about 0.01 seconds to about 0.1 minutes. In the methods 400, 450, and 465, the Enabling Circuit 250 may perform periodic querying that the conditions 420-480 have been satisfied for periods from about 0.001 seconds to about 0.01 minutes.

In the method 400, if it may be ascertained, as in step 500 of the method 400, that there is no emergency, changing the kit 205 or the Mobile Communicator 370 from the initial Default Disabled State 410 to the Enabled State 510 may depend on satisfying a condition 420, i.e., "GPS signal has been received?". Hereinafter, enabling the transmitting and audible receiving functions 680 of the Mobile Communicator 370 is equivalent to changing the Mobile Communicator 370 from a Default Disabled State to an Enabled State. In a step 650, of the method 400, a GPS signal has been received by the GPS Signal Amplifier 190. In the step 650, if the GPS Processor 220 receives the GPS signal from the GPS Signal Amplifier 190, the GPS Receiver 210 may provide the GPS signal or a processed signal to the Enabling Circuit 250. The Enabling Circuit 250 may provide a contact closure that completes an electrical circuit in which the Enabling Circuit 250 notifies the Communicator Controller 350 via a wire 225, or wirelessly, that the GPS signal has been provided to the Enabling Circuit 250. Receiving the GPS signal, as in the step 660 of the method 400, by the GPS Receiver 210 and/or notice that the GPS signal has been received by the Communicator Controller 250 of the Mobile Communicator 370 may be an at least one condition for enabling the kit 205 or the Mobile Communicator 370, wherein outgoing calls from the Emergency Dialer 260 to an Emergency Service Provider 180 are always enabled by the Communication Controller 350. Hereinafter, references in this discussion to Mobile Communicator 370, mobile phone, cell phone, or mobile communication device are intended to refer to the encompassing meaning of a cell phone and/or mobile communication device under certain enabling conditions, wherein the Mobile Communicator 370 may default to the Disabled State 410 unless the at least one aforementioned conditions 420-480 are satisfied, and wherein that outgoing calls from the Emergency Dialer 260 to an Emergency Service Provider 180 and/or from the Location Transmitter 270 are always enabled by the Communication Controller 350.

In the step 495 of the method 400, if the Enabling System 360 of the kit 205 or the Mobile Communicator 370 determines that the condition 420 may be satisfied, i.e., that a GPS signal has been received and/or the Communicator Controller 350 has been notified that the GPS signal has been received by the Enabling Circuit 250, then the Enabling System 360 may enable an Enabled State 510 of the kit 205 or the Mobile Communicator 370, as in the step 495 of the method 400.

Alternatively, in the step 490 of the method 400, if the Enabling Circuit 250 of the kit 205 or the Mobile Communicator 370 determines, conversely, that the condition 420 has not been satisfied, i.e., that no GPS signal has been received by the Enabling Circuit 250, and/or the Communicator Controller 350 has not been notified that the GPS signal has been received by the Enabling Circuit 250, then the Enabling System 360 may enable a Default Disabled State 410 of the Mobile Communicator 370, as in the step 490 of the method 400.

Figure 3:
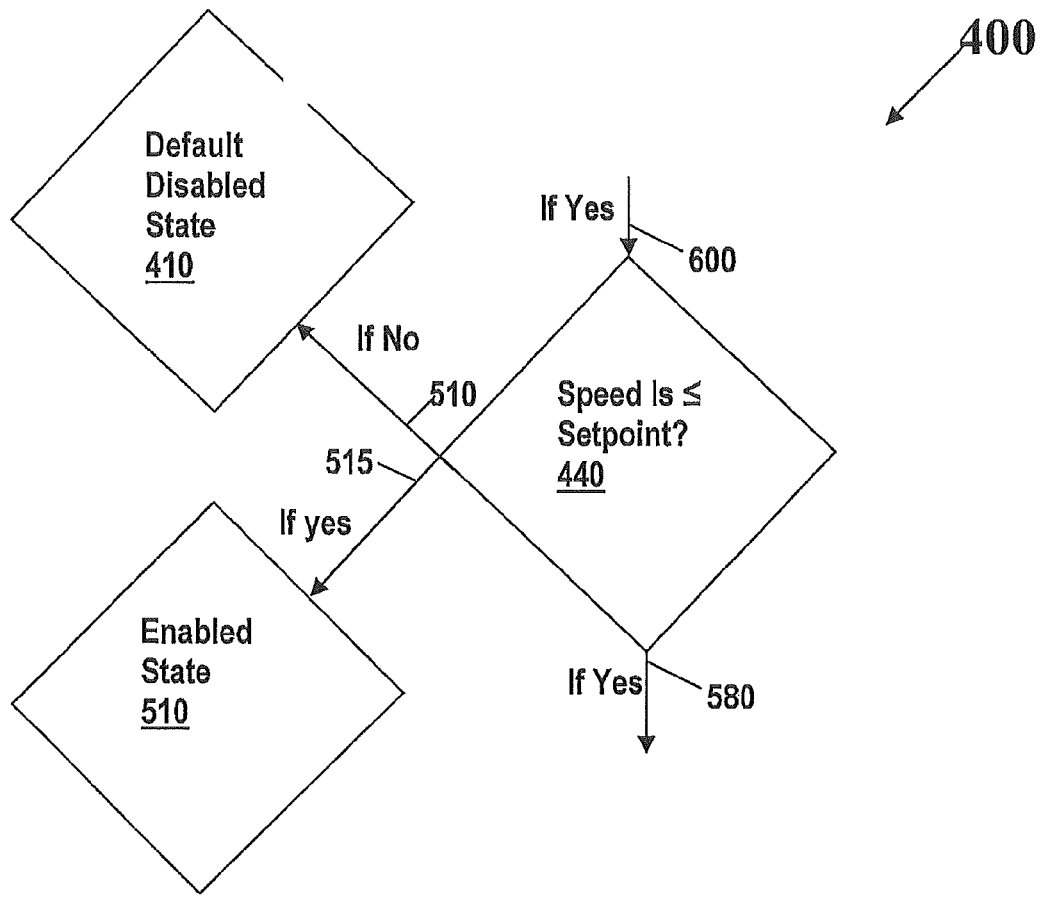

FIG. 3 depicts a continuation of FIG. 2, depicting embodiments of the method 400. If the Enabling System 360 has ascertained, as in the step 500 of the method 400, as depicted in FIG. 2 and described in associated text herein, that there is no emergency, and that a GPS signal has been received, in the step 600, instead of enabling the Mobile Communicator 370, as in the step 495, the Enabling System 360 may require that a condition 440, i.e., that a speed, $s_{f,i}$, of the Mobile Communicator 370, an average speed, $s_{avg}$, of the Mobile Communicator 370, or a normalized speed, ns, of the Mobile Communicator 370, may be less than or equal to ("≦") a setpoint speed. Hereinafter, "speed of the kit 205 or the Mobile Communicator 370" refers to each speed selected from the group consisting of the speed, $s_{f,i}$, of the kit 205 or the Mobile Communicator 370, an average speed, $s_{avg}$, of the kit 205 or the Mobile Communicator 370, or a normalized speed, ns, of the kit 205 or the Mobile Communicator 370.

A motion detector 228, such as a laser doppler non-contact speed and length gauge (Proton Products, 10 Aylesbury End, Beaconsfield, Bucks.HP9 LW1, England), may determine if the Mobile Communicator 370 may be in motion. Photo radar systems usually operate on the K-band at 24.15 GHz. The motion detector 228 may measure a speed of a vehicle in which the kit 205, or the Mobile Communicator 370 is used, using any appropriate speedometer typically used to determine the speed of a vehicle. The output from the speedometer may be provided to the Motion Detector 228 by the vehicle's speedometer 279 via mechanical, electrical signal, hydraulic or pneumatic means through a conduit or wire 272, or wirelessly.

IR Pulsed Laser Diode, available from Ingram Technologies, LLC, Rt 2, Box 2169, 6721 West, 4000 South Roosevelt, Utah 84066, to measure speed, distance and direction is the new generation replacement for the older Photo-Radar systems. By using beam width of less than one-degree, an accuracy level is achieved that can not be reached by the older radar systems. As the beam crosses the traffic lanes, it can only target one vehicle at a time and minimize the possibility of false readings. The beam can also be "gated" so that only vehicles within a set of distances will be read. The other feature of IR Pulsed Laser Diode is that a vehicle traveling in only one direction can be captured by the system, if desired.

The speed, $s_{f,i}$, of the kit 205 or the Mobile Communicator 370 may be determined by the GPS processor 220, such as a GPSTran (available from 5 Little Balmer, Buckingham Industrial Park, Buckingham MK18 1TF, United Kingdom), designed to provide a digital speed pulse output for use by other equipment. Because satellite GPS is used to measure speed, the GPSTran is suitable for use in many applications where normal speed sensing methods will not work. The update rate of the pulse output is 5 Hz with an accuracy of ±0.1 kmh. The pulse per meter setting is configurable to suit most applications.

The GPS Processor 220 may provide an initial $p_i$ and a final $p_f$ geographical position of the GPS Processor 220 for an initial time t, and a final time $t_f$, wherein a difference $(t_f-t_i)$ between the initial and final times $t_i$, $t_f$, represent a time interval, $x_{f,i}$, wherein $x_{f,i}$ may be any positive integer. Alternatively, the time interval $x_{f,i}$ may be from about 1 milli second to about $1 \times 10^3$ milli seconds. Alternatively, the time interval, $x_{f,i}$, may be from about 1 micro second to about $1 \times 10^6$ micro seconds. Alternatively, the time interval, $x_{f,i}$, may be from about 1 nano second to about $1 \times 10^9$ nano seconds. The time interval, $x_{f,i}$, may be from about 1 minute to about 5 minutes and a difference between the initial geographical position $p_i$ of the GPS Processor 220 and the final geographical position $p_f$ of the GPS Processor 220 may be from about 0.016 miles to about 2.5 miles. The speed, $s_{f,i}$, of the Mobile Communicator 370 may be represented by formula 1, as follows:

$$s_{f,i}=(p_f-p_i)/x_{f,i} \qquad \text{Formula 1}$$

The average speed, $s_{avg}$, of the Mobile Communicator 370, for a time interval, $x_j$, wherein j=1, 2, 3, . . . j, may be determined by the GPS processor 220, wherein the GPS Processor 220 may provide an initial geographical position, $p_i$, and a final geographical position, $p_f$, of the GPS Processor 220 for each time interval, $x_j$, and an initial time $t_i$ and a final time $t_f$ for each time interval, $x_j$, wherein a sum of the differences $\Sigma(t_f-t_i)_j$ for each initial and final time, $t_i$, $t_f$, for each time interval, $x_j$, may be represented as a sum of the time intervals, $\Sigma x_j$. A sum of the differences $\Sigma(p_f-p_i)_k$, where k=1, 2, 3, . . . k, between the initial and final geographical positions $p_i$, $p_f$, may represent a total distance that the kit 205 or the Mobile Communicator 370 may have traveled in each time interval $x_j$. The average speed, $s_{avg}$, of the Mobile Communicator 370 may be represented by formula 2, as follows:

$$s_{avg}=\Sigma(p_f-p_i)_j/\Sigma x_j \qquad \text{Formula 2}$$

The normalized speed, ns of the Mobile Communicator 370, for a time interval, $X_m$, where m=1, 2, . . . m, determined by the GPS processor 220, wherein the GPS Processor 220 may provide an initial speed $s_i$ of the Mobile Communicator 370, and a fraction of time at the initial speed $s_i$, and a final speed, $s_f$, of the Mobile Communicator 370, and fraction of time at the final speed, $s_f$. The time, $t_{si}$, may be the time at speed $s_i$ and the time $t_{sf}$ may be the time at speed $s_f$. Therefore, the fraction of time at the first speed $s_i$ may be represented as $t_{si}/(t_{si}+t_{sf})$. In like manner, the fraction of time at the second speed $s_f$ may be represented as $t_{sf}/(t_{si}+t_{sf})$. The GPS processor 220 may calculate the normalized speed, ns, of the Mobile Communicator 370 as in the following Formula 3:

$$ns=s_i \times \text{fraction of time at } s_i + s_f \times \text{fraction of time at } s_f \qquad \text{Formula 3}$$

A logic of the Enabling Circuit 250 may provide a contact closure that completes an electrical circuit in which the Enabling Circuit 250 notifies the Communicator Controller 350 via a wire 225, or wirelessly, that the Motion Detector 228 has provided confirmation that the speed of the kit 205 or the Mobile Communicator 370 is ≦the setpoint speed to the Enabling Circuit 250 via wire 229, or wirelessly, based on the Motion Detector 228 receiving a speed of the kit 205 or the Mobile Communicator 370 from the speedometer 279 via a wire 272, or wirelessly. Said completion of the electrical circuit and confirmation that the speed of the kit 205 or the Mobile Communicator 370 is ≦the setpoint speed to the Enabling Circuit 250 via a wire 223, or wirelessly, may be the at least one condition for enabling the Enabling System 360 of the kit 205 or the Mobile Communicator 370, and wherein outgoing calls from the Emergency Dialer 260 to an Emergency Service Provider 180 may always be enabled by the Communication Controller 350.

In the step 515 of the method 400, if the Enabling System 360 of the kit 205 or the Mobile Communicator 370 determines that the condition 440 may be satisfied, i.e., that the Mobile Communicator 370 speed may be ≦the setpoint, then the Enabling System 360 may enable an Enabled State 510 of the Mobile Communicator 370, as in the step 515 of the method 400.

Alternatively, in the step 510 of the method 400, if the Enabling System 360 of the kit 205 or the Mobile Communicator 370 determines, conversely, that the condition 440 may not be satisfied, i.e., that the Mobile Communicator 370 speed not be ≦the setpoint speed, then the Enabling System 360 may enable a Default Disabled State 410 of the Mobile Communicator 370, as in the step 510 of the method 400.

Figure 4:
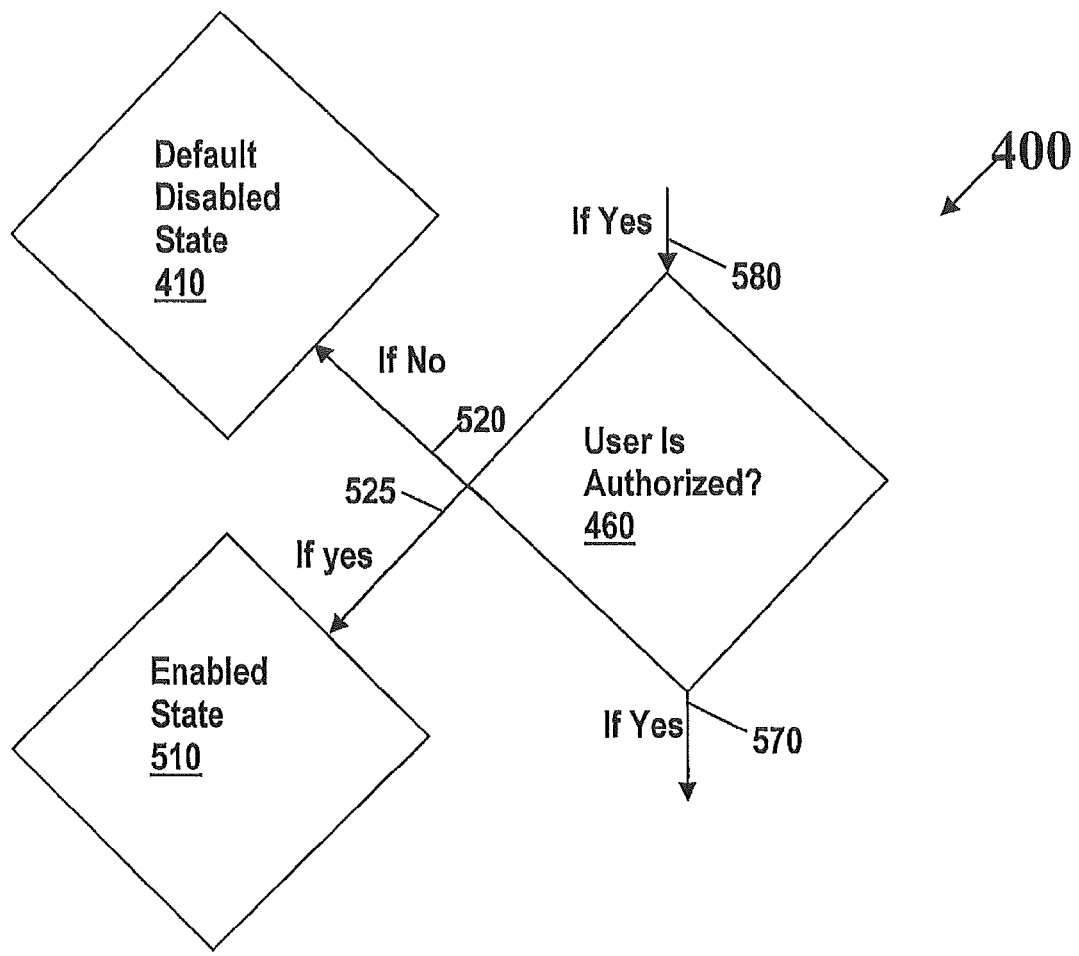

FIG. 4 depicts a continuation of FIG. 3, depicting embodiments of the method 400. If the Enabling System 360 has ascertained as in the step 500 of the method 400, as depicted in FIG. 2 and described in associated text herein, that there is no emergency, and that the GPS signal has been received, in the step 580, instead of enabling the Mobile Communicator 370, as in the step 515, the Enabling System 360 may require that a condition 460, i.e. that a user of the kit 205 or the Mobile Communicator 370 be authorized. In the step 580, if the voice recognition system 230 receives a user identifying sound(s) such as a user's identifying voice or identifying frequency or tone (hereinafter user-identifying sound(s) from the microphone 275. If the user identifying sound(s) match or have the same frequencies as a preprogrammed voice or preprogrammed frequency, the voice recognition system 230 may provide confirmation of voice recognition to the Enabling Circuit 250. The preprogrammed user identifying sound(s) may be in a frequency range that may be audible or inaudible to humans. For example, a dog whistle may emit sound(s) that may be inaudible to humans. Humans hear frequencies between about 20 cycles/sec to 20,000 cycles/sec at 130 db (very loud). This shrinks to a range of about 700 cycles/sec to 6000 cycles/sec at 0 db (very faint).

Alternatively, the user identifying sound(s) may be a tone from a tuning fork that naturally resonates at an established frequency or set of frequencies, i.e., sound(s), such as the note C in the key of C major that is equivalent to middle C on a standard piano, may be audible to humans.

A logic of the Enabling Circuit 250 may provide a contact closure that completes an electrical circuit in which the Enabling Circuit 250 notifies the Communicator Controller 350 via a wire 225, or wirelessly, that the Voice Recognition System 230 has provided confirmation of the voice recognition to the Enabling Circuit 250 via wire 223, or wirelessly. Said completion of the electrical circuit and confirmation of the voice recognition to the Enabling Circuit 250 via a wire 223, or wirelessly, may be the at least one condition for enabling the Enabling System 360 of the kit 205 or the Mobile Communicator 370, and wherein that outgoing calls from the Emergency Dialer 260 to an Emergency Service Provider 180 may always be enabled by the Communication Controller 350.

In the step 525 of the method 400, if the Enabling System 360 of the kit 205 or the Mobile Communicator 370 determines that the condition 460 may be satisfied, i.e., that the user has been authorized, then the Enabling System 360 may enable the Enabled State 510 of the Mobile Communicator 370, as in the step 525 of the method 400.

Alternatively, in the step 520 of the method 400, if the Enabling System 360 of the kit 205 or the Mobile Communicator 370 determines, conversely, that the condition 460 may not be satisfied, i.e., that the user has not been authorized, then the Enabling System 360 may enable a Default Disabled State 410 of the Mobile Communicator 370, as in the step 520 of the method 400.

Figure 5:
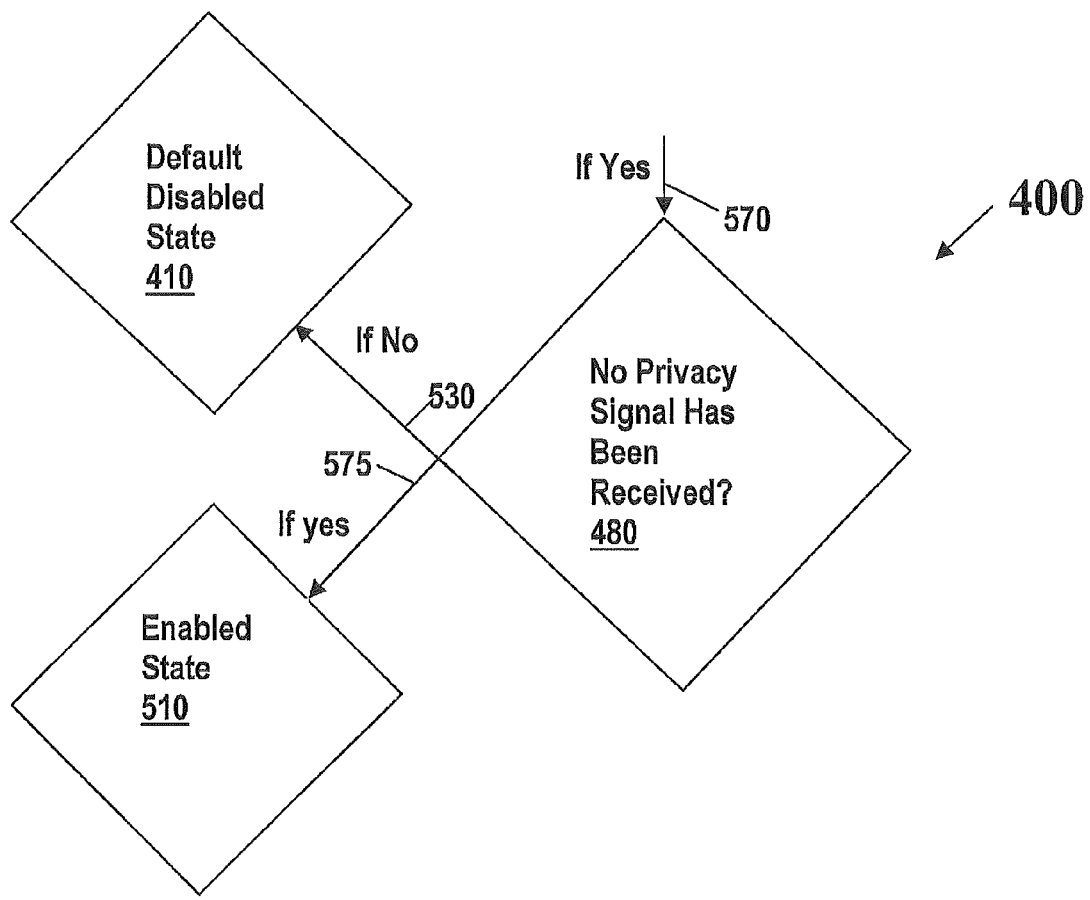

FIG. 5 depicts embodiments of a method 400 for enabling the Mobile Communicator 370 using the Enabling System 360 to enable the kit 205, the Mobile Communicator 370 or similar communication device. If the Enabling System 360 has ascertained as in the step 500 of the method 400, as depicted in FIG. 2 and described in associated text herein, that there is no emergency and that the GPS signal has been received, in the step 570, instead of enabling the Mobile Communicator 370, as in the step 525, the Enabling System 360 may require that a condition 480, i.e. "No Privacy Signal Has Been Received", be satisfied, so that the Enabling Circuit 250 may communicate to the Communicator Controller 350 to drive audible receiving and transmitting functions 680, thereby enabling the Enabled State 510 of the kit 205 or the Mobile Communicator 370.

In the step 570, if the Privacy Receiver System 273 receives a privacy signal from the Privacy Signal Generator 271, the Privacy Receiver System 273 may provide the privacy signal or a processed signal to the Enabling Circuit 250. In the step 570, the Enabling System 360 may or may not receive a privacy signal. A logic of the Enabling Circuit 250 may determine that the condition 480, i.e., "No Privacy Signal Has Been Received?", has been satisfied, as in step 575 or is not satisfied, as in the step 530. If the condition 480 has not been satisfied, as in the step 530, i.e., a privacy signal has been received, e.g., when privacy is desirable or when piracy of trade secrets, for example, is to be discouraged, the Enabling Circuit 250 communicates that the condition 480 has not been satisfied to the Communicator Controller 350. Alternatively, if the condition 480 has been satisfied, i.e. no privacy signal may have been detected by the Privacy Signal Receive System 273, as in the step 575, the Communicator Controller 350 may enable the Enabled State 510 and the phone becomes enabled.

A purpose of defeating or working around the privacy signal condition 480 may be to make an outgoing phone call. Embodiments in which enabling the Enabled State 510 of the kit 205 or the Mobile Communicator 370 may be conditioned on satisfying the condition 480, i.e. that No Privacy Signal Has Been Received, may be an improvement over cell phones that require a privacy signal for enablement because no privacy signal may be needed to enable the Enabled State 510 of the kit 205 or the Mobile Communicator 370. Conditioning enablement of the kit 205 or the Mobile Communicator 370 on satisfying the condition 480, i.e. that No Privacy Signal Has Been Received, may be an improvement over cell phones that require a privacy signal for enablement because a user seeking to block the privacy signal that disables the kit 205 or Mobile Communicator 370 must also block the Microphone 275, thus defeating the ability to make the outgoing call because both the user's voice and the privacy signal may be received by the Microphone 275 in order for the user to make the outgoing call.

In the enabled Default Disabled State 410, the receiving or transmitting functions of the kit 205 or the Mobile Communicator 370 may remain disabled, even though the Start Switch 203 has been activated in the step 660 of the method 400, as depicted in FIG. 2, and described in associated text, herein. Conditioning disablement of the kit 205 or the Mobile Communicator 370 on receiving the privacy signal through the Microphone 275 instead of through wire 268 or wirelessly from the antenna 274 of the Privacy Signal Generator 278 may avoid the majority of the privacy and piracy (theft of trade secrets or business confidential information) issues because audible receiving and transmitting functions 680 of the kit 205 or the Mobile Communicator 370 may remain in the Default Disabled State 410 unless the Enabling System 360 of the kit 205 or the Mobile Communicator 370 does not receive the privacy signal. Alternatively, privacy and piracy incidents may be avoided during indoor usage of the kit 205 or the Mobile Communicator 370 since the GPS signal also may not be available due to indoor blocking of the line of sight to the source of the GPS signal, such as a GPS satellite. Transmitting and receiving functions of the kit 205 and the Mobile Communicator 370 my remain disabled because the at least one condition for enabling the Enabling System 360 of the kit 205 or the Mobile Communicator 370, i.e., receiving a GPS signal, has not been satisfied, and wherein that outgoing calls from the Emergency Dialer 260 to an Emergency Service Provider 180 may always be enabled by the Communication Controller 350. During indoor usage, if a GPS signal has not been received by the GPS Receiver 210, the Default Disabled State 410 of the kit 205 or the Mobile Communicator 370 may be enabled as in the step 490 of the method 400. In the unlikely situation a GPS signal is available in a building (GPS typically requires line of sight to work) and the owner/occupants wish to disable phones in this area this can be done by the installation of a wide range of inexpensive and readily available blocking devices that will allow them to create a no GPS signal area. For example, a Cell-Block-R Control Unit, available from Quiet Cell Technologies Inc., 57 Waterford Drive, Ottawa ON K2E 7V4: CANADA, may act as a kind of decoy cellular tower. Where its use may no be prohibited, the Cell-Block-R Control Unit may remove the kit 205 or the Mobile Communicator 370 from a regular cell phone service provider by supplying a decoy communication signal. Any incoming calls may be referred to voice mail.

In the method 400 for using the kit 205 or the Mobile Communicator 370, a logic of the Enabling Circuit 250 may condition enablement of the Enabled State 510 on the Enabled Circuit 250 not receiving the privacy signal or processed privacy signal from the Privacy Signal Receiver 273 via Microphone 275. Conditioning enabling the Enabled State 510 on the Enabled Circuit 250 on not receiving the privacy signal or processed privacy signal from the Privacy Signal Receiver 273 via the Microphone 275 will also prevent most usage of the Mobile Communicator 370 in ground passenger vehicles or carriers such as cars, trucks, trains, buses and the like, or in airplanes if use of the kit 205 or the Mobile Communicator 370 may interfere with the passengers enjoyment of their quiet and solitude or if trade secrets, confidential or proprietary information may be improperly disclosed because the privacy signal could be provided when it may be improper to use the Mobile Communicator 370 in such vehicles or carriers. When prevention of indoor use of the kit 205 or the Mobile Communicator 370 is desired, and the kit 205 or the Mobile Communicator 370 has received a GPS signal from, for example, the antenna 271 being in the line of sight of the GPS signal from the GPS satellite, a Privacy Signal Generator 278 may provide a privacy signal to the Privacy Receiver System 273 for indoor enablement of the Default Disabled State 410 of the kit 205 or the Mobile Communicator 370, as in the step 530 of the method 400. Any appropriate system for enhancing the GPS signal may be used to provide the GPS signal to the GPS Receiver 210 during indoor or other applications where the GPS antenna 271 may not be in the line of sight of the GPS signal from the GPS Satellite.

In the method 400 for using the kit 205 or the Mobile Communicator 370, a logic of the Enabling Circuit 250 may provide a contact closure that completes an electrical circuit in which the Enabling Circuit 250 notifies the Communicator Controller 350 via a wire 225, or wirelessly, that the Enabling Circuit 250 may not have received the privacy signal or a processed privacy signal from the Privacy Receiver System 273 via the wire 241, or wirelessly. Said completion of the electrical circuit and confirmation of notice to the Communicator Controller 350 by the Enabling Circuit 250 via a wire 225, or wirelessly, may be the at least one condition for enabling the kit 205 or the Mobile Communicator 370, and wherein outgoing calls from the Emergency Dialer 260 to an Emergency Service Provider 180 may always be enabled by the Communication Controller 350.

It has been stated that the Enabling System 360 of the kit 205 or the Mobile Communicator 370 may be an improvement over mobile communicators that may be disabled by receiving a disabling signal because the disabling signal of such devices may be blocked or interfered with or they may fail, leaving the mobile communicator in an Enabled State because that is the default state when the disabling signal is not received. Conversely, the Enabling System 360 may be an improvement because the default state of the Mobile Communicator 370 may be a Default Disabled State 410 because the kit 205 or the Mobile Communicator 370 may be disabled if the GPS Signal Amplifier 190 does not receive a GPS signal, as in the step 490 of the method 400, as described in FIG. 2 and associated text, supra.

The GPS signal may be any standard GPS signal. GPS satellites transmit two low power radio signals, designated L1 and L2. Civilian GPS uses the L1 frequency of 1575.42 MHz in the UHF band. The signals travel by line of sight, meaning they will pass through clouds, glass and plastic but will not go through most solid objects such as buildings and mountains. In the step 650, the Enabling System 360 may or may not receive a GPS signal. The logic of the Enabling Circuit 250 may determine that the condition 420, i.e., "GPS signal has been received?", is satisfied, as in step 495 or is not satisfied, as in the step 490. If no GPS signal is available (typically indoors or in most vehicles), the Enabling Circuit 250 communicates that the condition 420 is satisfied to the Communicator Controller 350. If the GPS signal is not detected, as in the step 490, the Communicator Controller 350 may enable the Default Disabled State 410 and the Mobile Communicator 370 remains disabled. This embodiment is an improvement over cell phones not having the Enabling System 360 in that if for any reason (intentional or unintentional) the GPS signal is not available in the step 650, the Mobile Communicator 370 stays in its default disabled mode 410.

Conditioning enablement of the Mobile Communicator 370 on receiving the GPS signal, instead of conditioning disablement on receiving a disabling signal, as in cell phones not having the Enabling System 360, may avoid the majority of the privacy and piracy (theft of trade secrets or business confidential information) issues, since privacy and piracy issues arise mostly in indoor usage of the Mobile Communicator 370, where the GPS signal usually is not available. In the unlikely situation a GPS signal is available in a building (GPS typically requires line of sight to work) and the owner/occupants wish to disable phones in this area this can be done by the installation of a wide range of cheap and readily available blocking materials that will allow them to create a privacy area. This feature will also prevent most usage in cars and airplanes where it would be a safety hazard because a GPS signal is most often not available in cars or airplanes. When indoor use of the Mobile Communicator 370 is desired, an antenna 271 may provide a GPS signal to the GPS Signal Amplifier 190 for indoor enablement of the Mobile Communicator 370. Alternatively, the antenna 271 may provide better reception for the GPS Signal Amplifier 190 than an internal antenna with which most GPS Receivers 210 may be equipped.

Referring to FIG. 2, although there are unlimited applications for the Enabling System 360, the inventor of the present invention submits the following three embodiments for employing the method 400 and the Enabling System 360, as depicted in FIG. 1, supra, to enable the states 410, 450, and/or 510 of the Mobile Communicator 370.

In Example 1, if the Enabling System 360 of the kit 205 or the Mobile Communicator 370 determines that the condition 440 may be satisfied, i.e., that the Mobile Communicator 370 speed may be ≦the setpoint, then transmitting and audible receiving functions 680 of the Mobile Communicator 370 may be enabled, as described in Example 1, as follows.

Example 1

Enabling the Kit 205 or the Mobile Communicator 370 in a Moving Vehicle

Referring to FIG. 2, and associated text, herein, in a step 650 of the method 400 for enabling the kit 205, the Mobile Communicator 370 or similar communication device, notice that a GPS signal has been received by GPS Receiver 210 may be transmitted to the Enabling Circuit 250 via connection wire 247, or wirelessly, wherein the GPS Processor 220 may have received the GPS signal from the GPS Signal Amplifier 190 via connection wire 200, or wirelessly. Alternatively, notice that a GPS signal has been received by GPS Signal Amplifier 190 may be transmitted by the GPS Signal Amplifier 190 to the Enabling Circuit 250 via connection wire 243, or wirelessly. The GPS signal from the GPS Processor 220 may be digital or analog. In the step 650 of the method 400, said receiving of the GPS signal may be an at least one condition 420 for enabling the kit 205 or the Mobile Communicator 370, and wherein outgoing calls to an Emergency Service Provider 180 may always be enabled by the Enabling System 360. The Enabling Circuit 250 may enable calls from the kit 205 or the Mobile Communicator 370 to the Emergency Service Provider 180 by providing a contact closure that completes an electrical circuit in which the Enabling Circuit 250 notifies the Communicator Controller 350 that the GPS signal has been received, via a wire 225, or wirelessly, wherein the Communicator Controller 350 may enable the Emergency Dialer 260 to make the outgoing calls to the Emergency Service Provider 180.

In a step 660 of the method 400, a user may activate the "Start Switch" 203 on the kit 205 or the Mobile Communicator 370 that may enable the call to the Emergency Service Provider 180 and/or the Location Transmitter 270 of the kit 205 or the Mobile Communicator 370, if an at least one condition, e.g., that there is an emergency, has been satisfied. In the step 660, a logic of the Enabling Circuit 250 of the Enabling System 360 of the kit 205 or the Mobile Communicator 370 asks "There Is an Emergency?" 430. If the emergency condition 430 has been satisfied, e.g., the user has spoken a word or command such as "help" into the Microphone 275, or input a message "emergency" via the Keypad 240, the user may be able to change the state of the kit 205 or the Mobile Communicator 370, from an initial Default Disabled State 410, as in step 660 "Start", to a 911 Enabled & Locator Triggered state 450 because such a word or command or input satisfies the at least one condition that there be an emergency, i.e. as in step 590 of the method 400. In the step 590, the Enabling Circuit 250 may provide a contact closure that completes an electrical circuit in which the Enabling Circuit 250 notifies the Communicator Controller 350 via a wire 225, or wirelessly that may trigger the Emergency Dialer 260 to call 911 and the Location Transmitter 270 to trigger the Locator Beacon 213.

Referring to FIG. 3 and described in associated text herein, if the Enabling System 360 has ascertained as in the step 500 of the method 400, as depicted in FIG. 2 and described in associated text herein, that there is no emergency, and that a GPS signal has been received, in the step 600, instead of enabling the Mobile Communicator 370, as in the step 495, the Enabling System 360 may enable audible receiving and transmitting functions 680 of the kit 205 or the Mobile Communicator 370 if a condition 440, i.e., that a speed, $s_{f,i}$, of the Mobile Communicator 370, an average speed, $s_{avg}$, of the Mobile Communicator 370, or a normalized speed, ns, of the Mobile Communicator 370, may be less than or equal to ("≦") a setpoint speed, wherein the setpoint may be a maximum speed such as any speed from about 0 to about 10 mph. Alternatively, the setpoint may be from about 0 to about 30 mph. It has been found that only enabling Mobile Communicator 370, e.g., cell phone, use in moving vehicles when the vehicles are moving at a speed≦the setpoint may be a major public safety need that may be advanced by use of the kit 205 or the Mobile Communicator 370 and the Enabling System 360, in accordance with the method 400.

Transmitting and audible receiving functions 680 of the Kit 205 or the Mobile Communicator 370 may be enabled when the condition 480, i.e., that no privacy signal has been received by the Privacy Receiver System 273 has been satisfied, as described in Example 2, as follows.

Example 2

Enabling the Kit 205 or the Mobile Communicator 370 when Privacy or Security May be an Issue When Privacy or Security May be an Issue a method 450 for enabling the Mobile Communicator 370 using the Enabling System 360 to enable the kit 205, the Mobile Communicator 370 or similar communication device. In a step 750 of the method 450 for enabling the kit 205, the Mobile Communicator 370 or similar communication device, notice that a GPS signal has been received by GPS Receiver 210 may be transmitted to the Enabling Circuit 250 via connection wire 247, or wirelessly, wherein the GPS Processor 220 may have received the GPS signal from the GPS Signal Amplifier 190 via connection wire 200, or wirelessly. Alternatively, notice that the GPS signal has been received by GPS Signal Amplifier 190, may be transmitted to the Enabling Circuit 250 by the GPS Signal Amplifier 190 via the wire 243, or wirelessly. The GPS signal from the GPS Processor 220 may be digital or analog. In the step 750 of the method 450, said receiving of the GPS signal may be an at least one condition 420 for enabling the kit 205 or the Mobile Communicator 370, and wherein outgoing calls to an Emergency Service Provider 180 may always be enabled by the Enabling System 360.

The Enabling Circuit 250 may enable calls from the kit 205 or the Mobile Communicator 370 to the Emergency Service Provider 180 by providing a contact closure that completes an electrical circuit in which the Enabling Circuit 250 notifies the Communicator Controller 350 that the GPS signal has been received, via a wire 225, or wirelessly, wherein the Communicator Controller 350 may enable the Emergency Dialer 260 to make the outgoing calls to the Emergency Service Provider 180.

In a step 760 of the method 450, a user may activate the "Start Switch" 203 on the kit 205 or the Mobile Communicator 370 that may enable the transmitting and receiving functions of the kit 205 or the Mobile Communicator 370, if an at least one condition, e.g., that there is an emergency, has been satisfied. In the step 760, a logic of the Enabling Circuit 250 of the Enabling System 360 of the kit 205 or the Mobile Communicator 370 asks "There is an Emergency?" 430. In the step 797, if the emergency condition 430 has been satisfied, e.g., the user has spoken a word or command such as "help" into the Microphone 275, or input a message "emergency" via the Keypad 240, the user may be able to change the state of the kit 205 or the Mobile Communicator 370, from an initial Default Disabled State 410, as in step 760 "Start", to a 911 Enabled & Locator Triggered state 450 because such a word or command or input satisfies the at least one condition that there be an emergency, i.e. as in step 790 of the method 450. In the step 797, the Enabling Circuit 250 may provide a contact closure that completes an electrical circuit in which the Enabling Circuit 250 notifies the Communicator Controller 350, via a wire 225, or wirelessly, that may trigger the Emergency Dialer 260 to call 911 and the Location Transmitter 270 to trigger the Locator Beacon 213.

Alternatively, if there is no emergency, as in the step 700 of the method 450, the audible receiving and transmitting functions 680 of the kit 205 or the Mobile Communicator 370 may be enabled, as in the step 795, if the Enabling System 360 of the kit 205 or the Mobile Communicator 370 determines that the condition 420 may be satisfied, i.e., that a GPS signal has been received. In the step 795, the Enabling Circuit 250 notifies the Communicator Controller 350 that the GPS signal has been received from the GPS Receiver 210. The Enabling Circuit 250 may provide a contact closure that completes an electrical circuit in which the Enabling Circuit 250 notifies the Communicator Controller 350, via a wire 225, or wirelessly, that the GPS signal has been provided to the Enabling Circuit 250. In the step 795, the Enabling System 360 may enable the audible receiving and transmitting functions 680 of the kit 205 or the Mobile Communicator 370 by changing the state of the kit 205 or the Mobile Communicator 370 from the Default Disabled State 410 to the Enabled State 510.

Alternatively, in the step 790 of the method 450, the Enabling Circuit 250 of the kit 205 or the Mobile Communicator 370 has determined, conversely, that the condition 420 has not been satisfied, i.e., that no GPS signal has been received by the Enabling Circuit 250. In the step 790, the state of the kit 205 or the Mobile Communicator 370 remains in the Default Disabled State 410 so audible receiving and transmitting functions 680 of the kit 205 or the Mobile Communicator 370 may not be enabled.

In the steps 795 and 790, a logic of the Enabling Circuit 250 may determine that the condition 420, i.e., "GPS signal has been received?", has been satisfied, as in step 795 or is not satisfied, as in the step 790. In the step 790, if no GPS signal has been received, e.g., when the GPS signal is not in line of sight of the GPS Signal Amplifier 190, e.g., when the GPS Signal Amplifier 190 may be indoors in a building, automobile, or airplane, the Enabling Circuit 250 communicates that the condition 420 has not been satisfied to the Communicator Controller 350. If no GPS signal may be detected, as in the step 790, the Communicator Controller 350 may enable the Default Disabled State 410 and the Mobile Communicator 370, e.g., the cell phone, remains disabled.

Figure 6:
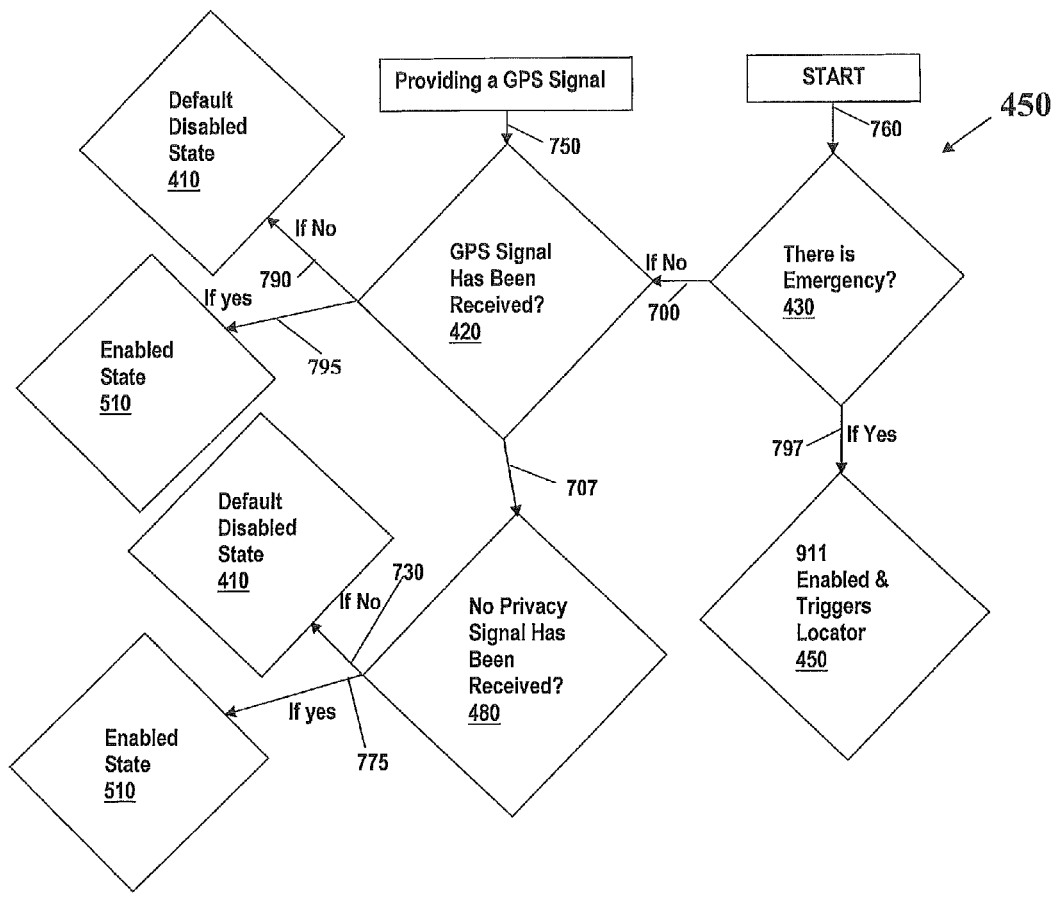

Referring to FIG. 6, if the Enabling System 360 has ascertained as in the step 700 of the method 450, that there is no emergency, and that the GPS signal has been received, in the step 707, instead of enabling the Mobile Communicator 370, as in the step 795, the Enabling System 360 may require that a condition 480, i.e. that the Privacy Receiver System 273 of the kit 205 or the Mobile Communicator 370 has not received a privacy signal.

In the step 707 of the method 450, the Enabling System 360 may or may not receive a privacy signal. In the step 707, if the Privacy Receiver System 273 receives a privacy signal from the Privacy Signal Generator 271, the Privacy Receiver System 273 may provide the privacy signal or a processed signal to the Enabling Circuit 250. A logic of the Enabling Circuit 250 may determine that the condition 480, i.e., "No Privacy Signal Has Been Received?", has not been satisfied, as in step 730 of the method 450. If a privacy signal has been received, e.g., when privacy is desirable or when piracy of trade secrets, for example, is to be discouraged, the Enabling Circuit 250 communicates that the condition 480 has not been satisfied to the Communicator Controller 350.

Alternatively, if no privacy signal may be detected, as in the step 775 of the method 450, the Communicator Controller 350 may enable the Enabled State 510 and the audible receiving and transmitting functions 680 of the Mobile Communicator 370, e.g., a cell phone, may be enabled. Examples of areas where kit 205 or the Mobile Communicator 370 use may be appropriate, safe, or not a security risk include airplanes before takeoff, non-private places outside doctor's offices, outside locker rooms, outside sensitive corporate or private public buildings, outside theatres, and the like. Examples of areas where kit 205 or Mobile Communicator 370 use may be appropriate, safe, or not a security risk include any public or private place that for privacy or safety reasons needs to have kit 205 or Mobile Communicator 370, e.g., cell phone, usage controlled.

Alternatively, if a privacy signal has been not been received, e.g., when privacy is not needed or when use of the kit 205 or the Mobile Communicator 370, for example, may be encouraged, the Enabling Circuit 250 communicates that the condition 480 has been satisfied to the Communicator Controller 350. If the privacy signal may not be detected, as in the step 775, the Communicator Controller 350 may enable the Enabled State 510 and the audible receiving and transmitting functions 680 of the Mobile Communicator 370, e.g., the cell phone, may be enabled.

Transmitting and audible receiving functions 680 of the Kit 205 or the Mobile Communicator 370 may be enabled when the condition 460, i.e., that the user has been confirmed by the Voice Recognition System 230 has been satisfied, as described in Example 3, as follows.

Example 3

Figure 7:
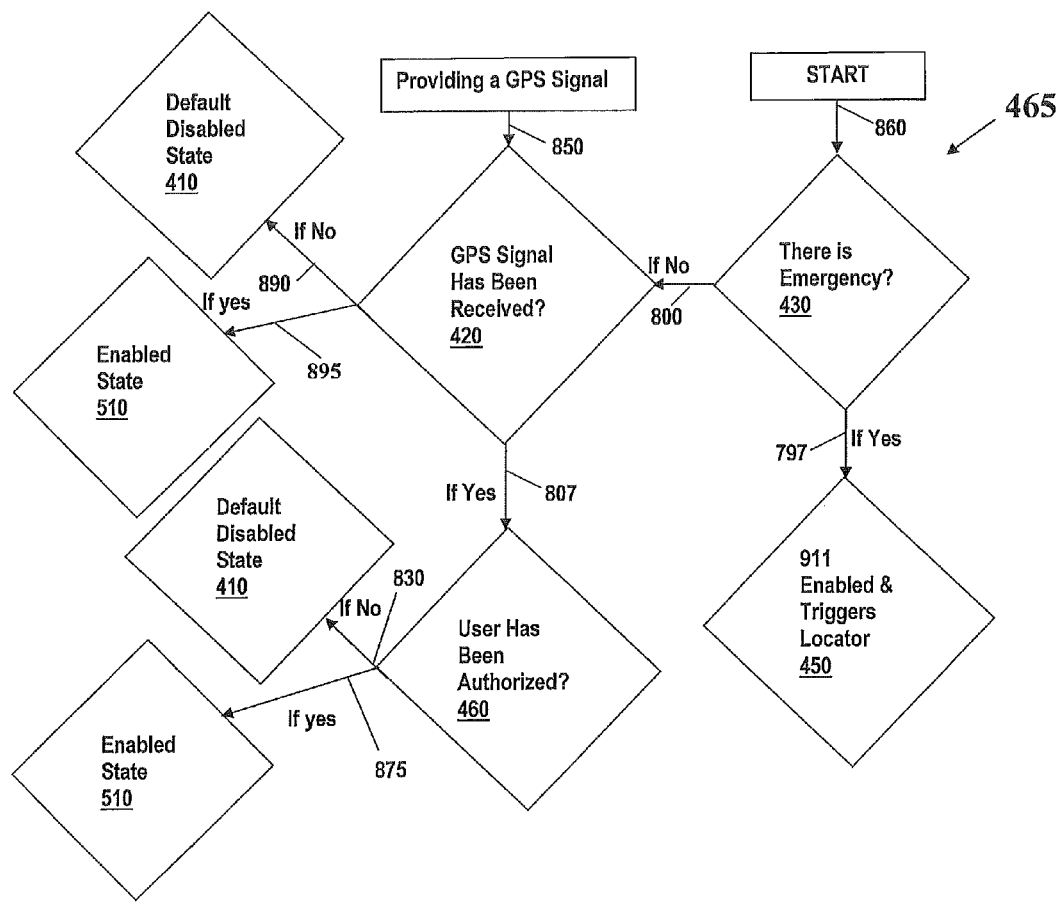

Enabling the Kit 205 or the Mobile Communicator 370 when User Authorization May be an Issue FIG. 7 depicts embodiments of a method 465 for enabling the Mobile Communicator 370 using the Enabling System 360 to enable the kit 205, the Mobile Communicator 370 or similar communication device. In a step 850 of the method 465 for enabling the kit 205, the Mobile Communicator 370 or similar communication device, notice that a GPS signal has been received by GPS Receiver 210 may be transmitted to the Enabling Circuit 250 via connection wire 247, or wirelessly, wherein the GPS Processor 220 may have received the GPS signal from the GPS Signal Amplifier 190 via connection wire 200, or wirelessly. Alternatively, notice that the GPS signal has been received by GPS Signal Amplifier 190, may be transmitted to the Enabling Circuit 250 by the GPS Signal Amplifier 190 via the wire 243, or wirelessly. The GPS signal from the GPS Processor 220 may be digital or analog. In the step 850 of the method 465, said receiving of the GPS signal may be an at least one condition 420 for enabling the kit 205 or the Mobile Communicator 370, and wherein outgoing calls to an Emergency Service Provider 180 may always be enabled by the Enabling System 360.

The Enabling Circuit 250 may enable calls from the kit 205 or the Mobile Communicator 370 to the Emergency Service Provider 180 by providing a contact closure that completes an electrical circuit in which the Enabling Circuit 250 notifies the Communicator Controller 350 that the GPS signal has been received, via a wire 225, or wirelessly, wherein the Communicator Controller 350 may enable the Emergency Dialer 260 to make the outgoing calls to the Emergency Service Provider 180.

In a step 860 of the method 465, a user may activate the "Start Switch" 203 on the kit 205 or the Mobile Communicator 370 that may enable the transmitting and receiving functions of the kit 205 or the Mobile Communicator 370, if an at least one condition, e.g., that there is an emergency, has been satisfied. In the step 860, a logic of the Enabling Circuit 250 of the Enabling System 360 of the kit 205 or the Mobile Communicator 370 asks "Is There an Emergency" 430. If the emergency condition 430 has been satisfied, e.g., the user has spoken a word or command such as "help" into the Microphone 275, or input a message "emergency" via the Keypad 240, the user may be able to change the state of the kit 205 or the Mobile Communicator 370, from an initial Default Disabled State 410, as in step 860 "Start", to a 911 Enabled & Locator Triggered state 450 because such a word or command or input satisfies the at least one condition that there be an emergency, i.e. as in step 797 of the method 465. In the step 797, the Enabling Circuit 250 may provide a contact closure that completes an electrical circuit in which the Enabling Circuit 250 notifies the Communicator Controller 350, via a wire 225, or wirelessly, that may trigger the Emergency Dialer 260 to call 911 and the Location Transmitter 270 to trigger the Locator Beacon 213.

Alternatively, if there is no emergency, as in the step 800 of the method 465, the audible receiving and transmitting functions 680 of the kit 205 or the Mobile Communicator 370 may be enabled, as in the step 895, if the Enabling System 360 of the kit 205 or the Mobile Communicator 370 determines that the condition 420 may be satisfied, i.e., that a GPS signal has been received. In the step 895, the Enabling Circuit 250 notifies the Communicator Controller 350 that the GPS signal has been received from the GPS Receiver 210. The Enabling Circuit 250 may provide a contact closure that completes an electrical circuit in which the Enabling Circuit 250 notifies the Communicator Controller 350, via a wire 225, or wirelessly, that the GPS signal has been provided to the Enabling Circuit 250. In the step 895, the Enabling System 360 may enable the audible receiving and transmitting functions 680 of the kit 205 or the Mobile Communicator 370 by changing the state of the kit 205 or the Mobile Communicator 370 from the Default Disabled State 410 to the Enabled State 510.

Alternatively, in the step 890 of the method 465, the Enabling Circuit 250 of the kit 205 or the Mobile Communicator 370 has determined, conversely, that the condition 420 has not been satisfied, i.e., that no GPS signal has been received by the Enabling Circuit 250. In the step 890, the state of the kit 205 or the Mobile Communicator 370 remains in the Default Disabled State 410 so audible receiving and transmitting functions 680 of the kit 205 or the Mobile Communicator 370 may not be enabled.

In the steps 895 and 890, a logic of the Enabling Circuit 250 may determine that the condition 420, i.e., "GPS signal has been received?", has been satisfied, as in step 895 or is not satisfied, as in the step 890. In the step 890, if no GPS signal has been received, e.g., when the GPS signal is not in line of sight of the GPS Signal Amplifier 190, e.g., when the GPS Signal Amplifier 190 may be indoors in a building, automobile, or airplane, the Enabling Circuit 250 communicates that the condition 420 has not been satisfied to the Communicator Controller 350. If no GPS signal may be detected, as in the step 890, the Communicator Controller 350 may enable the Default Disabled State 410 and the Mobile Communicator 370, e.g., the cell phone, remains disabled.

Referring to FIG. 7, if the Enabling System 360 has ascertained as in the step 800 of the method 465, that there is no emergency, and that the GPS signal has been received, in the step 807, instead of enabling the Mobile Communicator 370, as in the step 895, the Enabling System 360 may require that a condition 460, i.e. that a user of the kit 205 or the Mobile Communicator 370 be authorized or authenticated. In the step 807, if the voice recognition system 230 receives a user's identifying voice or identifying frequency or tone (hereinafter user-identifying sound(s)) from the microphone 275, that matches a preprogrammed voice or preprogrammed frequency that has been preprogrammed into the Enabling System 360, the voice recognition system 230 may provide confirmation of voice recognition to the Enabling Circuit 250. Hereinafter, "authorizing a user" or "authenticating a user" describes a designed property or function of the Voice Recognition System's 230 to determine (ascertain) that a user's identifying voice or identifying frequency or tone (hereinafter user-identifying sound(s) from the microphone 275), matches the preprogrammed voice or preprogrammed frequency or sound(s) or passwords that have been preprogrammed into the Enabling System 360. The preprogrammed sound(s) may be in a frequency range that may be audible or inaudible to humans. For example, a dog whistle may emit sound(s) that may be inaudible to humans. Humans hear frequencies between about 20 cycles/sec to 20,000 cycles/sec at 130 db (very loud). This shrinks to a range of about 700 cycles/sec to 6000 cycles/sec at 0 db (very faint).

Alternatively, a tone from a tuning fork that naturally resonates at an established frequency or set of frequencies, i.e., sound(s), such as the note C in the key of C major that is equivalent to middle C on a standard piano, may be audible to humans. In the step 807, a logic of the Enabling Circuit 250 may provide a contact closure that completes an electrical circuit in which the Enabling Circuit 250 notifies the Communicator Controller 350, via a wire 225, or wirelessly, that the Voice Recognition System 230 has provided confirmation of the voice recognition to the Enabling Circuit 250 via wire 223, or wirelessly. Said completion of the electrical circuit and confirmation of the voice recognition to the Enabling Circuit 250 via a wire 223, or wirelessly, may be the at least one condition for enabling the Enabling System 360 of the kit 205 or the Mobile Communicator 370, and wherein that outgoing calls from the Emergency Dialer 260 to an Emergency Service Provider 180 may always be enabled by the Communication Controller 350. In the step 807, the Enabling System 360 may or may not receive a privacy signal. The logic of the Enabling Circuit 250 may determine that the condition 460, i.e. that a user of the kit 205 or the Mobile Communicator 370 be authorized, has been satisfied, as in step 875 or is not satisfied, as in the step 830. If no confirmation from the Voice Recognition System 230 has been received by the Enabling Circuit 250, e.g., when the user is not authorized, such as when the user is using the kit 205 or the Mobile Communicator 370 without permission or when the user's voice, sound(s) or password may not be authenticated, the Enabling Circuit 250 communicates that the condition 460 has not been satisfied to the Communicator Controller 350. If no confirmation from the Voice Recognition System 230 may be received by the Enabling Circuit 250, as in the step 830, the Communicator Controller 350 may enable the Default Disabled State 410 and the Mobile Communicator 370, e.g., the cell phone, remains disabled.

Alternatively, if confirmation from the Voice Recognition System 360 has been received, e.g., when audible receiving and transmitting functions 680 of the kit 205 or the Mobile Communicator 370, for example, may be authorized, the Enabling Circuit 250 communicates that the condition 480 has been satisfied to the Communicator Controller 350. If the confirmation from the Voice Recognition System 360 has been received, as in the step 875, the Communicator Controller 350 may enable the Enabled State 510 and the audible receiving and transmitting functions 680 of the Mobile Communicator 370, e.g., the cell phone, may be enabled.

In the method 465, in the step 875, outgoing call to the Emergency Service Provider may be authenticated by the Voice Recognition System 230. In the method 465, in the step 875, the Voice Recognition System 230 may recognize each sound selected from the group of sounds consisting of sounds audible to a human ear and sounds inaudible to a human ear. In the method 465, in the step 875, entry of a password or authentication by voice recognition may provide identification of the user to the Emergency Service Provider and triggering the Locator Beacon.

Unauthorized use of the kit 205 or the Mobile Communicator 370, e.g., the cell phone, may be undesirable for two reasons: A) unauthorized use may result in unauthorized charges to an authorized user's charge account with a provider of the kit 205 or the Mobile Communicator 370, e.g., the provider of the cell phone; and B) unauthorized use may result in unauthorized access to the authorized user's personal calling lists, that may include respective names and phone numbers of persons on the list who may want to limit access by others to their names and phone numbers, such as by the unauthorized user. Unauthorized use of the kit 205 or the Mobile Communicator 370, e.g., the cell phone, may result in unauthorized access to the authorized user's secured information, such as, for example, passwords, personal identification numbers (PIN) and the like. As a number of types of secured information stored in the kit 205 or the Mobile Communicator 370, e.g., the cell phone increases, unauthorized access to the secured information stored in the kit 205 or the Mobile Communicator 370, e.g., the cell phone may become a concern. An example of the increased number of secured information types may be a politician's or corporate executive's stored confidential phone numbers and other like secured information. A purpose of embodiments of the present invention may be to protect the owner of the kit 205 or the Mobile Communicator 370, e.g., the cell phone from an unauthorized user accessing the secured information if their phone were lost or stolen as well as providing features that would aid in recovering the kit 205 or the Mobile Communicator 370.

Figure 8:
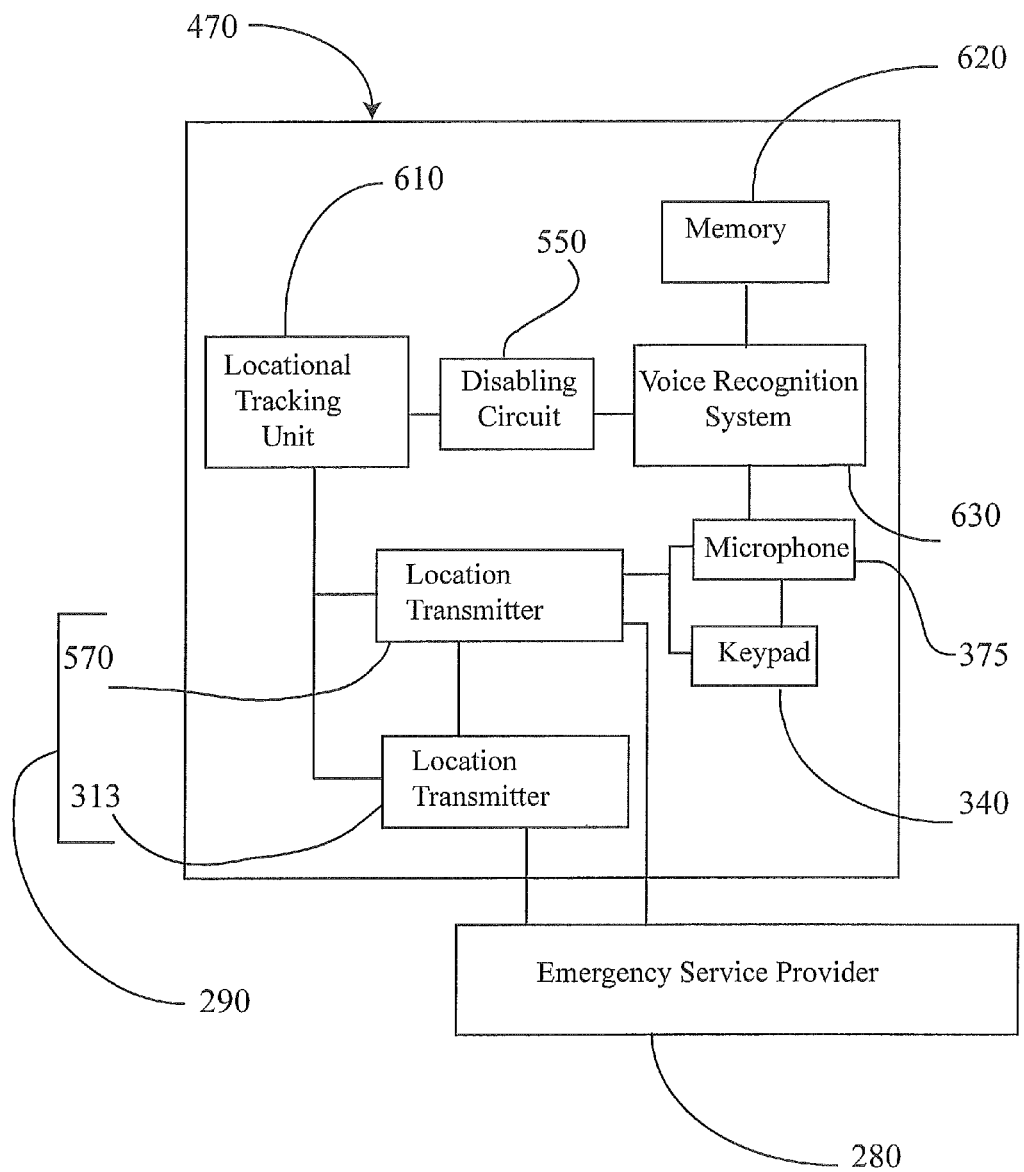
FIG. 8 is a view of an embodiment of the mobile communicator apparatus of the present invention.
Figure 9:
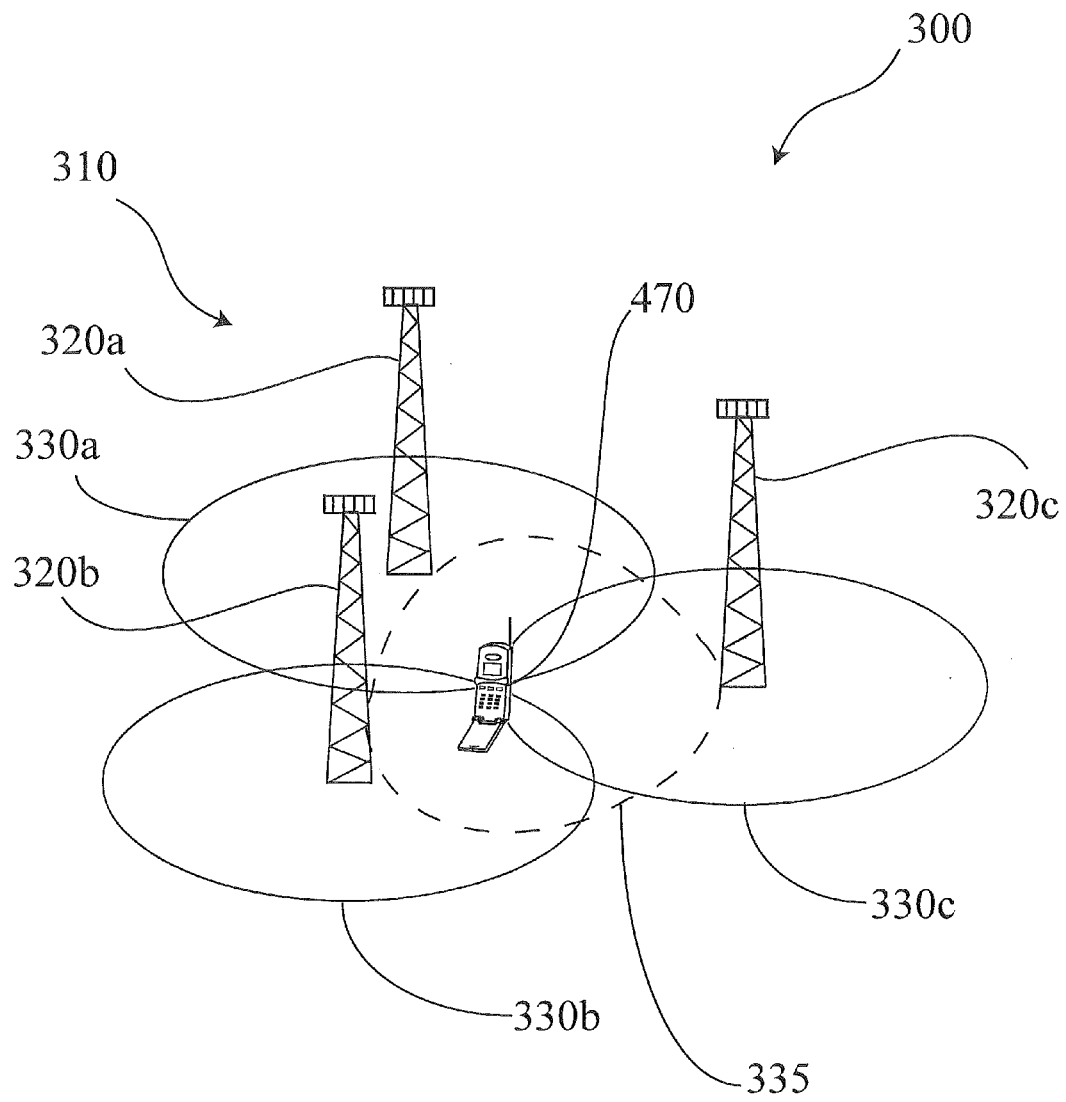
FIG. 9 is a view of an embodiment of the mobile communicator disabling system, in accordance with the present invention.

Referring to FIG. 8 and FIG. 9, an embodiment of the present invention may comprise a mobile communicator apparatus 470, wherein the mobile communicator 470 may include a locational tracking unit 610, a disabling circuit 550, a microphone 375, a voice recognition system 630, a memory storage device 620, a keypad 340, and an emergency service system 290. The emergency service system 290 may further include a location transmitter 570 and a locator beacon 313. The locational tracking unit 610 of the mobile communicator apparatus 470 may utilize a network of signal transceivers 310 to determine the location of the mobile communicator 470.

Referring to FIG. 9, the network of signal transceivers 310 may comprise of a number of signal transceivers, such as cell towers 320 *a-c*. A cell tower 320 *a-c* is a wireless communications station installed at a fixed and known location that transmits and receives signals to and from mobile communicators 470. Those of ordinary skill in the art may interpret a base station, a cell site, a mobile phone mast, or various other terms to mean a cell tower 320 *a-c* for these purposes. The cell towers 320 *a-c* may transmit signals 330 *a-c* in a radially outward direction to the mobile communicator 470. Moreover, the cell towers 320 *a-c* may receive signal 335 transmitted from the mobile communicator 470. The location of the mobile communicator 470 may be tracked by the intersection cell tower signals 330 *a-c*.

Although FIG. 9 provides three cell towers 320 *a-c* in the network of signal transceivers, the network of signal transceivers 310 may comprise additional cell towers 320 *a-c*. The more cell towers 320 *a-c* the network 310 is comprised of, the more accurate the tracking of the location of the mobile communicator 470.

As in FIG. 8, the mobile communicator apparatus may contain a locational tracking unit 610 that utilizes the surrounding network of signal transceivers 310 to determine the location of the mobile communicator 470. The locational tracking unit 610 may be positioned within the mobile communicator 470. The locational tracking unit 610 may be connected to the disabling circuit 550. The disabling circuit 550 may comprise a logic circuit that performs non-arithmetic operations including, but not limited to: OR, AND, NOR, NAND, and NOT. The disabling circuit 550 may disable the mobile communicator apparatus if the at least one condition is satisfied. In this embodiment, the at least one condition may comprise either: 1) receiving a privacy signal; or 2) determining speed of the mobile communicator 470 to be greater than a pre-determined setpoint. The setpoint may be a speed determined by state or federal law.

A privacy signal may be received by the mobile communicator 470 in certain locations that prohibit the transmission and retrieval of signals through the mobile communicator 470 for specific reasons. Some locations that may require the disablement of a mobile communicator 470 may include a theater, a sports tournament, a hospital, a church, a waiting room, a library, a locker room, a classroom, a vehicle, a business area that houses trade secrets and/or confidential information, or a conference room in which trade secrets or confidential proprietary information are discussed. A vehicle may be any transportation device that carries passengers, such as, but not limited to, an airplane, an automobile, or a seat on a train. Also, in the case of a terrorist situation or any other situation dealing with national defense, a privacy signal may be executed according to protocol dependent upon security levels ascertained by an entity. Regardless, a location that may require the disablement of a mobile communicator 470 may be any area in which privacy and/or silence may be desired Referring further to FIG. 8, the mobile communicator apparatus 470 may contain a microphone 375 for inputting a voice, sound(s), and/or passwords into the mobile communicator 470. The microphone 375 may be any device that operates as an acoustic to electric transducer or sensor. That is, the microphone 375 may be any device that converts sound signals into electrical signals. The mobile communicator apparatus 470 may also contain a voice recognition system 630 and a memory storage device 620. The voice recognition system 630 may be configured to be connected to the microphone 375 so that the voice, sound(s), and/or password inputted into the microphone 375 can be authenticated by the voice recognition system 630 by determining each sound(s) provided by the user match a pre-programmed or user-recorded identifying sound stored in the memory storage device 620. The mobile communicator apparatus 470 may further contain a keypad 340 configured to allow a user to input alphanumeric combinations such as, but not limited to, passwords, names, phone numbers, and text messages into the mobile communicator 470.

The mobile communicator apparatus 470 may also comprise an emergency service system 290. The emergency service system 290 may include a location transmitter 570 and a locator beacon 313. The location transmitter 570 may be configured to transmit the location of the mobile communicator 470 to the emergency service provider 280, while the locator beacon 313 is connected to the location transmitter 570 and is configured to emit a locator signal, such as an alarm, a flashing light, or an audible sound, as to the geographic location of the mobile communicator. The locational tracking unit 610 may be connected to the location transmitter 570 and the locator beacon 313 in order to provide the components of the emergency service system 290 with the location of the mobile communicator 470. The location transmitter 570 and the locator beacon 313 may further be connected to an emergency service provider 280. Therefore, the location of the mobile communicator 470 may be transmitted to the emergency service provider 280 in an emergency and a locator beacon 313 may be emitted to aid the emergency service provider 280 in locating the user in an emergency.

Another embodiment of the present invention is related to a mobile communicator disabling system 300, as illustrated in FIG. 9. The mobile communicator disabling system 300 may comprise a mobile communicator 470 and a network of signal transceivers 310. The mobile communicator 470 may further include a locational tracking unit 610 and a disabling circuit 550. The locational tracking unit 610 may be configured to determine the location of the mobile communicator 470. Moreover, the disabling circuit 550 may be configured to change the state of the mobile communicator 470 from an enabled state, wherein the audible receiving and transmitting functions of the mobile communicator 470 are enabled, to a disabled state, wherein the audible receiving and transmitting functions of the mobile communicator 470 are disabled. The locational tracking unit 610 may use a network of signal transceivers 310 to determine the location of the mobile communicator 470.

Figure 10:
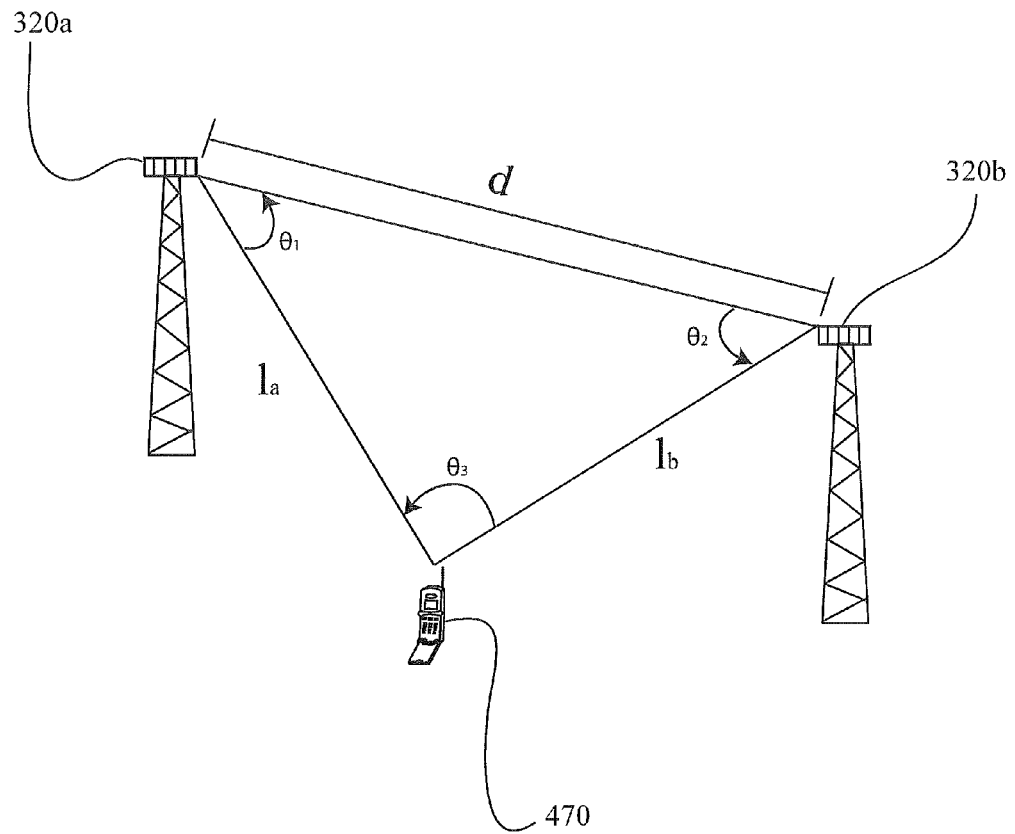
FIG. 10 is a view of a method of determining the location of the mobile communicator, in accordance with the present invention.

As shown in FIG. 10, the locational tracking unit 610 (FIG. 8) of the mobile communicator 470 may communicate with signal transceivers, such as the cell towers 320 a,b, to determine the location of the mobile communicator 470 using triangulation. The locational tracking unit 610, of the mobile communicator 470, may determine the incident angle $\theta_1$, $\theta_2$ with cell towers 320a, b, respectively. The angles $\theta_1$ and $\theta_2$ may be determined by the known technique of Angle of Arrival (AoA). This technique uses the multiple antennas of a cell tower to determine the incident angle of an arriving signal. A second cell tower with the same technology may then also determine the direction of the signal and the incident angle of an arriving signal. AoA systems must be designed to account for multipath signals. Multipath signals occur when a signal bounces off other objects and may confuse the cell tower as to the location of the mobile communicator. The distance d between the cell towers 320a,b is a known distance since the locations of the cell towers 320a,b are fixed and known. The method of triangulation is the process of finding the location of a point, given measurements of various angles and sides of a triangle formed by that point and two other known reference points.

In this example, the point and the two other known reference points are the mobile communicator 470 and the cell towers 320a,b, correspondingly. Further, the distance d and the angles $\theta_1$, $\theta_2$ are known. Those with ordinary skill in the art would know that the sum of the three angles in any triangle is 180 degrees. Therefore, since the points of the mobile communicator 470 and the cell towers 320a,b form a triangle, the third angle $\theta_3$ may be 180-$\theta_1$-$\theta_2$. Using various trigonometric identities, the distance $l_a$, $l_b$ between the mobile communicator 470 and the cell towers 320a,b may be determined. Given either of these lengths, the sine and cosine can be used to calculate the offsets in both the north/south and east/west axes from the corresponding observation points at the cell towers 320a,b to the unknown point at the mobile communicator 470. Hence, the location of the mobile communicator 470 will be determined. Further, since the locational tracking unit 610, of the mobile communicator 470, is continually and dynamically tracking the location of the mobile communicator 470 in substantial real time, the speed of the mobile communicator 470 may also be determined by analyzing the change of position over time.

Figure 11:
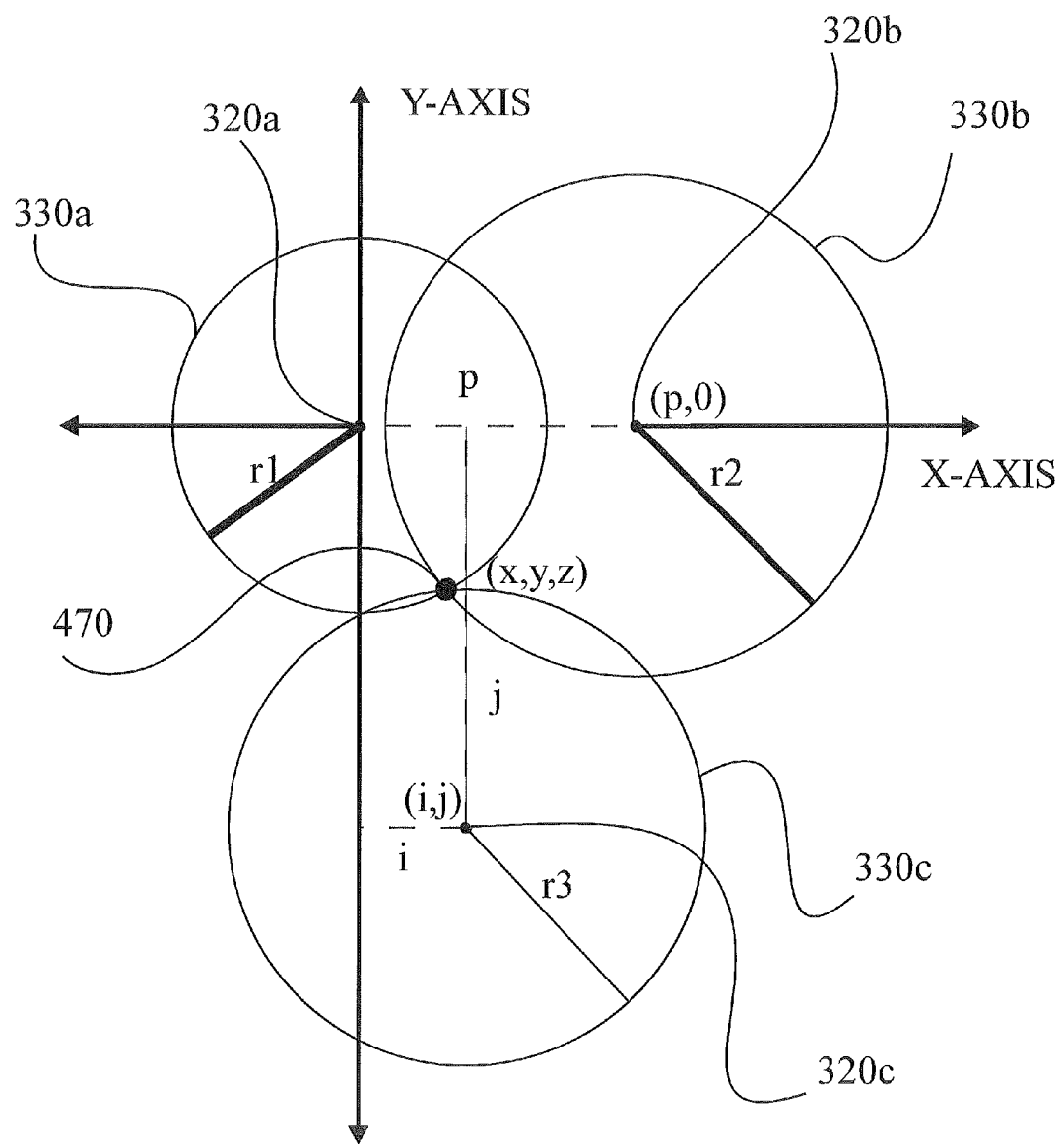
FIG. 11 is a view of an alternative method of determining the location of the mobile communicator, in accordance with the present invention.

In another embodiment of the system 300, the locational tracking unit 610 (FIG. 8) may use the trilateration method as depicted in FIG. 11 to determine the location of the mobile communicator 470. Trilateration is a method of determining the relative position of an object using the geometry of triangles in a similar fashion as triangulation. However, unlike triangulation, which uses angle measurements to calculate an object's location, trilateration uses the known locations of two or more reference points, and the measured distance between the object and each reference point. As shown in FIG. 11, there is a coordinate system of the X and Y axes. The Z axis is not shown as the height in the Z direction is so minimal that it may be approximated to be zero. The location of the mobile communicator 470 is where the cell tower signals 330 a-c intersect.

Referring further to FIG. 11, the cell tower 320a is located at the origin of the coordinate system. The cell tower 320b is located on the X-axis at a distance p away from the origin at cell tower 320a. Therefore, cell tower 320b has the same y-coordinate as cell tower 320a. The cell tower 320c is located in the fourth quadrant of the coordinate system, wherein the cell tower 320c is a distance i to the right of the Y-axis and a distance j below the X-axis. Although FIG. 11 depicts the mobile communicator system 300 in a specific configuration, the system 300 may comprise many different configurations of the cell towers 320 a-c and the mobile communicator 470. Moreover, the mobile communicator disabling system 300 may further comprise additional cell towers 320a-c to provide a more accurate calculation of the mobile communicator 470 location.

As shown in FIG. 11, each cell tower 320a-c emits a signal 330a-c in the shape of a sphere. For purposes of simplicity, FIG. 11 depicts the signals 330a-c as circles, rather than sphere; however, the derivation for the location of the mobile communicator 470 will assume the signals 330a-c are spheres. Since signals 330a-c travel with a known velocity, the distances $r_1$, $r_2$, and $r_3$ from each cell tower 320a-c to the mobile communicator 470 may be directly calculated from the time of arrival. The formula for the distance is: d=v*t.

With further reference to FIG. 11, in order to derive the location of the mobile communicator 470, the equations for each signal 330a-c sphere may be determined and set equal to one another to calculate the point at which all the signals 330a-c intersect. This intersection point is the location of the mobile communicator 470. As previously mentioned, the z-coordinate of the signals 330a-c are approximated to be zero. The derivation for the location of the mobile communicator 470 is as followed:

The equation for signal 330a is:

$$r_1^2 = x^2 + y^2 + z^2$$

The equation for signal 330b is:

$$r_2^2 = (x-p)^2 + y^2 + z^2$$

The equation for signal 330c is:

$$r_3^2 = (x-i)^2 + (y-j)^2 + z^2$$

Subtract the equation for signal 330b from the equation for signal 330a:

$$r_1^2 - r_2^2 = x^2 - (x-p)^2 = 2*x*p - p^2$$

Solve for x:

$$x = \frac{r_1^2 - r_2^2 + p^2}{2*p}$$

Substitute x into the equation for signal 330a:

$$r_1^2 = \frac{(r_1^2 - r_2^2 + p^2)^2}{4*p^2} + y^2 + z^2$$

Solving for $y^2+z^2$ and substituting for x:

$$y^2 + z^2 = r_1^2 - \frac{(r_1^2 - r_2^2 + p^2)^2}{4*p^2} = r_1^2 - x^2$$

Solving for $y^2+z^2$ for signal 330c and setting it equal to the previous equation:

$$y^2 + z^2 = r_3^2 - (x-i)^2 + 2*y*j - j^2 = r_1^2 - x^2$$

Solving for y:

$$y = \frac{r_1^2 - r_3^2 + i^2 + j^2 - 2*x*i}{2*j}$$

Solving the equation for signal 330a for z with equation for x and y:

$$z = \sqrt{r_1^2 - x^2 - y^2}$$

Therefore, from the derivation above and reference to FIG. 11, the location of the mobile communicator 470 may be determined by the method of trilateration.

Figure 12:
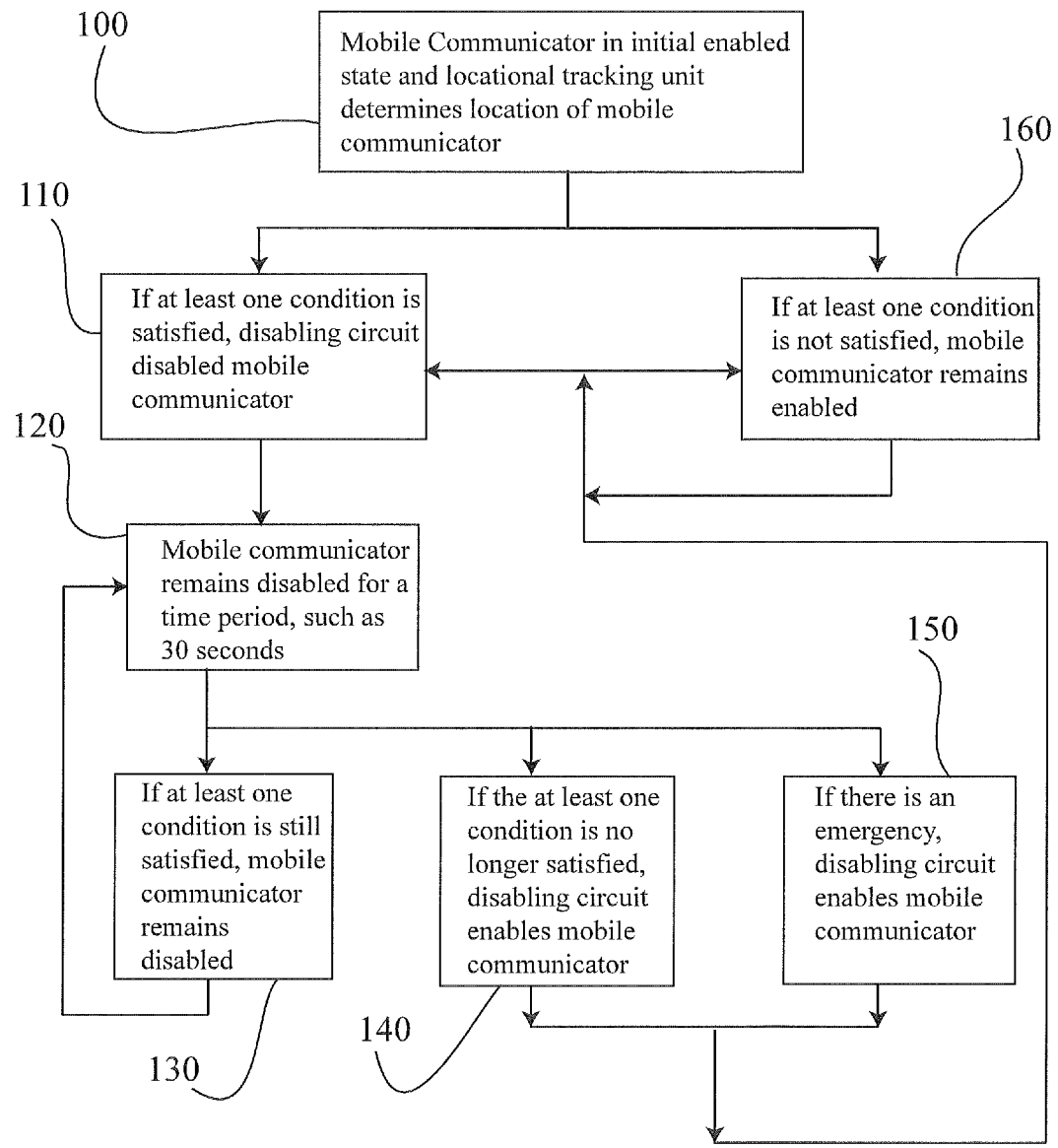
FIG. 12 is a diagram of logic within the mobile communicator apparatus, in accordance with the present invention.

With further reference to FIGS. 8 and 9, the mobile communicator system 300 may operate as depicted in FIG. 12. As provided in FIG. 12, the mobile communicator 470 may be in an initial enabled state 100. In this example of the mobile communicator disabling system 300, the network of signal transceivers 310 may communicate with the locational tracking unit 610 of the mobile communicator 470 in order to determine the location of the mobile communicator 470. Referring to FIG. 12, if the at least one condition is not satisfied, the mobile communicator may remain enabled 160. The locational tracking unit 610 may continually communicate with the network of signal transceivers 310 to determine if the at least one condition is satisfied. However, if the at least one condition is satisfied, the disabling circuit may disable the mobile communicator 110. The at least one condition may comprise either of the retrieval of a privacy signal; or the present speed of the mobile communicator 470 may be greater than a pre-determined setpoint. As depicted in FIG. 12, the mobile communicator may remain disabled for 30 seconds or any period of time 120. Since the locational tracking unit 610 may continually determine the location of the mobile communicator 470 after the time period 120, such as 30 seconds, has elapsed, if the at least one condition is still satisfied, the mobile communicator may remain disabled 130 and may remain disabled for an additional time period 120, such as 30 seconds. However, if the at least one condition is not longer satisfied, the disabling circuit may re-enable the mobile communicator 140. Additionally, if there is an emergency, the disabling circuit may enable the mobile communicator 150.

A mobile communicator 470 disabling method 900, as described with reference to FIGS. 8 and 13, may comprise: providing a locational tracking unit 610 and a disabling circuit 550 to a mobile communicator 470, wherein the mobile communicator 470 is in an initial enabled state 910; determining the location 920 of the mobile communicator 470; determining that at least one condition for disablement of the mobile communicator 470 is satisfied 930; and disabling 940 the mobile communicator 470.

Figure 13:
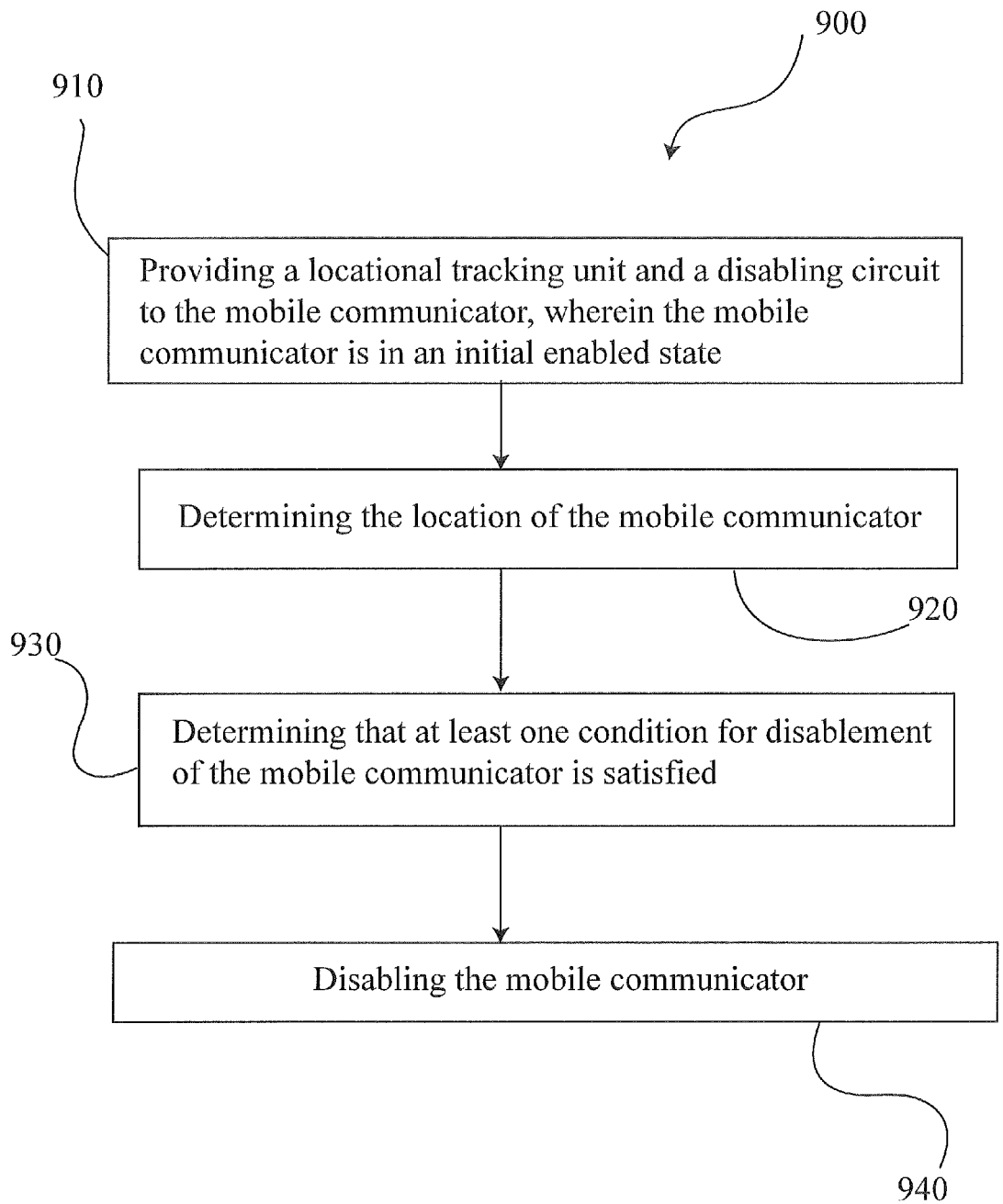
FIG. 13 is a diagram of the method for disabling a mobile communicator, in accordance with the present invention.

With continued reference to FIGS. 8 and 13, and with further reference to FIG. 9, determining the location 920 of the mobile communicator 470 may comprise of the locational tracking unit 610 communicating with a network of signal transceivers 310. The determination of the location 920 may further include triangulation, trilateration, multilateration, GPS positioning, cell identification, enhanced cell identification, etc.

Multilateration is a process of locating an object by accurately computing the Time Difference of Arrival (TDoA) of a signal emitted from the object to three or more receivers. TDoA uses the time it takes for a signal to travel as an indirect method of calculating distance. With a minimum of three base stations of signal transceivers, such as cell towers 320a-c, receiving a signal from a mobile communicator 470, the difference in time it takes for the signal 335 to reach each tower 320a-c can be used to determine the position of the mobile communicator 470.

Cell identification is a method that determines the position of a mobile communicator 470, based on signal strength. This is a simple method that provides a rough estimate of the location of the mobile communicator 470. The location of a cell tower 320a-c that is in communication with a mobile communicator 470 and is closest to the mobile communicator 470 is determined to be the rough location of the mobile communicator. The cell tower 320a-c that receives the strongest signal 335 from the mobile communicator 470 is closest to the mobile communicator 470.

This simple method is often used in conjunction with other techniques in order to increase the precision of the mobile positioning, such as the Global Positioning System (GPS) or Time of Arrival (ToA). ToA is similar to the TDoA technique, but differs in that it uses the absolute time of arrival at a certain base station, rather than the difference between stations.

Determining that at least one condition for disablement of the mobile communicator 470 is satisfied 930 may include the at least one condition for disablement to be either the retrieval of a privacy signal or the determination that the speed of the mobile communicator 470 is greater than a pre-determined setpoint.

Moreover, the initial enablement of the mobile communicator 910 may further comprise authenticating a user's voice and/or password with a voice recognition system 630 or determining the location of the mobile communicator 470 with the locational tracking unit 610.

The method for disabling a mobile communicator 900 may also comprise re-enabling the mobile communicator 470 as depicted in FIG. 12. The mobile communicator 470 may be enabled if the at least one condition is no longer satisfied 140. Further, if there is an emergency, the disabling circuit enables the mobile communicator 150. In one example, the method for disabling a mobile communicator 900 may also comprise enabling the mobile communicator in an emergency by speaking or verbalizing a word, e.g. "help," into a microphone 375 or inputting "help" via a keypad 340. In another example, this may also notify the location transmitter 570 to trigger the locator beacon 313. Moreover, an example may include enabling the mobile communicator 470 in an emergency in order for a user to call an emergency service provider 280 and the emergency service provider 280 may activate the locator beacon 313. Additionally, the emergency service provider 280 may be notified of the authorized user of the mobile communicator 470.

Figure 14:
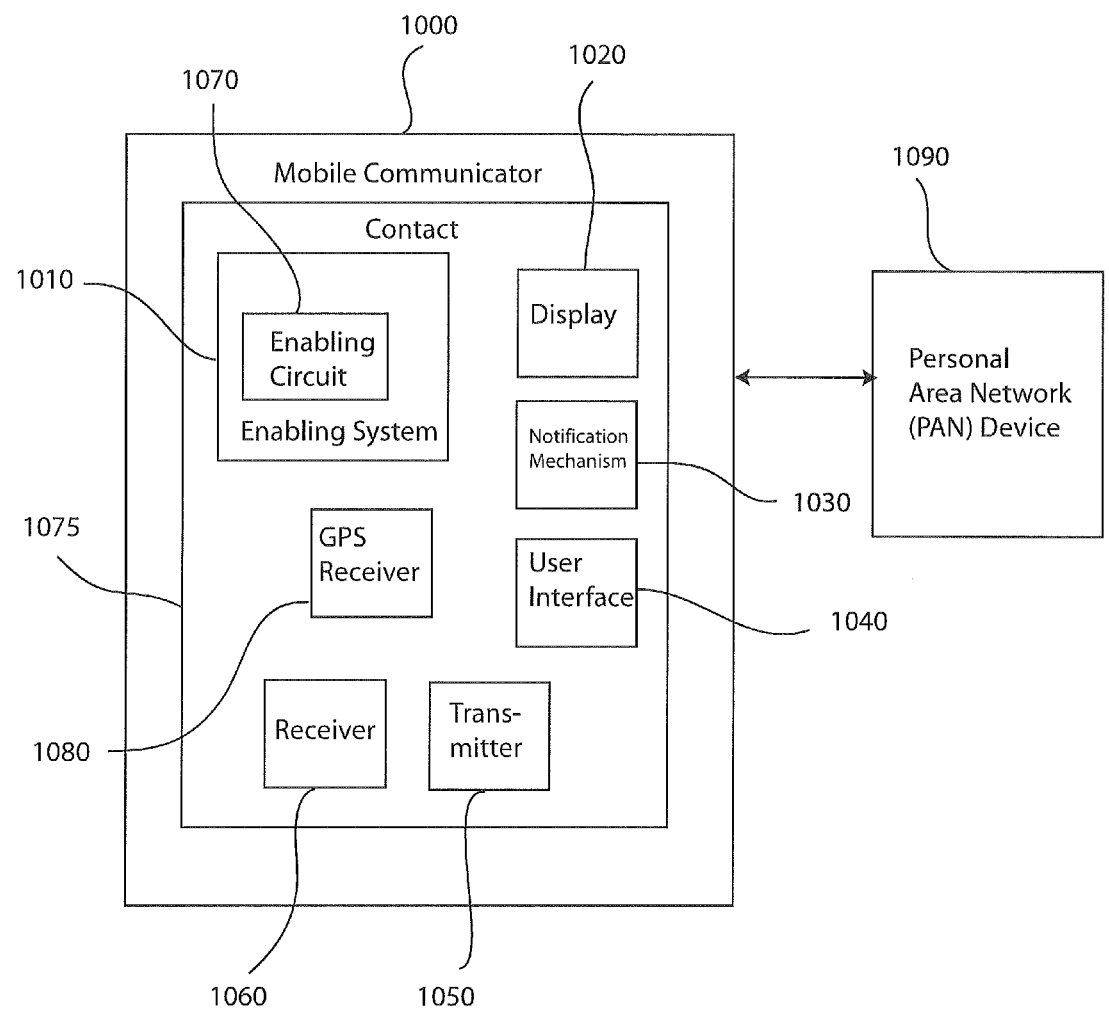
FIG. 14 depicts a mobile communicator, in accordance with the present invention.

Referring now to FIG. 14, another embodiment of the present invention may include a mobile communicator 1000. The mobile communicator 1000 may be a standard mobile cellular phone, and/or may include further functionality such as internet browsing, cloud computing, image capture, voice capture other forms of video or media viewing or the like. The mobile communicator 1000 may also be a tablet or palm pilot that has a large touch screen for input by a user. For example, the mobile communicator 1000 may be a delivery confirmation device typically utilized by delivery employees of companies such as FEDEX® and UPS®. The mobile communicator may also be a mobile computer, IPHONE®, IPAD®, BLACKBERRY®, or any other type of mobile communicator. The mobile communicator may also be a typical vehicle GPS system such as a GARMEN® or TOMTOM®. Any communication device is contemplated.

The mobile communicator 1000 may include near realtime GPS graphical map viewing, a portable game player, a digital music player, a clock, a radio tuner, an alarm clock, a digital memo pad, a digital calendar, a two-way radio (walkie talkie), an electronic contact rolodex, an e-book reader, and a calculator. Various forms of mobile communicators 1000 having various functions that are applicable to the present invention will be understood by those skilled in the art. However, the mobile communicator 1000 may be any mobile device that may communicate with another device.

The mobile communicator 1000 may include an enabling system 1010 with some or all of the features similar to the enabling system 360 of the mobile communicator 370, as described hereinabove. Thus, the mobile communicator 1000 has an initial default disabled state whereby any or all of the elements or functions of the mobile communicator 1000 described herein are disabled. The enabling system 1010 may include a contact operable between an open and closed configuration and positioned to complete an electric circuit when the contact is in the closed position in order to activate the mobile communicator 1000 in the same manner as described hereinabove with respect to the enabling system 360 of the mobile communicator 370.

The enabling system 1010 of the mobile communicator 1000 may include an enabling circuit 1070 with some or all of the features of the enabling circuit 250 of the mobile communicator 370 described hereinabove. The logic of the enabling circuit 1070 may change the initial default disabled state of the mobile communicator 1000 to become enabled when at least one condition has been satisfied.

Furthermore, the mobile communicator 1000 includes a contact 1075 that is operable between an open configuration and a closed configuration, whereby the phone is provided with functionality when the contact is in the closed configuration. The contact 1075 may thus be thought of conceptually as an on/off switch whereby closing the contact will turn the mobile communicator 1000 on and provide the mobile communicator 1000 with functionality. Likewise, when the contact is open, the mobile communicator 1000 may be in an off state whereby none of the functions of the mobile communicator 1000 are enabled.

Furthermore, the mobile communicator 1000 may include a display 1020, a notification mechanism 1030 for alerting a user, a user interface 1040, a transmitter 1050, and a receiver 1060. It should be understood that the default disabled state of the mobile communicator is a state where at least one of the display 1020, the notification mechanism 1030, the user interface 1040, the transmitter 1050, the receiver 1060, a text messaging interface, an image messaging interface, a video messaging interface, an internet browser, an image capturer, a voice capturer, a video capturer, a GPS graphical map viewer, a game player, a digital music player, an alarm clock, a digital memo pad, a digital calendar, a two-way radio, an e-book reader, an electronic contact rolodex, and a calculator are disabled. Thus, the enabling circuit 1070 may enable at least one of these elements 1020, 1030, 1040, 1050 of the phone when one condition has been satisfied. Additionally, it should be understood that any combination of the above described functions may be disabled during the default disabled state. Furthermore, any software operability may be disabled and certain or all applications of the mobile communicator 1000 may be blocked. It should be understood that any input from any outside information source may be prevented when the mobile communicator 1000 is in the disabled state.

The display 1020 of the mobile communicator 1000 may be a complex interactive touch-screen that is integrated with the user interface 1040. Alternately, the display 1020 may be a simple LCD display for presenting information to a user such as a calling number or the number dialed. It should be understood any form of display is contemplated.

Likewise, the user notification mechanism 1030 of the mobile communicator 1000 may be a noise notification element, such as a speaker that emits a ring or "ring-tone" that alerts a user. For example, when the mobile communicator 1000 receives a transmission signal, a speaker may emit a pre-programmed audible ring that alerts a user of the incoming transmission. Alternately, the notification mechanism 1030 may be a change found on the display 1020. For example, the display 1020 may light up when a transmission is incoming. Still further, the mobile communicator 1000 may vibrate as is known in the art. The user notification mechanism 1030 may be any mechanism for alerting a user of a communication event. Additionally, the notification mechanism 1030 may be preprogrammed to alert a user of a predetermined event, such as when a time of day is reached (in the case of an alarm clock notification).

The user interface 1040 may be configured for allowing a user to enter a plurality of identity inputs associated with an alphanumeric combination of numbers and letters. For example, the user interface 1040 may be a touch screen, a keyboard, or a simple number pad. Alternately, the user interface 1040 may be a voice receiver that allows a user to enter a plurality of identity inputs by voice. In one embodiment, the user interface 1040 may be a text messaging interface. In other embodiments, the user interface is a telephone number dialing interface, or an email interface. It should therefore be understood that the mobile communicator 1000 may include any type of user interface that would be apparent to those skilled in the art.

The transmitter 1050 of the mobile communicator 1000 may be in operable communication with the user interface 1040 and configured to send a transmission from the mobile communicator 1000 to an output device having an identity corresponding with the identity input that is inputted into the mobile communicator 1000 via the user interface 1040. The transmitter 1050 may be configured to communicate typical electromagnetic and/or sonic transmissions such as a cell phone voice transmission, an email, a video or picture message, or a transmission that interacts with the internet. For example, the transmitter 1050 may be a network adapter or card that is configured to transmit signals through a router or local area network. Alternately, the transmitter 1050 of the mobile communicator 1000 may be configured to send a transmission on a $3^{rd}$ or $4^{th}$ generation wireless network.

Likewise, the receiver 1060 of the mobile communicator 1000 may be capable of receiving a transmission from a transmitting device. The mobile communicator may be configured to receive any type of transmission such as a cell phone voice transmission, an email, a text, video or picture message, or a transmission from a laptop or computer. For example, the receiver 1060 of the mobile communicator may be configured to receive local signals from a router, switch or other local area network. Alternately, the receiver 1060 of the mobile communicator 1000 may be configured to receive transmissions from $3^{rd}$ or $4^{th}$ generation wireless networks.

As previously described, the mobile communicator 1000 includes an initial default disabled state whereby one or more of the functions or elements 1020, 1030, 1040, 1050, 1060 of the mobile communicator 1000 are disabled. It should be understood that the mobile communicator 1000 remains in this default disabled state if and when the at least one condition is not satisfied, even when the contact 1075 is in the closed position. Thus, the contact 1075 may be in the closed position, generally activating the functionality of the mobile communicator 1000 by turning it "on." However, even in this "on" state, the mobile communicator 1000 will be in a default disabled state, whereby one or more of the elements of the phone 1020, 1030, 1040, 1050, 1060 are disabled, unless the condition is satisfied. The enabling system 1010 of the mobile communicator 1000 and the enabling circuit 1070 may be configured to enable one or more of these functions or elements when a certain condition is satisfied. In the default disabled state, the mobile communicator 1000 may display a particular image or message on the display 1020 to notify the user that a particular function or set of functions are currently disabled by default. This display may be a downloadable image, or may be preprogrammed in the mobile communicator 1000.

As per the previous embodiments of the mobile communicator 370, and the methods 400, 450, and 465, the initial default disabled state may be a state in which one or more functions are actually activated. For example, the display may be deactivated during the initial default disabled state. However, the user notification system may still be active. Furthermore, the mobile communicator 1000 may have one or more functions that are active in the default disabled state which are not active in the enabled state. In other words, the default disabled state may actually enable one or more functions while still disabling the function or element that is disabled by default. For example, the default disabled state may include a voice command function that is activated when the condition is not satisfied, but is deactivated the minute the condition is satisfied and the disabled function or element becomes enabled.

When the mobile communicator 1000 is in the default disabled state, the mobile communicator may prevent a user from answering a received call or viewing a received text. Additionally, the mobile communicator 1000 may prevent a user from texting or dialing a call in the default disabled state. However, the mobile communicator 1000 may include a mechanism that audibly alerts a user that a call has been received. For example, the mobile communicator 1000 may be in the default disabled state whereby receiving and transmitting texts and calls are disabled. However, the mobile communicator 1000 may audibly alert a user that a call is being received and from whom. Likewise, the mobile communicator 1000 may alert a user that a text message has been received. The mobile communicator 1000 may still further be configured to automatically convert the text of the text message to an audible voice message that may be automatically broadcast to the user. Similarly, the mobile communicator 1000 may alert a user that an email has been received even if the email function is disabled during the default disabled state. The present invention is not limited to these embodiments, and other similar embodiments of alerting a user while the mobile communicator 1000 is in the default disabled state will be apparent to those skilled in the art.

As previously described with respect to the mobile communicator 370, the satisfied condition may be that the mobile communicator 1000 is moving at a speed that is $\leq$ a setpoint speed. Speed may be determined by an internal Global Positioning System (GPS) Receiver 1080 that is associated with the enabling system 1010. Speed may accordingly be determined through triangulation, trilateration, multilateration, or any other method of determining the location and/or speed of the mobile communicator 1000 with a network of signal transceivers. Additionally, speed or velocity of the mobile communicator 1000 may be determined through a vehicle diagnostics system or vehicle electronics system that is in operable communication with the mobile communicator 1000. For example, the mobile communicator 1000 may be linked to a speedometer of the vehicle, or to a meter for determining speed that is attached to a wheel of the vehicle.

Furthermore, an accelerometer may be utilized to determine speed. A gyroscope may also be used in combination with other speed detection means to help determine the speed of the mobile communicator 1000. In other embodiments a device may determine position of the mobile communicator 1000 relative to an established location or point.

Alternately, the satisfied condition may be that the mobile communicator 1000 does not receive a privacy signal or a GPS signal, as described hereinabove with respect to the mobile communicator 370. Still further, the satisfied condition may be that the user is determined to be an authorized user by an internal system of the mobile communicator 1000, similar to the authorization system described with respect to the mobile communicator 370.

In another embodiment of the present invention, the satisfied condition may be that the mobile communicator 1000 is in a hands-free mode. The hands free mode may be initiated by pressing a single button, or by pressing a combination of buttons. Other inputs may initiate the hands free mode, such as a voice command. While in the hands free mode, certain audible volumes or other settings may be automatically increased or decreased to a predetermined setting or level. This may prevent a user from having to pick up the mobile communicator 1000 to adjust the volume after the mobile communicator 1000 is placed in the hands free mode. For example, the hands free mode may be a Bluetooth™ system, or other like open wireless protocol system for creating a personal area network (PAN), whereby a communication link is established between the mobile communicator 1000 and a separate communication link device 1090. The Bluetooth-like PAN system may include a microphone and a signal receiver and transmitter, as is commonly known in the art. The mobile communicator 1000 could thus determine that the phone is being used in a hands-free manner, thereby satisfying the condition and activating the element or elements 1020, 1030, 1040, 1050, 1060 of the phone that are default disabled.

Instead of utilizing Bluetooth-like PAN technology, the hands free mode of the mobile communicator 1000 may be a mode whereby a user may only enter inputs through voice commands. A user may, for example, both dial and answer the mobile communicator 1000 using a series of voice commands. In this state, the mobile communicator 1000 may not accept hand-entered inputs on the typical user interface 1040. It is further contemplated that this hands free voice mode may be activated by a voice command. This voice command hands free mode may also be utilized to allow a user to text through audible voice inputs. For example, a voice translator may translate spoken words into text to be sent in a text message while in the voice command hands free mode. It should be understood that this hands free mode may still include several functions of the phone remaining disabled. For example, certain unnecessary functions that may not be commanded audibly, or that were determined to be too distracting, may remain disabled in the hands free mode.

Figure 15:
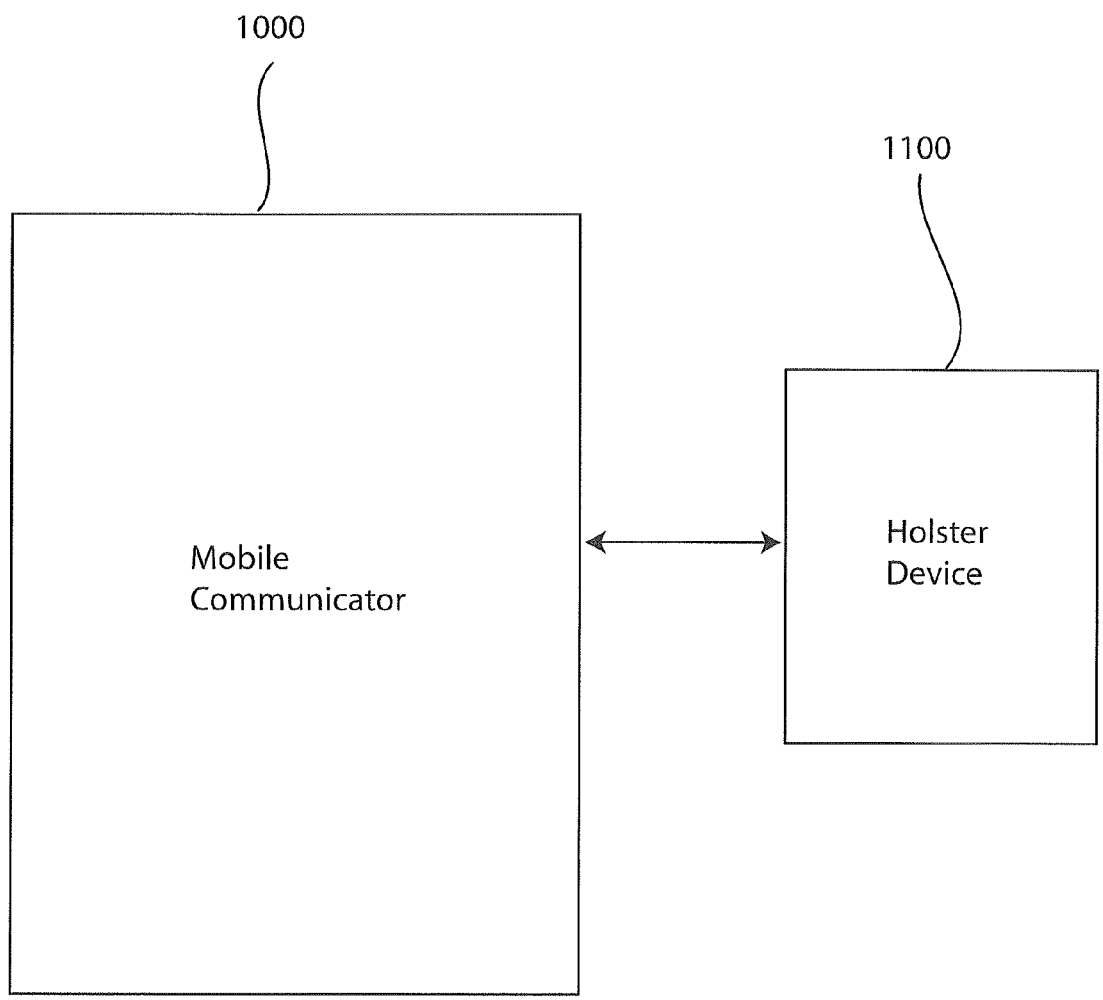
FIG. 15 depicts a mobile communicator attached to a holster, in accordance with the present invention.

Still further, the hands free mode of the mobile communicator 1000 may be activated by a holster device 1100, as shown in FIG. 15. For example, a vehicle may include an integrated holster 1100 whereby the mobile communicator 1000 may be attachable thereto. When attached, a condition may be satisfied, thereby switching the mobile communicator 1000 from the default disabled state to an enabled state. The holster 1100 may also be a separate device that is connected to the power source of the vehicle. Additionally, it is contemplated that plugging in, or otherwise attaching, the mobile communicator 1000 into the holster 1100 may automatically alter the functionality of the mobile communicator 1000. For example, plugging the mobile communicator 1000 into the holster 1100 may facilitate a condition that automatically puts the mobile communicator 1000 in the hands free voice command mode described hereinabove. Alternately, attaching the mobile communicator 1000 to the holster 1100 may disable the finger input user interface of the user interface 1040 while also enabling a voice command mode. It should be understood that the holster 1100 may additionally function as a battery charger for the mobile communicator 1000 and may be installed in a vehicle such that it is powered by the electrical power system of the vehicle, such as a common 12 volt vehicle power system.

The mobile communicator 1000 may also be configured to enter different modes of functionality to enhance the performance of certain key functions. Key functions may include, battery life, maximum performance, or maximum accuracy in determining speed and/or location of the mobile communicator 1000. Additional key functions may be contemplated by those skilled in the art. For example, a user may voluntarily enter a command that puts the mobile communicator 1000 into a mode whereby the user interface and the display are not functional. In this voluntary disabled mode, the GPS receiver may also be turned off.

Figure 16:
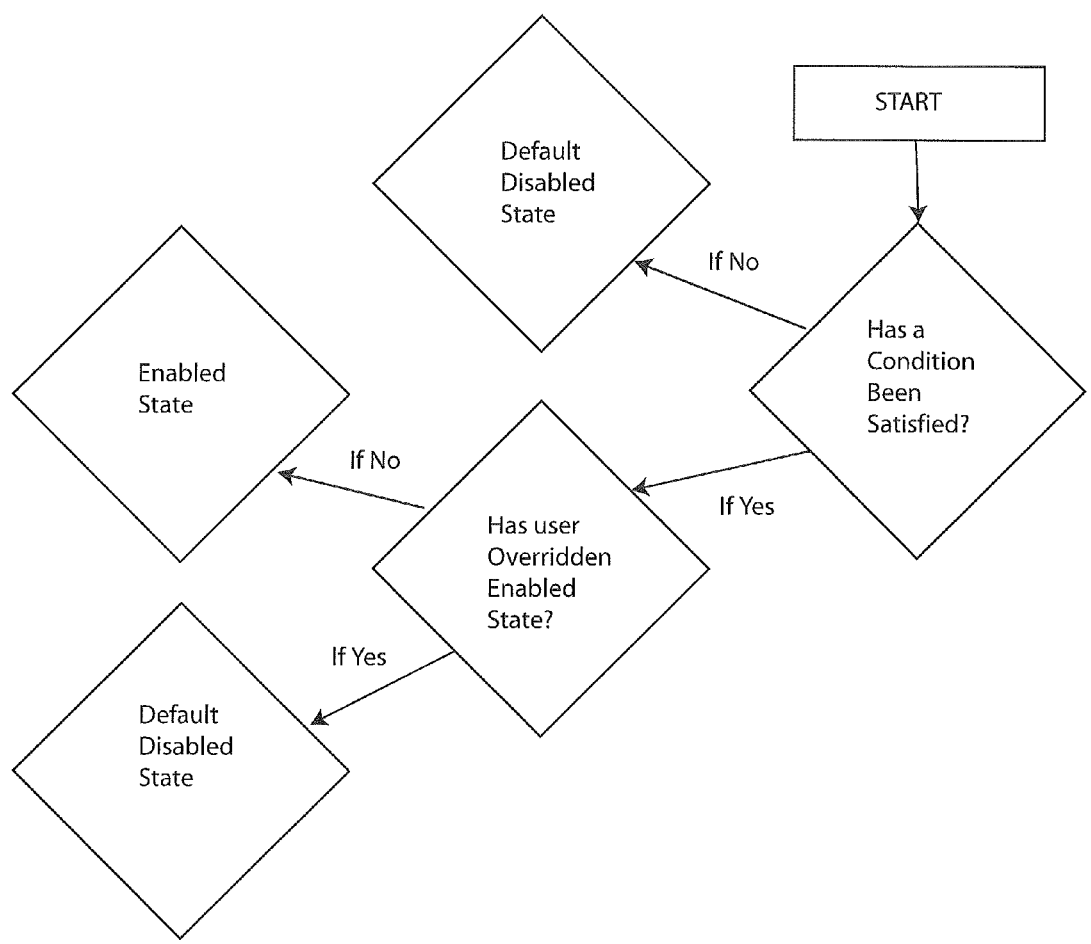
FIG. 16 depicts a voluntary override of the enabling system of the mobile communicator in accordance with the present invention.

As shown in FIG. 16, the logic of the mobile communicator 1000 and the enabling system 1010 in this embodiment may be that the mobile communicator 1000 is in the default disabled state unless a condition is satisfied. The condition may be, for example, that the mobile communicator 1000 is moving at a speed that is $\leq$ a setpoint speed. When the mobile communicator 1000 meets this condition, a user may still voluntarily override the enabling system 1010 by entering the voluntarily disabled mode command.

A user may also voluntarily override the default disabled state in one embodiment, thereby enabling the mobile communicator 1000, by simply pressing a button or inputting another command. In this embodiment, the condition to be satisfied may be that a user inputs a command to the mobile communicator 1000. The input that overrides the disabled state and satisfies the condition may only temporarily satisfy the condition. For example, the command may override the disabled state for a predetermined period of time after being input. Further, in this embodiment the mobile communicator 1000 may automatically create a log that keeps track of when the voluntary override disables the mobile communicator. This log may be accessible to a user and may be tamper proof. Thus, a parent may be able to look at the log and determine whether a child has kept their mobile communicator in the disabled state or whether the voluntary command was input into the phone. In one embodiment utilizing this voluntary override of the default disabled state, the text messaging user interface may be disabled by default. In this embodiment, a user may voluntarily override the default disabled state.

Figure 17:
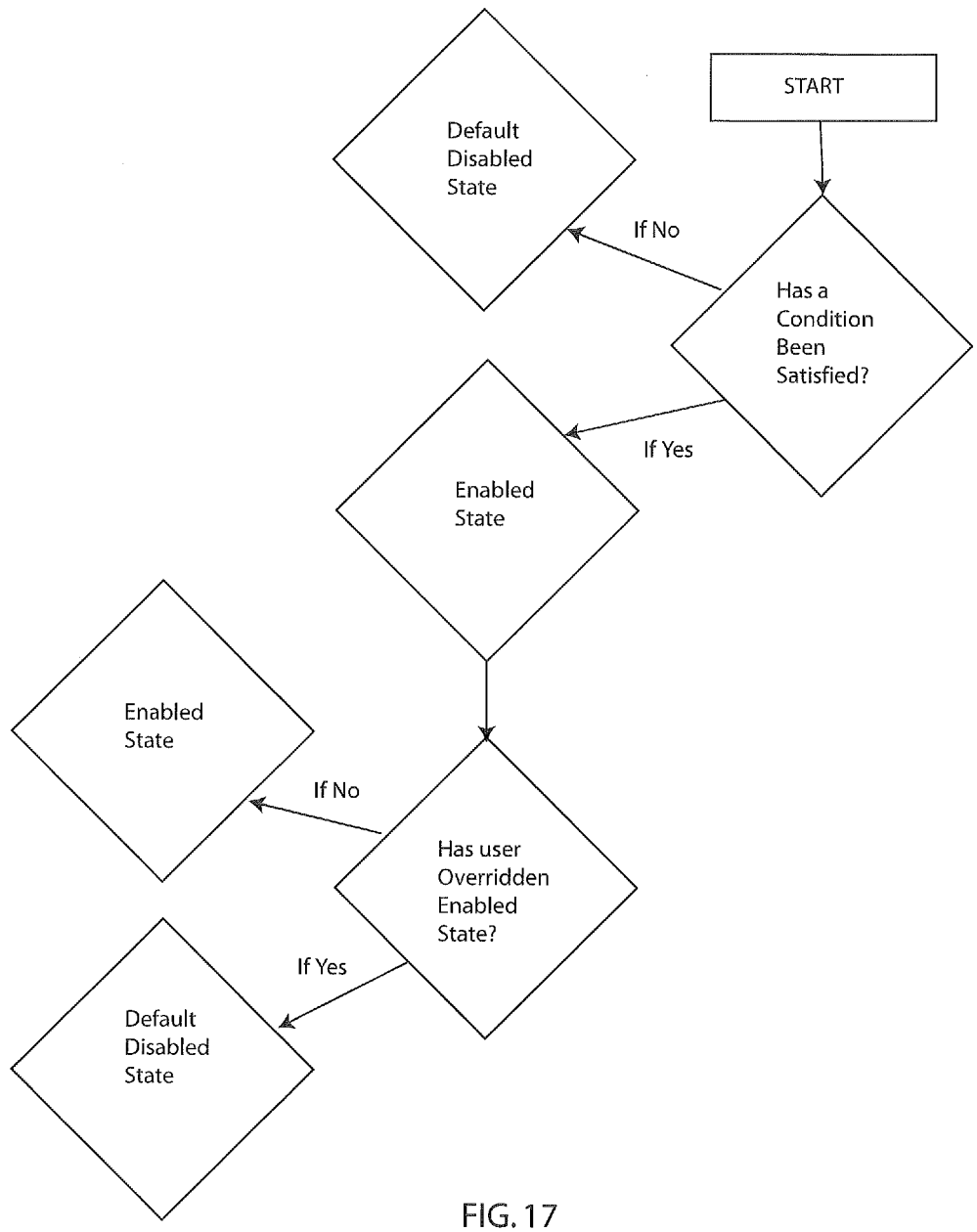
FIG. 17 depicts further disabling of the mobile communicator upon a voluntary command in accordance with the present invention.

Alternately, as shown in FIG. 17, the logic may be that the mobile communicator 1000 enters the enabled state when the condition is satisfied. In this embodiment, the voluntary command may redundantly disable any functions or elements 1020, 1030, 1040, 1050, 1060 that were disabled in the default disabled state even though the condition is satisfied and the mobile communicator 1000 is satisfactorily in a state that permits enabling by the enabling system 1010. In another embodiment, the voluntary command may be configured to disable a different set of functions or elements even though the condition is satisfied and the various functionality of the mobile communicator 1000 has been enabled by the enabling system 1010.

It should be understood that adding a voluntary user disabling system will allow the phone to save battery life. It is a known problem in the art that a GPS receiver is tolling on the battery life of a mobile communicator. While in use, a GPS receiver and accompanying programs are typically known to consume the battery life and charge of a mobile communicator. Thus a user of the mobile communicator 1000 of the present invention may voluntarily enter a disabled state, whereby a GPS would be unnecessary, thereby saving battery life of the mobile communicator 1000. It should also be understood that when the mobile communicator 1000 is in this voluntarily disabled state, certain functions may be operable. For example, the mobile communicator 1000 may receive voice commands, as described hereinabove.

It is further contemplated that the GPS receiver 1080 of the mobile communicator 1000 may go into a less active state when the mobile communicator is not moving. For example, the GPS receiver 1080 may request location information at a longer time interval when the previous two requests resulted in a determination that the mobile communicator 1000 has not moved and is in the same location. When the GPS receiver 1080 then makes a determination that the location has changed at a fast rate, the GPS receiver 1080 may automatically enter a more active inquiry mode. In this mode, the GPS receiver 1080 may request location information much more quickly. The GPS receiver 1080 may remain in this mode until it is determined that the mobile communicator 1000 is once again stationary.

The mobile communicator 1000 may have certain functions that enter a "sleep mode" that is either intentionally implemented by the user, or automatically implemented by the mobile communicator 1000. During the "sleep mode," the GPS or other speed sensing system may be off or be turned off in order to conserve the battery of the mobile communicator 1000. Before the mobile communicator 1000 may receive or transmit a call, the "sleep mode" may then need to be disabled. After being "awoken" by an activating event that causes disabling the "sleep mode," the GPS or other velocity or speed sensor may then determine which conditions are present in order to enable the phone via the enabling system 1010 described hereinabove. During the "wake up" process, a message may be provided to a caller that explains that the mobile communicator 1000 is determining whether a call may be received. A user of the mobile communicator 1000 may pre-program a message that may be provided by the mobile communicator 1000 in this circumstance. The message may be a voice message or a video message, or both. Alternately, a third party web site, database, or other electronic system may provide a message to the caller. The mobile communicator 1000 may also provide a link to a third party website that would provide the caller with the message when the caller accesses the provided link.

In another embodiment, the mobile communicator 1000 may be deactivated until the speed detection system, such as the GPS receiver, determines that the mobile communicator 1000 is moving at a speed that is less than a setpoint speed. However, the speed detection system may further be deactivated until a second condition is met. For example, the second condition may be that a user has attempted to activate a text messaging interface. In this embodiment, text messaging may also be disabled until the speed detection system determines that the mobile communicator 1000 is moving at a speed that is less than a setpoint speed. For example, the display may show a "Text Messaging Currently Disabled" display when a user attempts to access a text messaging interface. When the user attempts to access the text messaging interface, this may satisfy the second condition, and enable the speed detection system. When the speed detection system is enabled, the speed detection system may determine the speed of the mobile communicator 1000 and determine whether the mobile communicator 1000 is moving at a speed that is less than the setpoint speed. When the mobile communicator 1000 makes this determination, the text messaging interface may become available. When the user exits the texting interface, the mobile communicator 1000 may automatically revert back to the state where the speed detection system and the texting interface are disabled. This embodiment may further help conserve the battery life, or charge, of the mobile communicator 1000. This is because a speed detection system may be a primary consumer of the battery life of the mobile communicator. Furthermore, in this embodiment, texting may not be available if no GPS signal is received. This prevents a user from bypassing the text-prevention software by blocking a GPS signal. It should be understood that this embodiment is not limited to text messaging, but may be similarly applied to any functionality of the mobile communicator 1000.

In another embodiment, the mobile communicator 1000 may receive a communication signal from another device. For example, in the case that the mobile communicator 1000 is a cell phone, a caller may attempt to call the mobile communicator 1000. If the mobile communicator 1000 is in the default disabled state because the condition is not satisfied, the mobile communicator 1000 may notify the caller that the user of the mobile communicator 1000 is not available. This notification may be a preprogrammed downloadable notification such as a song, movie trailer, voice message, or the like. Furthermore, the call may be automatically forwarded to another destination location, third party, owner or controlling authority. For example, if a sales representative is traveling and a client tries to contact the sales representative when the mobile communicator 1000 is moving at a speed that is above a predetermined threshold, the mobile communicator 1000 may store both store a message and forward the message to the sales office.

Figure 18:
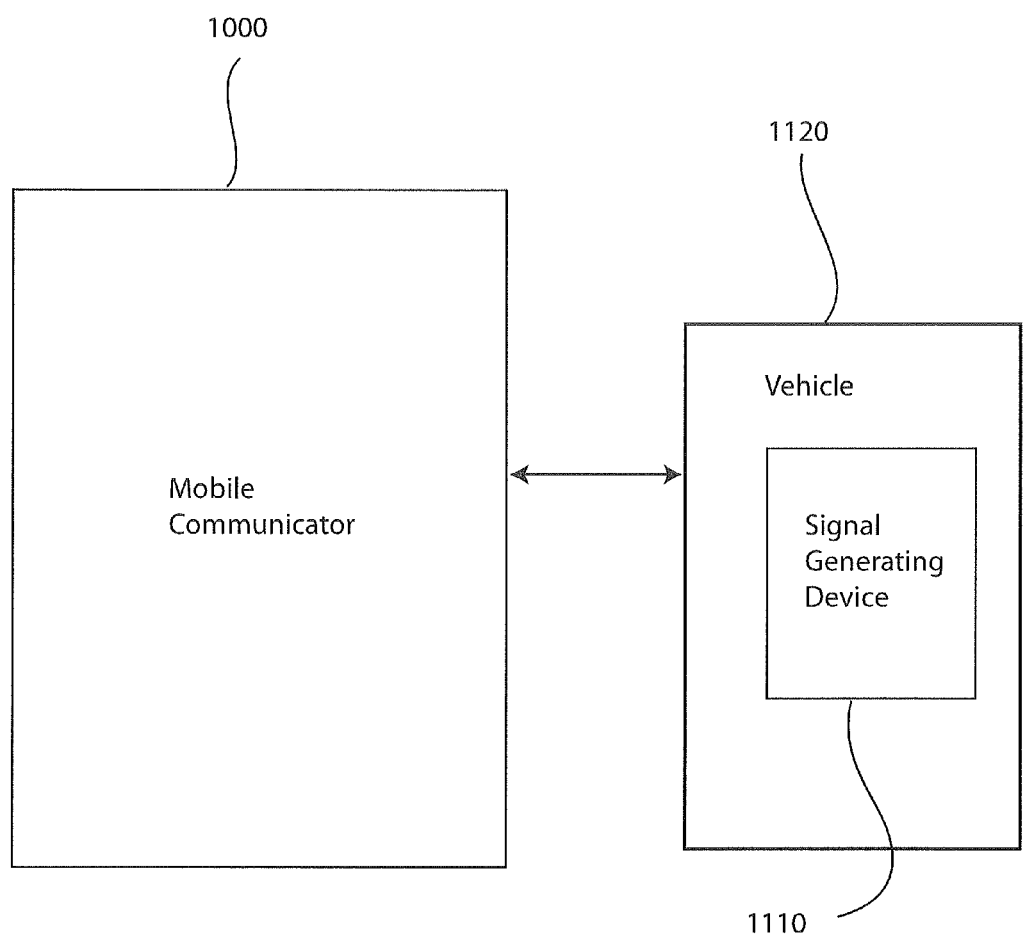
FIG. 18 depicts a signal generating device in communication with a mobile communicator in accordance with the present invention.

In another embodiment of the present invention, shown in FIG. 18, the mobile communicator 1000 may be responsive to a separate signal generating device 1110. The separate signal generating device 1110 may, for example, be installed in a vehicle 1120. The separate signal generating device 1110 may send out an enabling signal that is received by the mobile communicator 1000, thereby enabling the device. This enabling signal may take precedence over any disabling condition. For example, the mobile communicator 1000 may be turned on but in the initially default disabled state. The mobile communicator 1000 may include an enabling system that is configured to enable the mobile communicator 1000 when it is traveling below a threshold velocity. However, even if the mobile communicator 1000 is traveling above the threshold velocity, the enabling signal of the separate signal generating device 1110 may enable the mobile communicator 1000, thereby taking precedence over the velocity condition. In another embodiment, a public transportation vehicle (not shown) may include one of these signal generating devices 1110 that is in communication with any and/or all of the mobile communicators associated with users riding on the public transportation vehicle. The signal generating device 1110 may thus enable the mobile communicators 1000 that receive it, even if the public transportation vehicle is traveling above a threshold velocity.

Furthermore, the signal generating device 1110 may generate a signal that is extremely sensitive to location. A passenger automobile may include the signal generating device 1110 such that it enables any of the mobile communicators 1000 that reside in a particular area of the passenger compartment of the vehicle. For example, the signal generating device 1110 may generate a signal that extends only within the back seats while leaving the front seat areas free from the generated signal. Thus, the driver may still be bound by the default disabled status while the mobile communicator 1000 is moving.

It should be understood that the signal generating device 1110 may be powered by common electrical systems of a vehicle 1120, such as a 12-volt system. The signal generating device 1110 may be plugged into the "lighter" power source of the vehicle 1120. Alternately, the signal generating device 1110 may alternately come standard in a vehicle equipment package such that it is not removable and always operational whenever the vehicle 1120 in which it is installed is started. The signal generating device 1110 may also be in communication with a GPS receiving element of the vehicle. Alternately, the signal generating device 1110 may include its own internal GPS receiver that may determine location and speed of the signal generating device 1110 as described herein with respect to the GPS receiver 1080 of the mobile communicator 1000.

In a further embodiment, the signal generating device 1110 may not be attached to a vehicle but may instead be installed in a brooch, pendant, ring, necklace, watch, bracelet, amulet, caning or the like. The brooch, pendant, ring, necklace, watch, bracelet, amulet, caning, wrist-band or the like may be worn by a user and may perform the same signal generation as the signal generator 1110 described hereinabove. This may allow a user to enable a safety equipped mobile communicator 1000. Alternately it may allow a user that only rides a train, airplane or bus to enable their default disabled mobile communicator 1000.

In a similar embodiment, the signal generating device 1110 may be configured to override the enabling of the default disabled mobile communicator 1000. For example, a prison, a jail, a movie theater, a conference room and/or other like premises may include a signal generating device 1110 that overrides the enabling of the default disabled mobile communicator 1000 when the mobile communicator 1000 is in the proximity. The mobile communicator 1000 may also be configured to receive this signal from the signal generating device 1110 and interpret the meaning of the signal to be that the mobile communicator 1000 is moving at a greater speed than the threshold speed. This would thereby prevent the condition from being satisfied in an embodiment where the condition is that the mobile communicator 1000 is moving less than or equal to a threshold speed.

In a further embodiment, the mobile communicator 1000 or the signal generating device 1110 may be plugged into a vehicle such that the mobile communicator 1000 or signal generating device 1110 is in communication with the computer diagnostics system of the vehicle. In one embodiment, the signal generating device 1110 may determine velocity independently or instead of the Mobile Communicator 1000. For example, the signal generating device 1110 may be in communication with the speedometer or wheel of the vehicle, similar to the Mobile Communication Device described hereinabove. It should be understood that the signal generating device 1110 may be in communication with any mechanical or electronic diagnostic system of the vehicle. Alternately, the signal generating device 1110 may determine velocity through GPS, cell tower triangulation or multilateration, or with an accelerometer or gyroscope, as described hereinabove with respect to the Mobile Communicator 1000. Further, by connecting the signal generating device 1110 internally to the vehicle in the computer diagnostics system or the like, the signal generating device 1110 may be prevented from being physically moved by a user to circumvent its function. An Inertial Navigation System (INS) may also be utilized to determine speed or velocity.

In the embodiment where the signal generating device 1110 or the mobile communicator 1000 are in communication with a vehicle, when the vehicle is started, the mobile communicator 1000 or the signal generating device 1110 may be configured to enable certain or all functions of the mobile communicator 1000 even if the vehicle is running. For example, in the case that the signal generating device 1110 is plugged into the vehicle, it may emit an enabling signal even when the vehicle is moving. This enabling signal may extend through the entire vehicle. The signal generating device 1110 may emit a second signal only in the area that the driver occupies when the vehicle diagnostics system determines that the vehicle is moving above a certain threshold. In one embodiment, the signal generating device 1110 may override the enabling system. Alternately, the signal generating device 1110 may disable a further element or elements 1020, 1030, 1040, 1050, 1060 or additional functions of the mobile communicator 1000 despite the enabling system.

In another embodiment the signal generating device 1110 may emit a first signal that extends only to the zone of the driver and a second signal that extends throughout the rest of the vehicle. The first signal may prevent enabling of the mobile communicator 1000 or may further disable additional features of the default disabled mobile communicator 1000 unless a hands free mode of the mobile communicator 1000 is enacted. The second signal may enable the mobile communicator 1000 of the passenger sitting anywhere else in the vehicle other than the driver's seat. Furthermore, any attempts to block the first signal may result in a signal being sent through the entire vehicle compartment that effectively blocks all mobile communicator devices 1000 inside the vehicle.

It should be understood that the signal generating device 1110 may be utilized in conjunction with the hands free aspect of the mobile communicator 1000. Thus, a mobile communicator 1000 that is disabled by default may be configured to be enabled under multiple conditions. In one case, the mobile communicator 1000 may be enabled when it is determined to be used in a hands free mode. Alternately, the mobile communicator 1000 may be enabled when the signal generating device 1110 sends an enabling signal.

In the case where the enabling condition is that the speed is below a certain threshold, the signal generating device 1110 may determine speed or velocity and respond by sending a signal to the mobile communicator 1000 accordingly. For example, the signal generating device 1110 may independently determine speed or velocity with a GPS, cell tower triangulation, accelerometer, or the like. The signal generating device 1110 may then respond by sending an enabling signal to the mobile communicator 1000. Alternately, the signal generating device 1110 may simply send a signal that communicates the speed to an internal receiver and processor of the mobile communicator 1000. In an embodiment where both the signal generating device 1110 and the mobile communicator 1000 may determine speed or velocity, the internal speed or velocity detector of the mobile communicator 1000 may be turned off when the speed is being determined by the signal generating device 1110 and relayed to the mobile communicator 1000.

Figure 19:
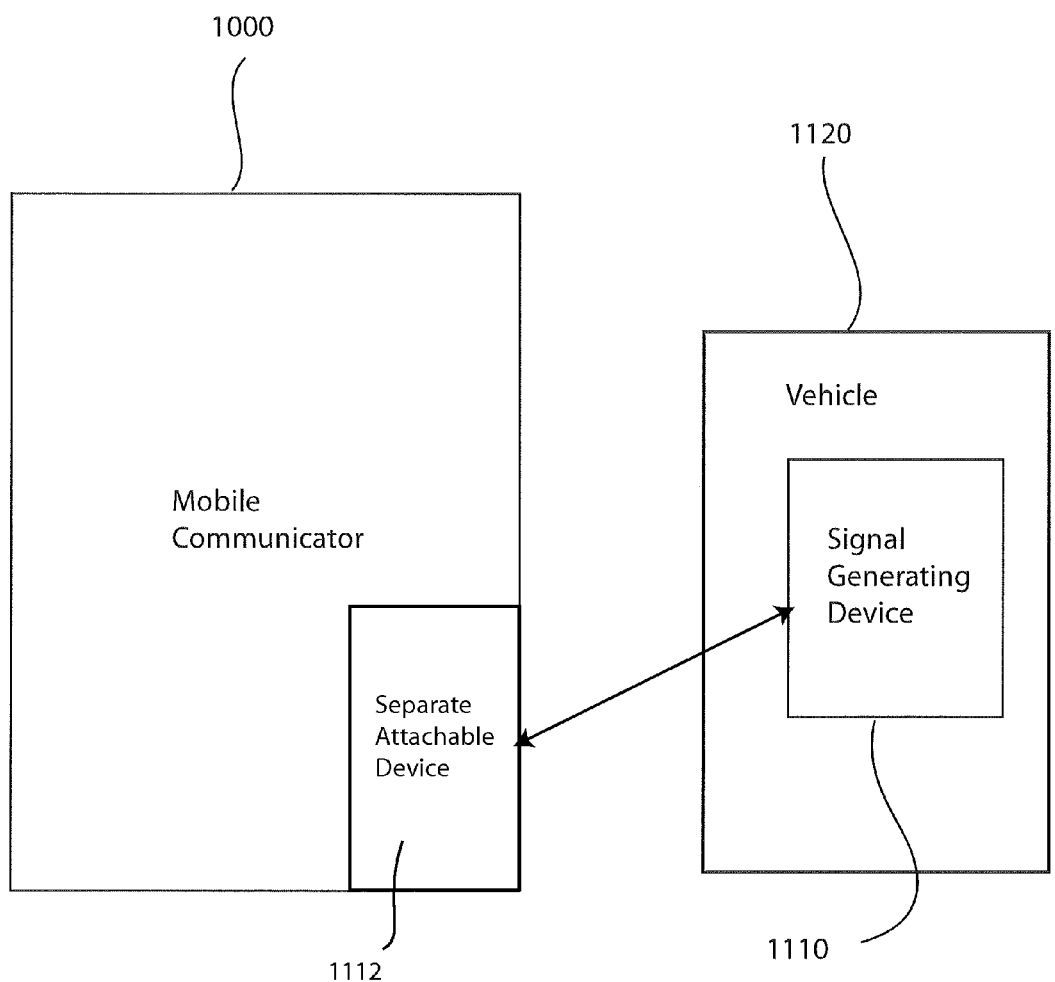
FIG. 19 depicts a separate attachable device that may be utilized to communicate any signals generated by the signal generating device to the mobile communicator in accordance with the present invention.

Shown in FIG. 19, a separate attachable device 1112 may be utilized to communicate any signals generated by the signal generating device 1110 to the mobile communicator 1000. For example, the signal generating device 1110 may not be able to transmit the speed signal to the mobile communicator 1000 in a format that is receivable and discernable by the mobile communicator 1000. The separate attachable device 1112 may attach to either the mobile communicator 1000, as shown in FIG. 19, or the signal generating device 1110, or both, to convert the signal from the signal generating device 1110 into a form that is readable by the mobile communicator 1000.

Furthermore, the mobile communicator 1000 may be configured to determine when it crosses a national, state, or other territorial border. The mobile communicator 1000 may be programmed with different functionalities depending on the nation, state or territory that the mobile communicator 1000 is currently located in. For example, the GPS receiver could determine when the mobile communicator 1000 enters a state border with mobile communicator laws. In this case, the mobile communicator 1000 may be configured to automatically enter a mode that is consistent with those laws.

The mobile communicator 1000 may also be configured to enable certain functions when the condition is not satisfied. Similarly, the mobile communicator 1000 may be configured to enable certain functions when the speed or velocity at which it is traveling is above a certain threshold. For example, the mobile communicator 1000 may be configured to automatically enter into the hands free mode, described hereinabove. Alternately, the mobile communicator 1000 may be configured to emit a signal that is detectable by an authority party, such as the police, national guard, or military.

The mobile communicator 1000 may be configured to remain in an enabled state for a predetermined period of time after an emergency communication is made by the mobile communicator 1000. For example, if a user dials "911" with the mobile communicator 1000, the mobile communicator may remain in the enabled state, despite any condition, in order to allow follow up communication in the case of an emergency. To prevent abuse of this function, this automatically enabled state may require a signal or code from an authority. For example, a 911 operator may override the default disabled state and provide for automatic enabling for a predetermined period of time.

The mobile communicator 1000 may further be configured to audibly or visually notify a user if the mobile communicator is moving at a speed or velocity that is above a predetermined threshold. For example, the mobile communicator 1000 may include a GPS system that determines what road or highway the mobile communicator 1000 is traveling on. The mobile communicator 1000 may also be programmed with data, or may have access to data, that includes a speed limit for each road or highway. Thus, the mobile communicator 1000 may be configured to determine the speed or velocity of the mobile communicator and compare it to the speed limit data. If the speed is higher than the speed limit, the mobile communicator 1000 may notify the user by an audible or visual alert.

The mobile communicator 1000 may also include software that is associated with providing an initial default disabled state and further providing an enabling system. The mobile communicator 1000 may be tamper proof such that the mobile communicator 1000 may enter a permanent or semi-permanent disabled state if this software is removed, or modified.

The mobile communicator 1000 may further create an internal log that includes information regarding which functions are enabled at all times when the contact 1075 of the mobile communicator 1000 is in the closed position. This may provide definitive proof in legal disputes as to the functionality of the mobile communicator 1000. Thus, if a user is wrongly accused of driving while talking with the mobile communicator 1000, the user will be able to provide proof that the audible receiving functions of the mobile communicator 1000 were disabled at the time in question. This internal data log may also record particular uses of the phone. For example, any transmissions and communications may be recorded and stored on the mobile communicator 1000. Like the call or message forwarding described hereinabove, the recorded and stored log may be forwarded to an owner or controlling authority or another third party.

The mobile communicator 1000 may include a "data wipe" mode whereby a user may clear any or all data stored by the mobile communicator 1000 remotely. For example, the user may contact a service provider that will send a wipe signal to the mobile communicator 1000. In this embodiment the mobile communicator 1000 may be receptive of the wipe signal and initiate the "data wipe" of the private data. Alternately, the user may call the mobile communicator 1000 and then initiate a remote "data wipe" by sending a particular wipe signal after a connection is established. For example, the mobile communicator 1000 may request the user to provide a particular password either via keypad entry, or audible entry. This may initiate the "data wipe."

The mobile communicator 1000 may also only be configured to communicate with certain destination devices. For example, in the case that the mobile communicator 1000 is a cell phone, the mobile communicator 1000 may only be configured to communicate with certain pre-authorized numbers. The authorization of destination devices may be controlled by an owner of the mobile communicator 1000 or another controlling authority. The mobile communicator 1000 may be configured with an authorized list through an input by the controlling authority on a protected website that is in communication with the mobile communicator 1000. In other embodiments, the mobile communicator 1000 may be allowed to make unauthorized communications. However, each unauthorized communication may trigger an alert to the owner or other controlling body. This alert may be provided to the web site, or to a mobile device of the controlling body. It should be understood that this alert may also be provided to any third party device or site.

In one embodiment, the controlling body or owner may able to program what functions are enabled depending on the time of day that the mobile communicator 1000 is in use. Again, the website may be utilized to control the mobile communicator 1000 in this way. The settings provided by the owner or controlling body may only be implemented for a predetermined time. After that time, the settings may be automatically deleted unless the owner or controlling body updates or reaffirms the settings. This may prevent the mobile communicator from being inadvertently controlled indefinitely.

Other functions of the mobile communicator 1000 may also be controlled by the third party or controlling authority. Any functionality may be controlled by a third party or other controlling authority. However, the functionality of the mobile communicator 1000 may also be controlled from the mobile communicator itself. For example, a parent that owns a child's mobile communicator may be able to program the mobile communicator 1000 such that particular functions are or are not accessible. The mobile communicator 1000 may create a log, as described hereinabove, that determines whether the programmed functions have been tampered with, as described hereinabove.

It should be understood that when the mobile communicator 1000 reverts back to the default disabled state, each setting may be saved. Further, any work, documents, or programs running that become disabled by the disabled state may be saved. For example, if a person was preparing a long email or text message when the mobile communicator 1000 was reverting back to the disabled state, and texting or emailing is disabled in the disabled state, then the email or text may be saved. The same email or text may then resume when the mobile communicator enables those functions.

In another embodiment, the mobile communicator 1000 may automatically delay the onset of the enabled state even when the condition is satisfied. For example, if the mobile communicator 1000 was enabled when the speed or velocity of the mobile communicator 1000 was below a certain threshold, the mobile communicator may be configured to delay entering the enabled state for 30 seconds after the velocity or speed was below the threshold. This may help prevent enablement of the mobile communicator during a red light, when the user is still driving, but is not moving at that particular moment.

The mobile communicator 1000 may further include one or more ways of overriding the default disabled state even when the condition is not satisfied. For example, a person may simply press a button or input another command signal that would override the default disabled state. This override may also be password protected such that an administrator, boss, or parent may override the default disabled state when the mobile communicator 1000 is not being used by an employee, pupil, child or other subordinate. The mobile communicator 1000 may include a password protection system that allows the administrator, boss or parent to override the default disabled state, thereby preventing the employee, pupil, child or other subordinate from performing the override function.

The mobile communicator 1000 may still further include certain call-forwarding features that are effective when the mobile communicator 1000 is in the default disabled state. For example, the mobile communicator 1000 may forward a call to a different number if the call was made to the mobile communicator 1000 while it was in the default disabled state. Alternately, the mobile communicator 1000 may send the call straight to a voice mail message box. In another embodiment, the mobile communicator 1000 may be programmed to automatically responsively notify a caller that the user is traveling above a non-permissible speed. Furthermore, after being enabled by the enabling system 1010, the mobile communicator 1000 may include a feature that allows a user to automatically press a button or otherwise input a command that would display or dial each of the numbers that called when the mobile communicator 1000 was in the default disabled state. This feature may further allow a user to return calls in a predetermined or selectable order that is input or programmable by a user.

Still further, the mobile communicator 1000 may include a signal forwarding element. The forwarding element may be configured to automatically alert another device if and when the mobile communicator 1000 was traveling above a predetermined velocity. The forwarding element may thus allow a parent to automatically program the mobile communicator 1000 to send the parent's phone a notification when the child's mobile communicator 1000 was traveling over the predetermined speed limit.

It should be understood that the velocity and location detection is not limited to a GPS receiver embodiment. For example, cell tower triangulation, trilateration, multilateration, or any other method of determining the location and/or speed of the mobile communicator 1000 may be utilized, as described hereinabove to determine that the mobile communicator 1000 is traveling below a certain threshold velocity and should be switched to an enabled mode. Alternate embodiments for location and velocity detection will be apparent to those skilled in the art. For example, speed may be determined with a mechanical or electrical vehicle diagnostic such as a speedometer or a sensor located in the wheel or tire. Alternately, an accelerometer or gyroscope may be used to determine speed or velocity. An Inertial Navigation System (INS) may further be used to determine speed or velocity.

It should also be understood that the enabling or disabling functions of the mobile communicator 1000, as described hereinabove, may be executed by an internal logic system of the mobile communicator 1000 itself. In alternate embodiments, however, a service provider or any another third party may execute the enabling or disabling functions of the mobile communicator 1000. For example, a third party database may keep track of the speed of the mobile communicator 1000 using a cell tower triangulation technique. The third party may then send out an enabling signal to the mobile communicator 1000 in a similar manner that the signal generating device 1110 may send an enabling signal, as described hereinabove. Other embodiments utilizing a third party or service provider will be understood by those skilled in the art. Furthermore, the third party may control the functions of the signal generating device 1110, described hereinabove.

In another embodiment of the present invention, calls to the mobile communicator 1000 may be rerouted to a "dummy cell tower" or other location when the mobile communicator 1000 is in the disabled state or is not receptive of incoming calls. In this situation, the "dummy cell tower" or other location may store a message, or send a message to another location, such as the commercial website described hereinabove.

The foregoing description of the embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

What is claimed is:

1. A mobile communicator comprising:
   a contact operable between an open configuration and a closed configuration and positioned to complete an electric circuit when the contact is in the closed position thereby activating the mobile communicator and providing the mobile communicator with functionality;
   a display;
   a notification mechanism for alerting a user;
   a user interface configured for allowing a user to enter a plurality of inputs, the plurality of inputs associated with an alphanumeric combination of numbers and letters;
   a transmitter in operable communication with the user interface and configured to send a transmission from the mobile communicator to a destination corresponding with the destination input;
   a receiver capable of receiving a transmission from a transmitting device; and
   an enabling system;
   wherein the mobile communicator includes an initial default disabled state, wherein at least one of the display, the notification mechanism, the user interface, the transmitter, the receiver, a voice to text interface, a text messaging interface, an image messaging interface, a video messaging interface, an internet browser, an image capturer, a voice capturer, a video capturer, a GPS graphical map viewer, an inertial navigation system, a game player, a video player, a digital music player, an alarm clock, a digital memo pad, a digital calendar, a two-way radio, an e-book reader, an electronic contact rolodex, and a calculator is disabled;
   wherein the mobile communicator remains in the initial default disabled state even when the contact is in the closed position and the activating electrical circuit is complete; and
   wherein a logic of the enabling system is configured to change the initial default disabled state of the mobile communicator to an enabled state, wherein the at least one of the display, the notification mechanism, the user interface, the transmitter, the receiver, the voice to text interface, the text messaging interface, the image messaging interface, the video messaging interface, the internet browser, the image capturer, the voice capturer, the video capturer, the GPS graphical map viewer, the inertial navigation system, the game player, the video player, the digital music player, the alarm clock, the digital memo pad, the digital calendar, the two-way radio, the e-book reader, the electronic contact rolodex, and the calculator become enabled, when a speed detection system of the mobile communicator determines that the mobile communicator is moving at a speed that is less than a setpoint speed.

2. The mobile communicator of claim 1, wherein the speed detection system selected from the group consisting of GPS, triangulation, multilateration, vehicle diagnostics, inertial navigation, an accelerometer, and a gyroscope.

3. The mobile communicator of claim 2, wherein the speed detection system is deactivated until a second condition is met.

4. The mobile communicator of claim 3, wherein the second condition is that a user attempts to activate the text messaging interface.

5. The mobile communicator of claim 1, wherein the mobile communicator is a communicator selected from the group consisting of a cell phone, an IPAD®, a tablet, a mobile computer, a BLACKBERRY®, an IPHONE®, and a GPS device.

6. The mobile communicator of claim 1, wherein the mobile communicator is attachable to a separate signal generating device.

7. The mobile communicator of claim 6, wherein the signal generating device is configured to determine the speed of the mobile communicator and send a speed signal to the mobile communicator.

8. The mobile communicator of claim 6, wherein the signal generating device is configured to determine the speed of the mobile communicator and send an enabling signal to the mobile communicator if the speed is less than a certain setpoint speed.

9. The mobile communicator of claim 6, wherein a separate attachable device is attachable between the signal generating device and the mobile communicator, wherein the separate attachable device is configured to convert signals sent by the kit to the mobile communicator into a format that is receivable and discernable by the mobile communicator.

10. The mobile communicator of claim 6, wherein the separate signal generating device is connected to a vehicle diagnostic system.

11. The mobile communicator of claim 1, wherein a speed sensing system of the mobile communicator is configured to enter into a "sleep mode" automatically.

12. The mobile communicator of claim 1, wherein a speed sensing system of the mobile communicator is configured to enter into a "sleep mode" wherein the speed sensing system is disabled until an activating event.

13. The mobile communicator of claim 12, wherein the activating event is the mobile communicator receiving a call, and wherein the mobile communicator is configured to provide a message to a caller.

14. The mobile communicator of claim 1, wherein the mobile communicator is automatically enabled by the enabling system for a predetermined amount of time after an emergency communication is made by the mobile communicator.

15. The mobile communicator of claim 1, wherein the mobile communicator stores a log of enabled and disabled functions.

16. The mobile communicator of claim 1, wherein the mobile communicator stores a log of incoming and transmitted signals that take place and the corresponding enabled and disabled functions at the time of the incoming and transmitted signals.

17. The mobile communicator of claim 1, wherein the mobile communicator stores a log of at least one of incoming and transmitted signals that take place and the mobile communicator stores a log of a determination of whether the mobile communicator is moving at a speed that is less than a setpoint speed at the time of the incoming and transmitted signals.

18. The mobile communicator of claim 1, wherein data stored on the mobile communicator is remotely removable.

19. The mobile communicator of claim 1, wherein the mobile communicator is programmable with at least one pre-authorized destination device, and wherein the mobile communicator is only communicable with the at least one pre-authorized destination device.

20. The mobile communicator of claim 1, wherein the mobile communicator is programmable with at least one pre-authorized destination device, and wherein an alert is sent to a controlling authority when the mobile communicator communicates with a non-authorized destination device.

21. The mobile communicator of claim 1, wherein the enabling system is configured to enable at least one function based on a span of time in a day.

22. The mobile communicator of claim 1, wherein the mobile communicator forwards a communication to another device when the mobile communicator is in the initial default disabled state.

23. The mobile communicator of claim 1, further comprising a voice translator for converting voice inputs to text, wherein the mobile communicator is configured to enable voice inputs to text when the mobile communicator is in the initial default disabled state.

24. The mobile communicator of claim 1, wherein the initial default disabled state includes at least one enabled function and where the condition disables the at least one enabled function.

25. The mobile communicator of claim 1, wherein the logic of the enabling system is configured to change the initial default disabled state of the mobile communicator to the enabled state when the user inputs an voluntary override command.

26. A mobile communicator, comprising:
a contact operable between an open configuration and a closed configuration and positioned to complete an electric circuit when the contact is in the closed position thereby activating the Mobile Communicator and providing the Mobile Communicator with functionality;
a display;
a notification mechanism for alerting a user;
a user interface configured for allowing a user to enter a plurality of inputs, the plurality of inputs associated with an alphanumeric combination of numbers and letters;
a transmitter in operable communication with the user interface and configured to send a transmission from the mobile communicator to a destination corresponding with the destination input;
a receiver capable of receiving a transmission from a transmitting device; and
an enabling system;
wherein the mobile communicator includes an initial default disabled state, wherein at least one of the display, the notification mechanism, the user interface, the transmitter, the receiver, a voice to text interface, a text messaging interface, an image messaging interface, a video messaging interface, an internet browser, an image capturer, a voice capturer, a video capturer, a GPS graphical map viewer, an inertial navigation system, a game player, a video player, a digital music player, an alarm clock, a digital memo pad, a digital calendar, a two-way radio, an e-book reader, an electronic contact rolodex, and a calculator is disabled;
wherein the mobile communicator remains in the initial default disabled state even when the contact is in the closed position and the activating electrical circuit is complete; and
wherein a logic of the enabling system is configured to change the initial default disabled state of the mobile communicator to an enabled state, wherein at least one of the display, the notification mechanism, the user interface, the transmitter, the receiver, the voice to text interface, the text messaging interface, the image messaging interface, the video messaging interface, the internet browser, the image capturer, the voice capturer, the video capturer, the GPS graphical map viewer, the inertial navigation system, the game player, the video player, the digital music player, the alarm clock, the digital memo pad, the digital calendar, the two-way radio, the e-book reader, the electronic contact rolodex, and the calculator become enabled, when a hands-free mode of the mobile communicator is activated.

27. The mobile communicator of claim 26, wherein a logic of the enabling system is configured to change the initial default disabled state of the mobile communicator to an enabled state, wherein at least one of the display, the notification mechanism, the user interface, the transmitter, the receiver, the voice to text interface, the text messaging interface, the image messaging interface, the video messaging interface, the internet browser, the image capturer, the voice capturer, the video capturer, the GPS graphical map viewer, the inertial navigation system, the game player, the video player, the digital music player, the alarm clock, the digital memo pad, the digital calendar, the two-way radio, the e-book reader, the electronic contact rolodex, and the calculator become enabled, when the mobile communicator is moving at a speed that is less than a setpoint speed.

28. The mobile communicator of claim 27, wherein the speed is determined by a system selected from the group consisting of GPS, triangulation, multilateration, vehicle diagnostics, inertial navigation, an accelerometer, and a gyroscope.

29. The mobile communicator of claim 26, wherein the mobile communicator is a communicator selected from the group consisting of a cell phone, an IPAD®, a tablet, a mobile computer, a BLACKBERRY®, an IPHONE®, and a GPS device.

30. The mobile communicator of claim 26, wherein the mobile communicator is attachable to a separate signal generating device.

31. The mobile communicator of claim 30, wherein the signal generating device is configured to determine the speed of the mobile communicator and send a speed signal to the mobile communicator.

32. The mobile communicator of claim 30, wherein the signal generating device is configured to determine the speed of the mobile communicator and send an enabling signal to the mobile communicator if the speed is less than a certain setpoint speed.

33. The mobile communicator of claim 30, wherein a separate attachable device is attachable between the signal generating device and the mobile communicator, wherein the separate attachable device is configured to convert signals sent by the kit to the mobile communicator into a format that is receivable and discernable by the mobile communicator.

34. The mobile communicator of claim 26, wherein a speed sensing system of the mobile communicator is configured to enter into a "sleep mode" automatically.

35. The mobile communicator of claim 26, wherein a speed sensing system of the mobile communicator is configured to enter into a "sleep mode" wherein the speed sensing system is disabled until an activating event.

36. The mobile communicator of claim 35, wherein the activating event is the mobile communicator receiving a call, and wherein the mobile communicator is configured to provide a message to a caller.

37. The mobile communicator of claim 30, wherein the separate signal generating device is connected to a vehicle diagnostic system.

38. The mobile communicator of claim 26, wherein the mobile communicator is automatically enabled by the enabling system for a predetermined amount of time after an emergency communication is made by the mobile communicator.

39. The mobile communicator of claim 26, wherein the mobile communicator stores a log of enabled and disabled functions.

40. The mobile communicator of claim 26, wherein data stored on the mobile communicator is remotely removable.

41. The mobile communicator of claim 26, wherein the mobile communicator is programmable with at least one pre-authorized destination device, and wherein the mobile communicator is only communicable with the at least one pre-authorized destination device.

42. The mobile communicator of claim 41, wherein the mobile communicator is programmable with at least one pre-authorized destination device, and wherein an alert is sent to a controlling authority when the mobile communicator communicates with a non-authorized destination device.

43. The mobile communicator of claim 26, wherein the enabling system is configured to enable at least one function based on a span of time in a day.

44. The mobile communicator of claim 26, wherein the mobile communicator forwards a communication to another device when the mobile communicator is in the initial default disabled state.

45. The mobile communicator of claim 26, further comprising a voice translator for converting voice inputs to text, wherein the mobile communicator is configured to enable voice inputs to text when the mobile communicator is in the initial default disabled state.

46. The mobile communicator of claim 26, wherein a volume of at least one function is automatically adjusted when the hands free mode is activated.

47. The mobile communicator of claim 26, wherein the hands free mode is activated automatically when the mobile communicator is moving at a speed that is above a setpoint speed.

48. The mobile communicator of claim 26, wherein the hands free mode additionally disables at least one function.

49. The mobile communicator of claim 26, wherein a button activates the hands free mode of the mobile communicator.

50. The mobile communicator of claim 26, wherein the initial default disabled state includes at least one enabled function and where the condition disables the at least one enabled function.

51. A mobile communicator comprising:
a contact operable between an open configuration and a closed configuration and positioned to complete an electric circuit when the contact is in the closed position thereby activating the mobile communicator and providing the mobile communicator with functionality;
a display;
a notification mechanism for alerting a user;
a user interface configured for allowing a user to enter a plurality of inputs, the plurality of inputs associated with an alphanumeric combination of numbers and letters;
a transmitter in operable communication with the user interface and configured to send a transmission from the mobile communicator to a destination corresponding with the destination input;
a receiver capable of receiving a transmission from a transmitting device; and
an enabling system;
wherein the mobile communicator includes an initial default disabled state, wherein at least one of the display, the notification mechanism, the user interface, the transmitter, the receiver, a voice to text interface, a text messaging interface, an image messaging interface, a video messaging interface, an internet browser, an image capturer, a voice capturer, a video capturer, a GPS graphical map viewer, an inertial navigation system, a game player, a video player, a digital music player, an alarm clock, a digital memo pad, a digital calendar, a two-way radio, an e-book reader, an electronic contact rolodex, and a calculator is disabled;
wherein the mobile communicator remains in the initial default disabled state even when the contact is in the closed position and the activating electrical circuit is complete; and
wherein a logic of the enabling system is configured to change the initial default disabled state of the mobile communicator to an enabled state, wherein the at least one of the display, the notification mechanism, the user interface, the transmitter, the receiver, the voice to text interface, the text messaging interface, the image messaging interface, the video messaging interface, the internet browser, the image capturer, the voice capturer, the video capturer, the GPS graphical map viewer, the inertial navigation system, the game player, the video player, the digital music player, the alarm clock, the digital memo pad, the digital calendar, the two-way radio, the e-book reader, the electronic contact rolodex, and the calculator become enabled, when the mobile communicator receives an enabling signal from a third party source that is separate from the mobile communicator.

\* \* \* \* \*